United States Patent
Hao et al.

(10) Patent No.: US 11,909,225 B2
(45) Date of Patent: Feb. 20, 2024

(54) WIRELESS CHARGING TRANSMITTER AND WIRELESS CHARGER

(71) Applicant: Halo Microelectronics Co.,Ltd., Foshan (CN)

(72) Inventors: Yueguo Hao, Foshan (CN); Songnan Yang, Frisco, TX (US)

(73) Assignee: Halo Microelectronics Co., Ltd., Foshan (CN)

( * ) Notice: Subject to any disclaimer, the term of this patent is extended or adjusted under 35 U.S.C. 154(b) by 393 days.

(21) Appl. No.: 17/363,443

(22) Filed: Jun. 30, 2021

(65) Prior Publication Data
US 2022/0060057 A1    Feb. 24, 2022

(30) Foreign Application Priority Data
Aug. 21, 2020   (CN) .......................... 202010847661.3

(51) Int. Cl.
*H02J 7/00*     (2006.01)
*H02J 50/40*    (2016.01)
*H02J 50/10*    (2016.01)

(52) U.S. Cl.
CPC ............ *H02J 50/402* (2020.01); *H02J 50/10* (2016.02)

(58) Field of Classification Search
None
See application file for complete search history.

(56) References Cited

U.S. PATENT DOCUMENTS 10,854,378 B2 * 12/2020 Teggatz .................. H02J 50/10
2015/0349542 A1 * 12/2015 Yamamoto ............... G01V 3/10
                                                                 307/104

FOREIGN PATENT DOCUMENTS

| CN | 104380567 A | 2/2015 |
| CN | 107276249 A | 10/2017 |
| CN | 108988510 A | 12/2018 |

* cited by examiner

*Primary Examiner* — Arun C Williams
(74) *Attorney, Agent, or Firm* — AP3 Law Firm PLLC

(57) ABSTRACT

A wireless charging transmitter includes at least two transmit coils and at least two transmit circuit units; wherein the at least two transmit coils are configured to simultaneously transmit electric energy to an external receive coil, the at least two transmit coils are coupled such that orientations of magnetic fields generated by currents on the at least two transmit coils are not parallel and form a first angle, a coupling coefficient between the at least two transmit coils is less than a predetermined threshold and each of the transmit circuit units is electrically connected to each of the transmit coils and configured to supply a current to the transmit coil. Therefore, the current on each of the transmit coils in the wireless charging transmitter generates a corresponding magnetic field.

30 Claims, 47 Drawing Sheets

WIRELESS CHARGING TRANSMITTER AND WIRELESS CHARGER

PRIORITY CLAIM

This application claims the benefit of and priority to Chinese Patent Application No. 202010847661.3, filed Aug. 21, 2020, which is hereby incorporated by reference in its entirety.

TECHNICAL FIELD

The present disclosure relates to the technical field of wireless charging, and in particular, relates to a wireless charging transmitter and a wireless charger.

BACKGROUND

Wireless charging is capable of achieving relative long-distance wireless electric energy transfer, such that the charging of the smart terminal is more flexible. Therefore, the wireless charging technology is being more and more extensively applied.

However, in a traditional wireless charging transmitter, generally one transmit coil is employed to transmit electric energy to a receive coil. When coupling between the transmit coil and the receive coil is weak, charging efficiency of a wireless charging system is reduced. Even when a plurality of transmit coils are employed to transmit electric energy to the receive coil, a smart terminal is still charged by magnetic fields having the same orientation generated by the transmit coils, such that the charging efficiency of the wireless charging system is low and the charging experience is poor.

SUMMARY

The present disclosure provides a wireless charging transmitter and a wireless charger, which are capable of improving the efficiency of wireless transmission of electric energy.

In a first aspect, embodiments of the present disclosure provide a wireless charging transmitter. The wireless charging transmitter includes a transmit coil group, wherein the transmit coil group includes at least two transmit coils configured to simultaneously transmit electric energy to an external receive coil, the at least two transmit coils are associated such that orientations of magnetic fields generated by currents on the at least two transmit coils are not parallel and form a first angle, and a coupling coefficient between the at least two transmit coils is less than a predetermined threshold, and at least two transmit circuit units, wherein each of the transmit circuit units is electrically connected to each of the transmit coils, and is configured to supply a current to the transmit coil.

In a second aspect, embodiments of the present disclosure further provide a wireless charger. The wireless charger includes a wireless charging transmitter, and a housing, configured to house the wireless charging transmitter, wherein the wireless charging transmitter includes a transmit coil group, wherein the transmit coil group includes at least two transmit coils configured to simultaneously transmit electric energy to an external receive coil, the at least two transmit coils are associated such that orientations of magnetic fields generated by currents on the at least two transmit coils are not parallel and form a first angle, and a coupling coefficient between the at least two transmit coils is less than a predetermined threshold.

The transmit coil group further includes at least two transmit circuit units, wherein each of the transmit circuit units is electrically connected to each of the transmit coils, and is configured to supply a current to the transmit coil.

The wireless charging transmitter according to the present disclosure includes at least two transmit coils and at least two transmit circuit units, wherein the at least two transmit coils are configured to simultaneously transmit electric energy to an external receive coil, and each of the transmit circuit units is electrically connected to each of the transmit coils and configured to supply a current to the transmit coil. Therefore, the wireless charging transmitter is capable of supplying a current to a corresponding transmit coil by each of the transmit circuit units, such that the transmit coils in a transmit coil group simultaneously operate, and the current on each of the transmit coils generates a corresponding magnetic field. When the plurality of transmit coils simultaneously operate, a plurality of magnetic fields eventually forms a superimposed magnetic field, and the electric energy is transmitted to the external receive coil by the superimposed magnetic field, such that the efficiency of electric energy transmission is improved. Further, when the transmit coils in the transmit coil group simultaneously operate, orientations of the magnetic fields generated by the transmit coils are not parallel but define a first angle, and a self-coupling coefficient between the transmit coils is less than a predetermined threshold, such that when the transmit coils simultaneously operate, interference from self-coupling is reduced and the efficiency of electric energy transmission is further improved.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

FIG. 3b is an illustration of the magnetic field generated by a current of the second planar coil in FIG. 3a;

FIG. 6b is a illustration of the magnetic field generated by a current of the first planar coil in FIG. 6a;

FIG. 7b is an illustration of a magnetic field generated by a current of the fourth planar coil in FIG. 7a;

FIG. 7c is an illustration of the magnetic fields generated by currents of the third planar coil and the fourth planar coil in FIG. 7a;

FIG. 8b is an illustration of the magnetic fields generated by currents of the third planar coil, the fourth planar coil, and the fifth planar coil in FIG. 8a;

FIG. 10b is a top view diagram of normals of the first curved coil, the second curved coil, and the third curved coil in FIG. 10a;

FIG. 10c is an illustration of the magnetic fields generated by currents of the first curved coil, the second curved coil, and the third curved coil in FIG. 10a;

FIG. 11b is a schematic diagram of a magnetic field generated by a current of the ninth planar coil in FIG. 11a;

FIG. 12b is a top-view diagram of normals of the first curved coil, the second curved coil, and the third curved coil in FIG. 12a;

FIG. 12c is an illustration of the magnetic field generated by the current of one of the first curved coil, the second curved coil, and the third curved coil in FIG. 12a;

FIG. 13b is an illustration of magnetic field generated by the current of one of the first curved coil, the second curved coil, and the third curved coil which are all inclined and curved in FIG. 13a;

FIG. 15c is an illustration of the magnetic field generated by the current of thirteenth planar coils and a fourteenth solenoid coil shown in FIG. 15a.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

For clear descriptions of objectives, technical solutions, and advantages of the present disclosure, the present disclosure is further described in detail below by reference to the embodiments and the accompanying drawings. It should be understood that the specific embodiments described herein are only intended to explain the present disclosure instead of limiting the present disclosure. Based on the embodiments of the present disclosure, all other embodiments derived by persons of ordinary skill in the art without any creative efforts shall fall within the protection scope of the present disclosure.

It should be noted that, in the absence of conflict, features in the embodiments of the present disclosure may be incorporated, which all fall within the protection scope of the present disclosure. In addition, although logic function module division is illustrated in the schematic diagrams of apparatuses, and logic sequences are illustrated in the flowcharts, in some occasions, steps illustrated or described by using modules different from the module division in the apparatuses or in sequences different from those illustrated. Further, the terms "first," "second," and "third" used in this disclosure do not limit data and execution sequences, and are intended to distinguish identical items or similar items having substantially the same functions and effects.

Figure 1:
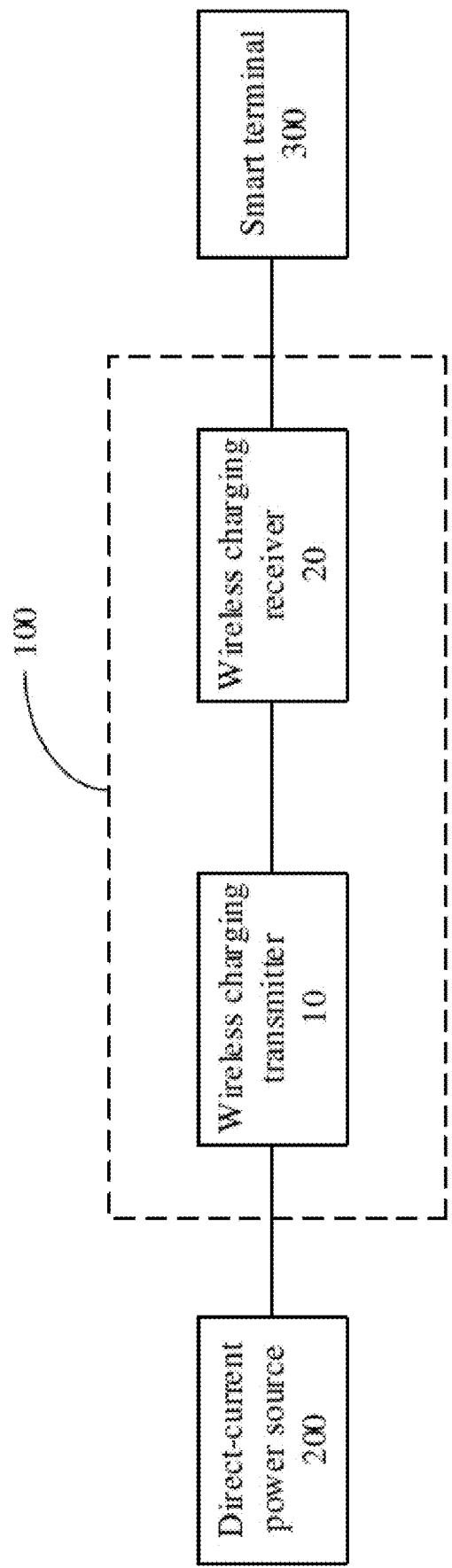
FIG. 1 is a schematic diagram of an application scenario of a wireless charging transmitter according to an embodiment of the present disclosure.

Referring to FIG. 1, FIG. 1 is a schematic diagram of an application scenario of a wireless charging transmitter 10 according to an embodiment of the present disclosure. As illustrated in FIG. 1, the wireless charging transmitter 10 is applicable to a wireless charging system 100. The wireless charging system 100 includes the wireless charging transmitter 10 and a wireless charging receiver 20. The wireless charging receiver 20 may be integrated in a smart terminal. The smart terminal may be any suitable type of smart terminal configured to establish coupling with the wireless charging transmitter 10, such as, a mobile phone, a tablet computer, a smart watch, a smart remote control, or the like. The wireless charging transmitter 10 may be configured in a wireless charger, a charging base, a table 400, or the like. When the wireless charging transmitter 10 is integrated in a wireless charger, the wireless charger further includes a housing 14. The wireless charging transmitter is received in the housing 14. The shape of the housing 14 may be adaptive to the shape of the wireless charger, which may be a cylinder, a truncated cone, a prism, a frustum, or the like. The wireless charging transmitter 10 is further electrically connected to a direct-current power source 200. The direct-current power source 200 supplies power to the wireless charging transmitter 10. The direct-current power source 200 may be a power source obtained by rectification of alternating current source by a rectifier circuit. The wireless charging receiver 20 is further electrically connected to a smart terminal 300 and configured to charge the smart terminal 300. Generally, the smart terminal 300 is a smart device. Specifically, the wireless charging receiver 20 charges a battery of the smart terminal 300. When the battery of a smart terminal needs to be charged, the wireless charging transmitter 10 conducts a series of conversions of electric energy supplied by the direct-current power source 200, and transmits the converted electric energy by a transmit coil thereof. The transmit coils are coupled to the receive coil of the wireless charging receiver 20. The transmit coils transmit electric energy to the receive coil, and the receive coil receives the electric energy. An internal circuit of the wireless charging receiver 20 correspondingly processes the electric energy to charge the smart terminal 300.

Figure 2:
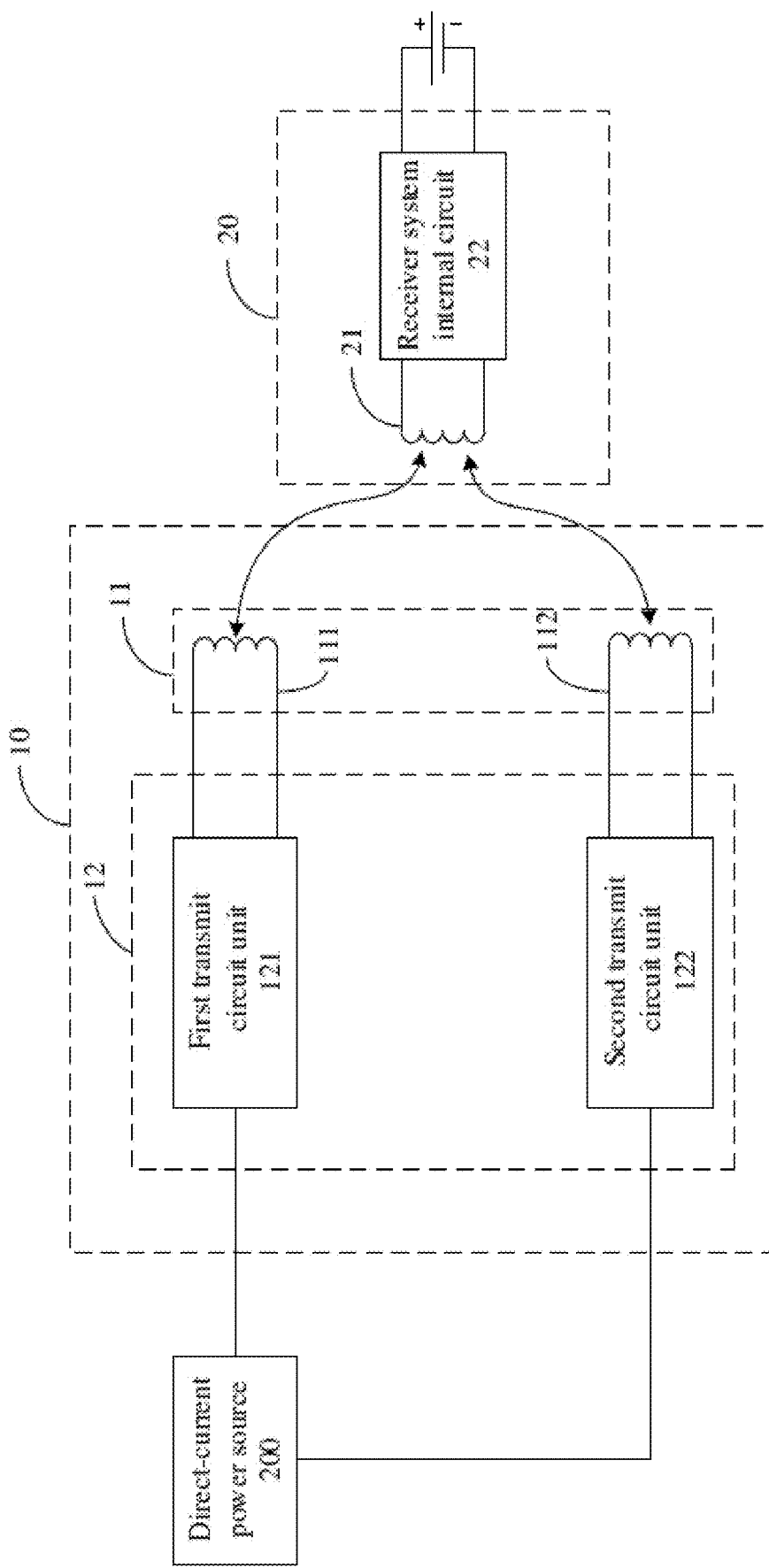
FIG. 2 is a structural diagram of a wireless charging transmitter according to an embodiment of the present disclosure.

Referring to FIG. 2, FIG. 2 illustrates a wireless charging transmitter 10 according to an embodiment of the present disclosure. The wireless charging transmitter 10 includes a transmit coil group 11 and at least two transmit circuit units 12. The transmit coil group 11 includes at least two transmit coils. FIG. 2 illustrates two transmit coils and two transmit circuit units, which are a first transmit circuit unit 121, a second transmit circuit unit 122, a first transmit coil 111, and a second transmit coil 112. The first transmit circuit unit 121 is electrically connected to the first transmit coil 111. The second transmit circuit unit 122 is electrically connected to the second transmit coil 112. The transmit circuit unit 12 is configured to supply currents to the corresponding transmit coil group 11. In some embodiments, the transmit circuit unit further includes a controller, configured to control the current of the transmit coil, and perform logic operations and related processing of the entire wireless charging transmitter.

The direct-current power source 200 is further electrically connected to the first transmit circuit unit 121 and the second transmit circuit unit 122 and is configured to supply direct current 200 to both of the first transmit circuit unit 121 and the second transmit circuit unit 122. The first transmit circuit unit 121 and the second transmit circuit unit 122 each convert the direct current 200 to an alternating current and supply the alternating current to their corresponding transmit coil group 11.

The wireless charging receiver 20 includes the receive coil 21 and an internal circuit 22 of the receiver system. The receive coil 21 is coupled to both the first transmit coil 111 and the second transmit coil 112, and is configured to receive the electric energy from the transmit coil group 11. The battery is charged by the electric energy which is processed by the internal circuit 22 of the receiver system.

The transmit coils in a transmit coil group simultaneously operate, and the current of each of the transmit coils generates a corresponding magnetic field. When the plurality of transmit coils simultaneously operate, a plurality of magnetic fields eventually form a superimposed magnetic field, and the electric energy is supplied to the receive coil by the superimposed magnetic field. Relative to supplying the electric energy to the receive coil by a single magnetic field, the wireless charging transmitter supplies the electric energy to the receive coil by the superimposed magnetic field, such that the efficiency of the wireless transmission of electric energy is improved, and the charging experience is improved.

In addition, the coupling between the two transmit coils is a first coupling, and the coupling between the first transmit coil and the receive coil is a second coupling, and the coupling between the second transmit coil and the receive coil is a third coupling. When the strength of the first coupling is not significantly less than the second coupling or the third coupling, the wireless transmission efficiency of the electric energy will be decreased. In an embodiment of the present disclosure, the two transmit coils may be PCB coils, or may be coils formed by winding metal wires or coils fabricated by metal line cutting, etching, or the like, and these coils are fixed together by a mechanical structure. The two transmit coils are associated together by a PCB or any other mechanical structure. By the above structural design, orientations of the magnetic fields generated by the currents of the two transmit coils are not parallel and form a first angle that is within an interval (0, 180°). By arranging the transmit coils, the magnetic fields generated, in the vicinity of the coils, by the currents of the two transmit coils may constitute a superimposed magnetic field, such that the two transmit coils are capable of operating collaboratively. Under the superimposed magnetic field, the wireless charging receiver is capable of better receiving the electric energy. Similarly, by arranging the transmit coils, a coupling coefficient of the first coupling can be less than a predetermined threshold, that is, a coupling strength of the first coupling is lowered, such that most of the wireless electric energy is transmitted to the receive coil by the second coupling and the third coupling. The predetermined threshold may be defined according to the actual needs of a user. In the embodiments of the present disclosure, the predetermined threshold may be 0.02.

Therefore, the wireless charging transmitter is capable of supplying currents to the corresponding transmit coils by the plurality of transmit circuit units, the current of each of the transmit coils generates a corresponding magnetic field, and the plurality of transmit coils simultaneously operate. In this case, the magnetic fields generated by the transmit coils constitute a superimposed magnetic field, and thus the wireless charging transmitter is capable of supplying electric energy to the receive coil by the superimposed magnetic field. In this way, efficiency of wireless transmission of electric energy is improved, such that a better charging experience is achieved.

When a plurality of coils simultaneously operates, the couplings between the transmit coils cause many challenges to the operation of the system. When a plurality of transmit coils simultaneously transmit electric energy, if a relatively strong couplings are present between the plurality of transmit coils, an alternating magnetic field generated by one of the transmit coils may induce voltages on the other transmit coils and a circulating current on the other transmit coils and circuits. Induction of the circulating current, in one aspect, consumes part of power supplied by the transmit coil, and in another aspect, affects the operating state of the other transmit circuits, and lowering efficiency of power conversion. If the coupling between the transmit coil and the receive coil is weak, more power is consumed due to the couplings between the plurality of transmit coils relative to the power transmitted to the wireless charging receiver, or the consumed power is far greater than the power transmitted to the wireless charging receiver, such that efficiency of the wireless transmission of electric energy is lowered. In addition, stronger couplings between the plurality of transmit coils may cause interference to signals in circuit of the wireless charging transmitter, and hence cause difficulties in system control.

Figure 3A:
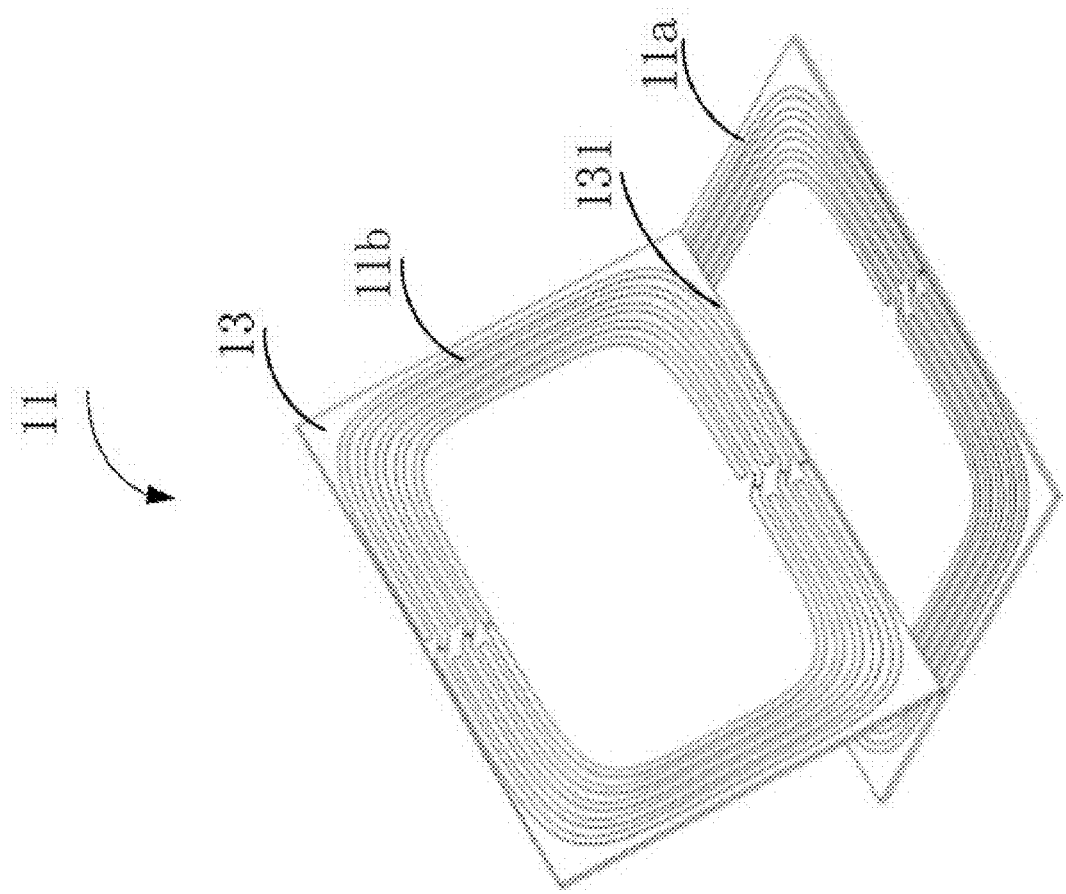
FIG. 3a is a structural diagram of a first planar coil and a second planar coil according to an embodiment of the present disclosure.
Figure 3B:
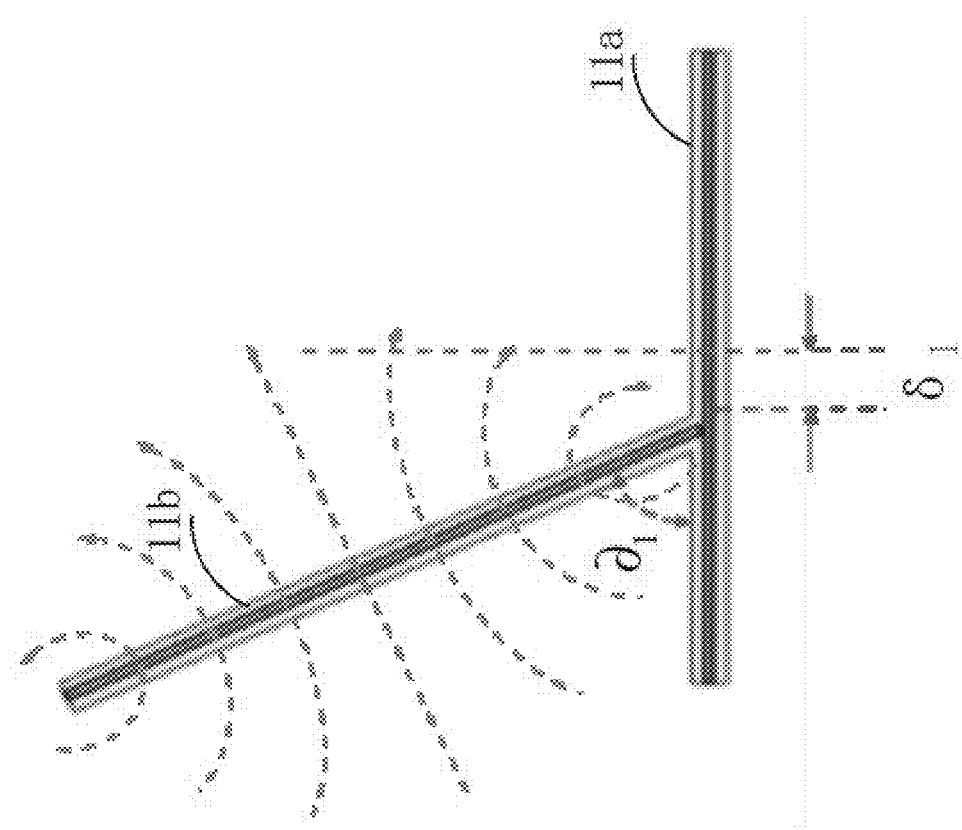

Referring to FIG. 2 to FIG. 14d, in some embodiments, the at least two transmit coils 11 include a first planar coil 11a and a second planar coil 11b. The plane where the first planar coil 11a is arranged is a first plane, and the plane where the second planar coil 11b is arranged is a second plane. The first planar coil 11a is horizontally arranged, and the first plane and the second plane are intersected to form an intersection line 131. The first plane and the second plane may be intersected orthogonal to each other. In some embodiments, a structural diagram of the first planar coil 11a and the second planar coil 11b is as illustrated in FIG. 3a. The first planar coil 11a is intersected with the second planar coil 11b. The second planar coil 11b is arranged on one side of the first planar coil 11a. The two planar coils are mechanically connected by their respective support structures 13 (which are PCBs herein). The intersection line 131 between the two coils is an intersection line between the PCBs. A magnetic field generated by the second planar coil 11b is as illustrated in FIG. 3b. The first plane and the second plane define an included angle $\partial_1$. The distance from the intersection line 131 to the central line of the first planar coil 11a is $\delta_1$. The included angle and the distance $\delta_1$ satisfy a first predetermined relationship. The size and shape of the coil may be defined according to the actual needs of the user. For example, the two planar coils may be rectangular planar transmit coils with a dimension of 200×300 mm. By the above structural design, the orientations of the magnetic fields generated by the two transmit coils form a first angle, such that the two transmit coils collaboratively operate. In the meantime, the coupling coefficient between the transmit coils is less than the predetermined threshold, or even zero coupling is achieved. By the above structural design, the transmit coils may be more flexibly applied in practice. As long as the first predetermined relationship is satisfied, the coupling coefficient between the two transmit coils is less than the predetermined threshold, the self-coupling strength is reduced, the interference is mitigated, and the efficiency of wireless transmission of electric energy is further improved.

In some embodiments, the second planar coil 11b is arranged on one side of the first planar coil 11a, and when the included angle $\partial_1$ and the distance $\delta_1$ satisfy the first predetermined relationship, the magnetic field generated by the current on the second planar coil 11b may have equal total magnetic fluxes that enters and total magnetic fluxes that exits the first planar coil 11a. That is, the net magnetic flux is zero or less than a predetermined threshold. In this way, a mutual inductance between the two transmit coils is less than a predetermined threshold or is even zero, and hence an effect of zero coupling is achieved.

In some embodiments, the first predetermined relationship is:

$$\delta_1/l = -2E\text{-}05\partial_1^3 - 0.0001\partial_1^2 - 0.0097\partial_1 + 17.28 \qquad (1)$$

Figure 4:
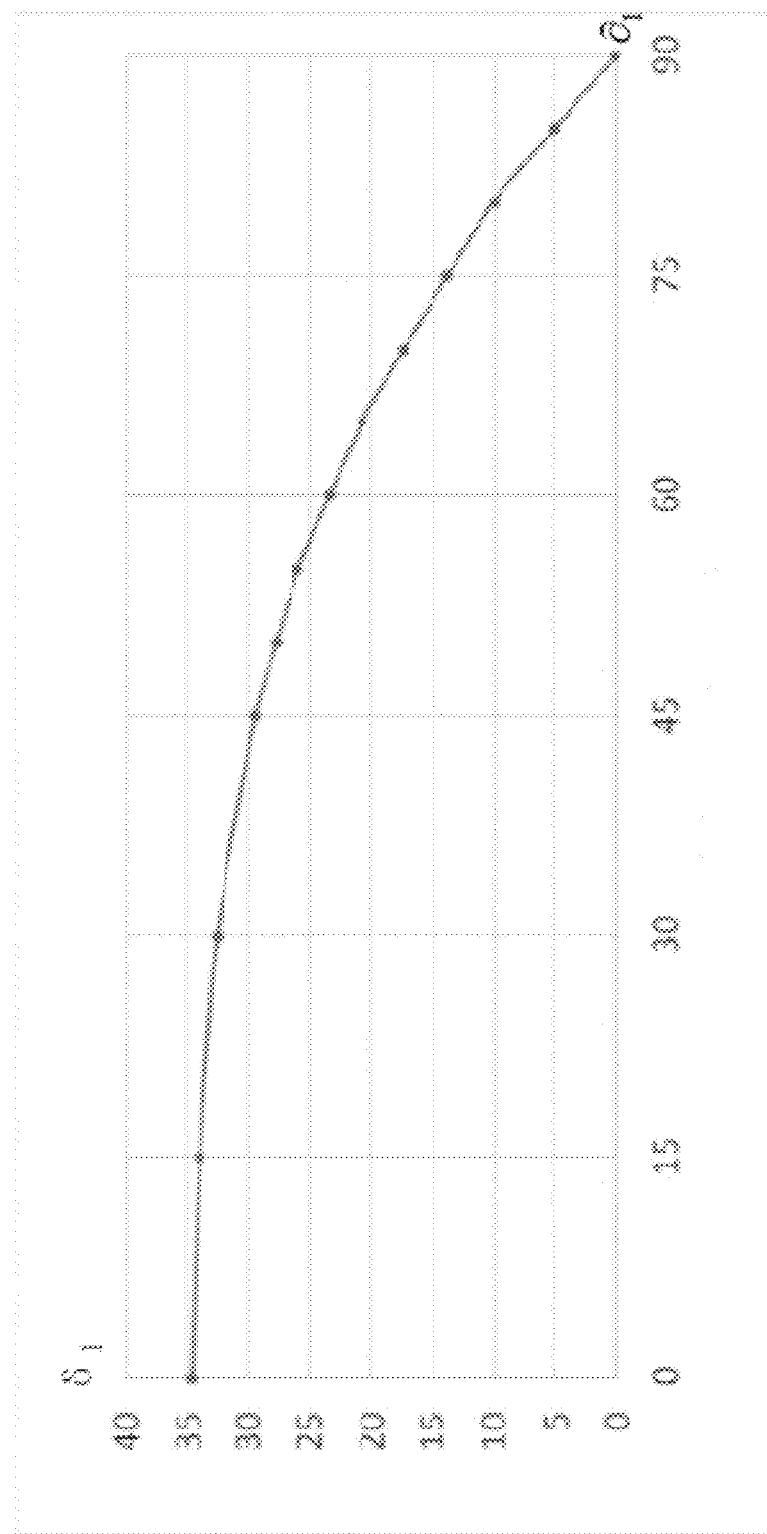
FIG. 4 is a curve illustrating a relationship between an included angle $\partial_1$ and a distance $\delta_1$ according to an embodiment of the present disclosure.

In Equation (1), the included angle $\partial_1$ is a value within an interval (0, 90°], and l is a side length of the first planar coil 11a. (0, 90°] means the angle range is from an angle greater than 0 to an angle less than or equal to 90°. Throughout the description, when define a range of an angle, "(" means an angle is greater than a lower limit of the range. "]" means an angle is less than or equal to an upper limit of the range. ")" means an angle is less than an upper limit of the range. "[" means an angle is greater than or equal to a lower limit of the range. Using two rectangular planar transmit coils with a dimension of 200×300 mm as examples, when the two transmit coils are subject to zero coupling therebetween, a curve depicting the relationship between the included angle $\partial_1$ and the distance $\delta_1$ is as illustrated in FIG. 4. In FIG. 4, the horizontal axis represents the included angle $\partial_1$, and the vertical axis represents the distance $\delta_1$.

Figure 5A:
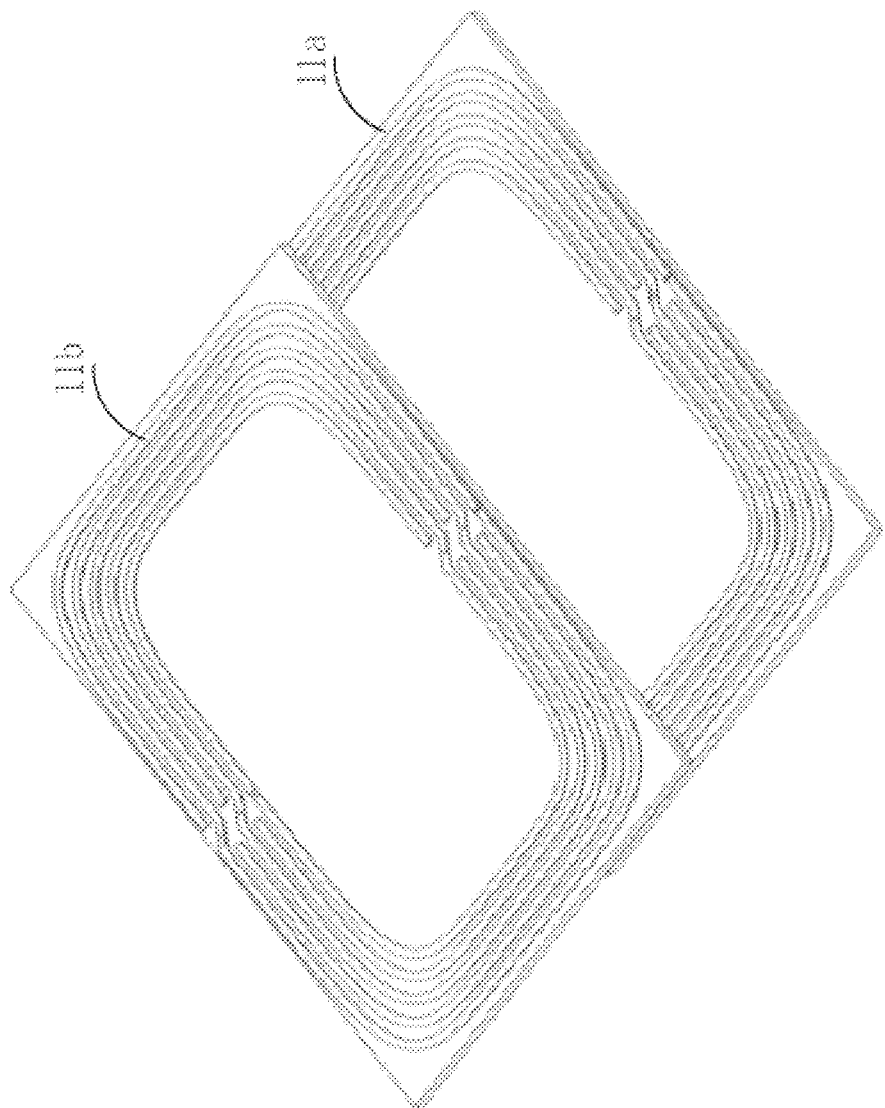
FIG. 5a is a structural diagram of a first planar coil and a second planar coil according to various embodiments of the present disclosure.
Figure 5B:
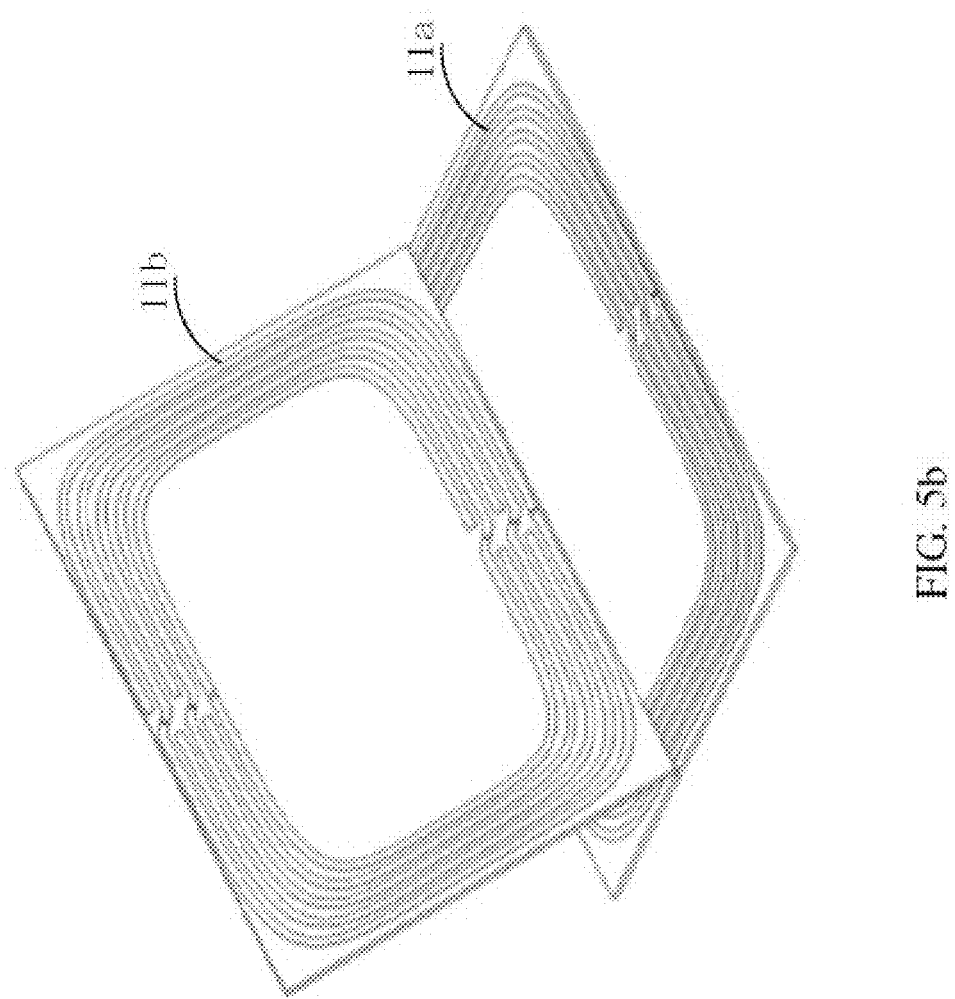
FIG. 5b is a structural diagram of a first planar coil and a second planar coil according to various embodiments of the present disclosure.
Figure 5C:
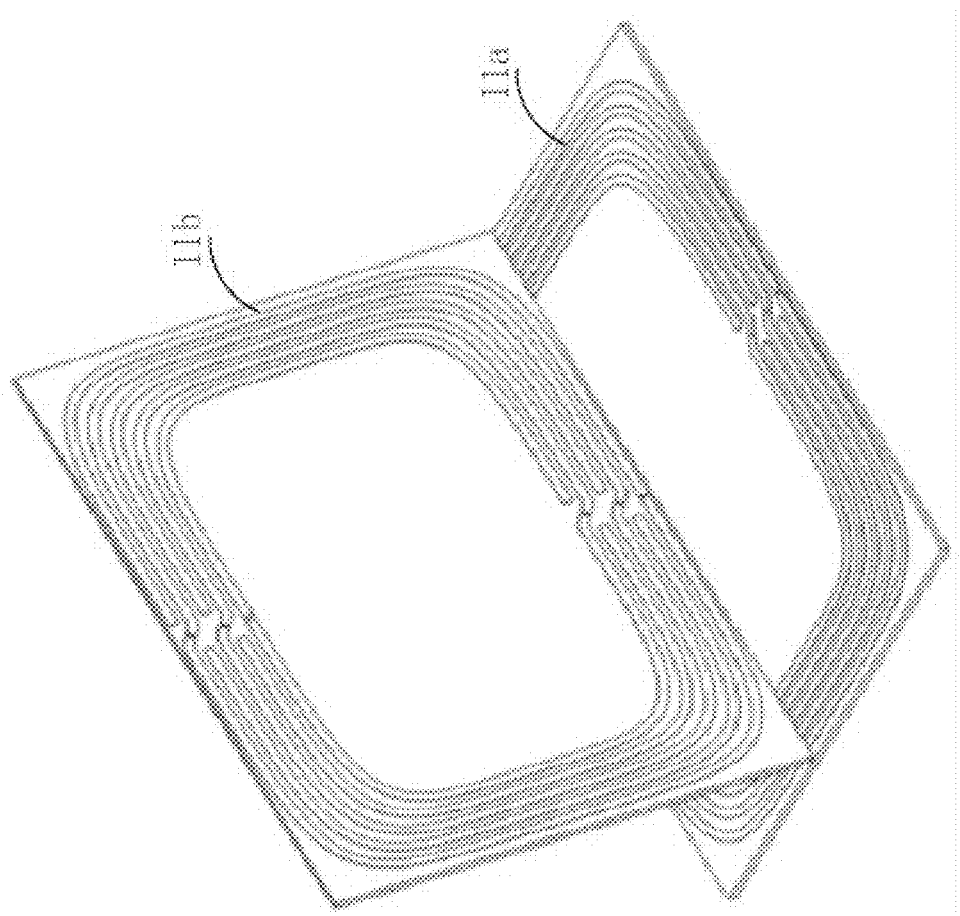
FIG. 5c is a structural diagram of a first planar coil and a second planar coil according to various embodiments of the present disclosure.
Figure 5D:
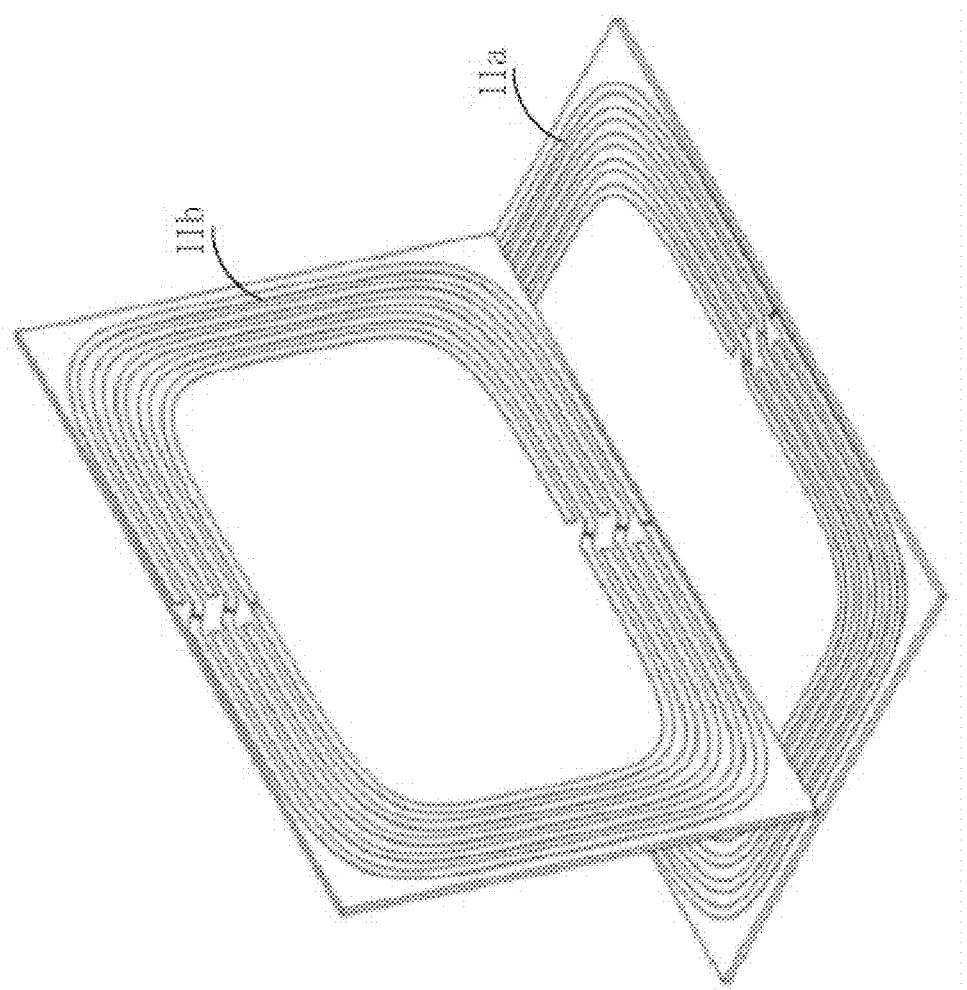
FIG. 5d is a structural diagram of a first planar coil and a second planar coil according to various embodiments of the present disclosure.
Figure 5E:
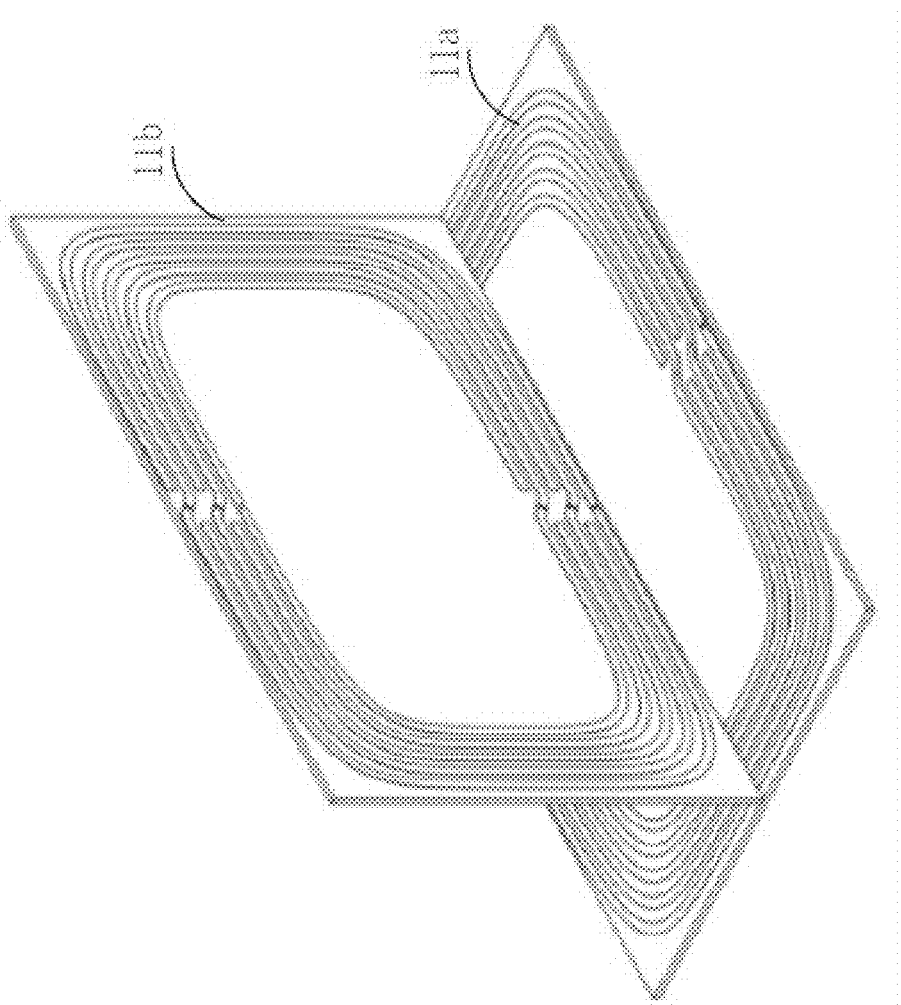
FIG. 5e is a structural diagram of a first planar coil and a second planar coil according to various embodiments of the present disclosure.

A plurality of coil combinations satisfies the first predetermined relationship. Referring to FIG. 5a, when the included angle $\partial_1$ between the first planar coil 11a and the second planar coil 11b approaches zero (that is, the two planar coils are parallel to each other), for zero coupling between two coils, the two transmit coils need to be partially overlapped with each other, and the distance $\delta_1$ is also the maximum distance (about 35 mm) among all the combinations. As the included angle $\partial_1$ between the two transmit coils progressively increases (increasing from 50 degrees in FIG. 5b, to 65 degrees in FIG. 5c, and then to 75 degrees in FIG. 5d), for zero coupling, the distance δ1 progressively decreases until the two coils are orthogonal to each other. As illustrated in FIG. 5e, the coil in a vertical orientation is right on the central line of the horizontal coil. In the combinations illustrated in FIG. 5a to FIG. 5e, not only zero coupling is achieved between the two transmit coils, but also two magnetic field components that are near orthogonal to each other are further provided, such that it is feasible for the two coils to cooperate to control the orientation of the spatial magnetic field and extend the total magnetic field coverage. The coil combinations illustrated herein in FIG. 5a to FIG. 5e are all capable of preventing the circulating current and interference caused when the two transmit coils between two transmit circuit units are coupled and achieving collaborative operation of the two transmit coils. In addition, when a power receiving device (a receiver device), for example, a mobile phone, is placed on a single transmit coil, having a configuration of two transmit coils, one horizontally placed and the other one obliquely placed also caters to the user established usage habits when using a wireless charger to wireless charging a power receiving device.

Figure 6A:
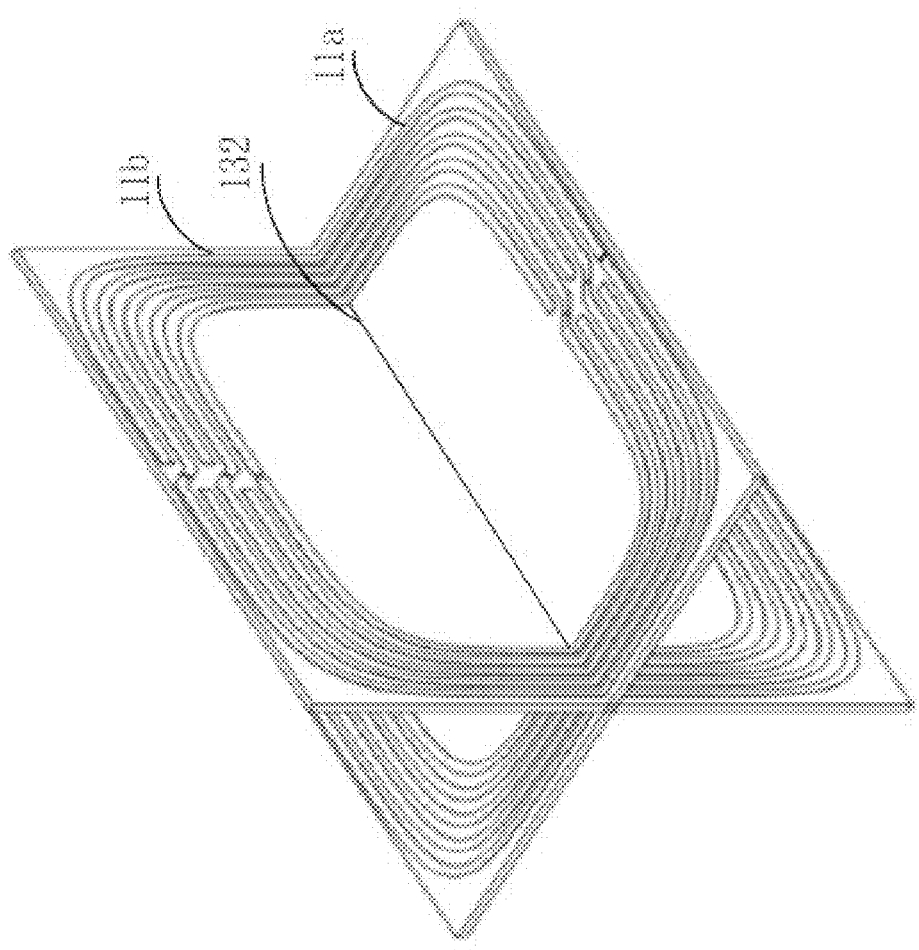
FIG. 6a is a structural diagram of a first planar coil and a second planar coil according to various embodiments of the present disclosure.
Figure 6B:
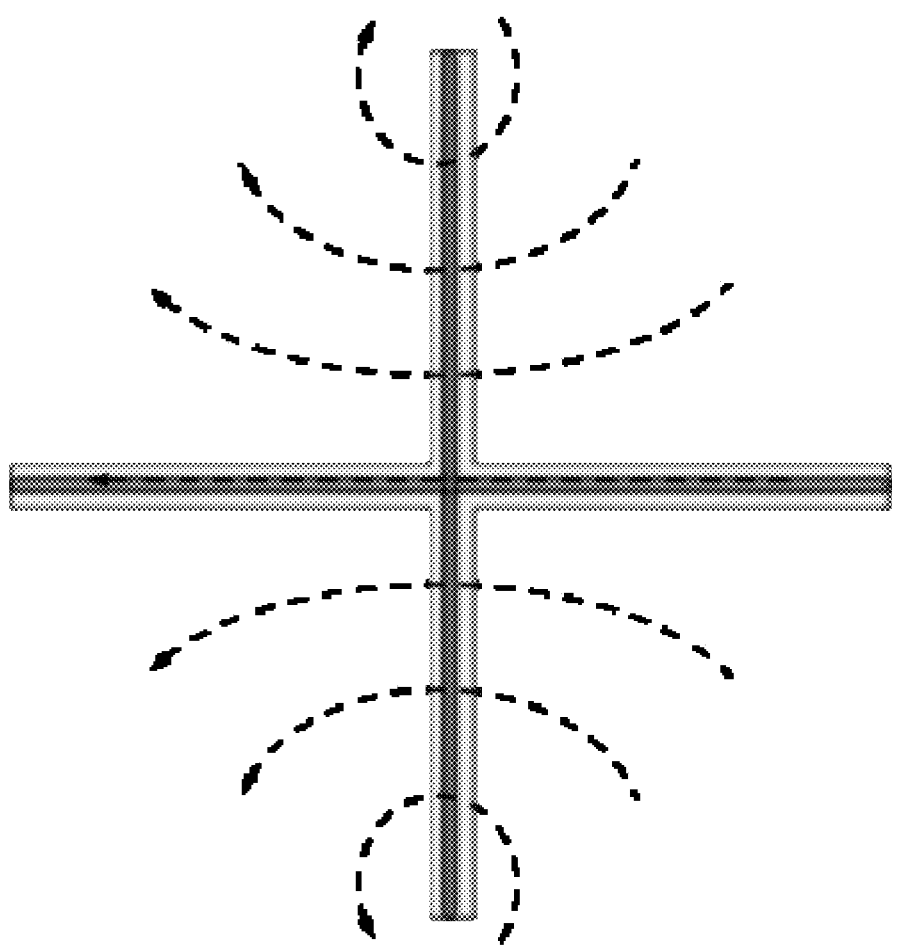

In some embodiments, as illustrated in FIG. 6a, the first plane is crossed with the second plane, the first plane is orthogonal to the second plane, and a cross line 132 is formed at the intersection between the first plane and the second plane. The cross line 132 is coincident with the central line of the first planar coil 11a and/or a central line of the second planar coil 11b. The cross line 132 in the embodiment of the present disclosure is the intersection line 131 in the above embodiment. The cross line 132 may also be parallel to a horizontal plane. In some embodiments, the cross line 132 is vertically arranged relative to the horizontal plane. An illustration of the magnetic field generated by a current flowing through the first planar coil 11a is as illustrated in FIG. 6b. As seen from FIG. 6b, the magnetic field generated by the first planar coil 11a is parallel to the second plane in the vicinity of the second planar coil 11b, that is, the magnetic flux passing through the second plane is zero. Likewise, a magnetic field generated by a current flowing through the second planar coil 11b may not pass through the first plane. Therefore, a mutual inductance between the two transmit coils is zero, thereby achieving zero coupling between the two transmit coils.

Figure 6C:
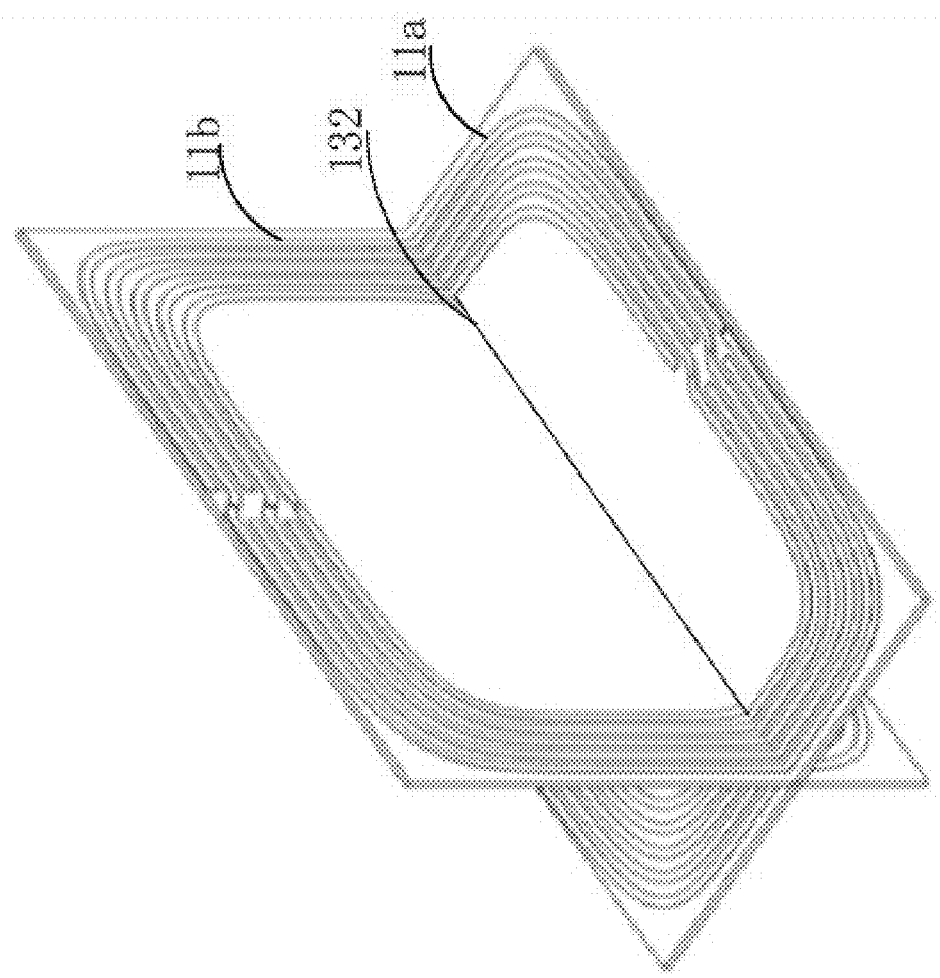
FIG. 6c is a structural diagram of a first planar coil and a second planar coil according to various embodiments of the present disclosure.
Figure 6D:
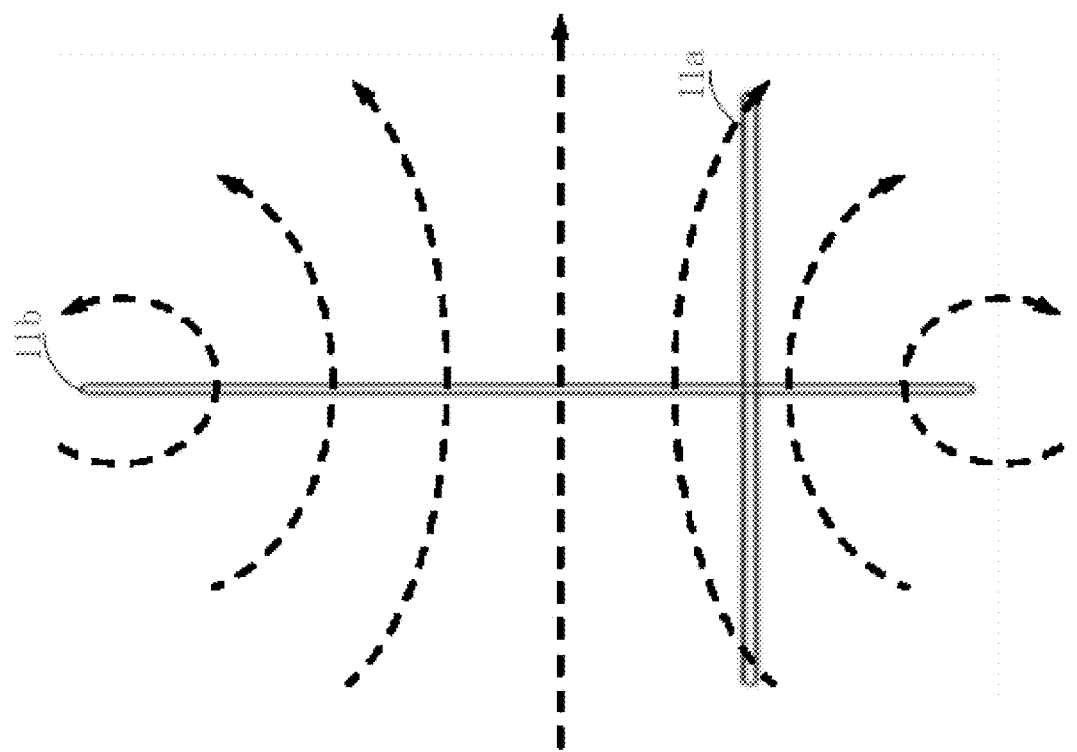
FIG. 6d is an illustration of the magnetic field generated by a current of the second planar coil in FIG. 6c.

In some embodiments, in FIG. 6c, a structure of another transmit coil group with zero coupling is illustrated. The transmit coil group is likewise constituted by the first planar coil 11a and the second planar coil 11b that are orthogonal to each other. However, the difference lies in that the cross line 132 is only on the center line of the first planar coil 11a, but not on the center line of the second planar coil 11b, and the first planar coil 11a deviates from the center line of the second planar coil 11b. In this case, the magnetic field generated by a current flowing through the second planar coil 11b is illustrated in FIG. 6d. Although the cross line 132 is not arranged on the center lines of the first planar coil 11a and the second planar coil 11b simultaneously, because of the close-loop characteristic of the magnetic field, the magnetic field generated by the second planar coil 11b enters the first planar coil 11a on one side of the second planar coil 11b, and a magnetic flux having the same amplitude may exit on the other side of the second planar coil 11b. Therefore, the net magnetic flux of the magnetic field generated by the second planar coil 11b that passes through the firs planar coil 11a is zero, the mutual inductance between the two transmit coils is still zero, thereby achieving zero coupling.

In some application environments, the user imposes higher requirements on aesthetic appeal and concealability (for example, under-table mounting) of the wireless charging transmitters. A novel entirely planar transmit coil group structure is needed such that a plurality of transmit coils can collaboratively operate to achieve a higher position flexibility of wireless charging and such that the coupling coefficient between the transmit coils is less than a predetermined threshold. Therefore, in some embodiments, the at least two transmit coils include a third planar coil 11c and a fourth planar coil 11d. A plane where the third planar coil 11c is arranged is a third plane, and a plane where the fourth planar coil 11d is arranged is a fourth plane. The third plane is parallel to the fourth plane. The fourth planar coil 11d includes a first planar sub-coil 11d1 and a second planar sub-coil 11d2. The coil winding sense of the first planar sub-coil 11d1 is opposite to the coil winding sense of the second planar sub-coil 11d2. By the structural design of the third planar coil 11c and the fourth planar coil 11d, the coupling coefficient between the transmit coils is less than the predetermined threshold.

In some embodiments, the first planar sub-coil 11d1 may be symmetrical to the second planar sub-coil 11d2. In this case, a line of symmetry between the first planar sub-coil 11d1 and the second planar sub-coil 11d2 is aligned with the center line of the third planar coil 11c. The first planar sub-coil 11d1 may also be asymmetrical to the second planar sub-coil 11d2. In this case, a connection line between the first planar sub-coil 11d1 and the second planar sub-coil 11d2 is also not aligned with the central line of the third planar coil 11c.

Figure 7A:
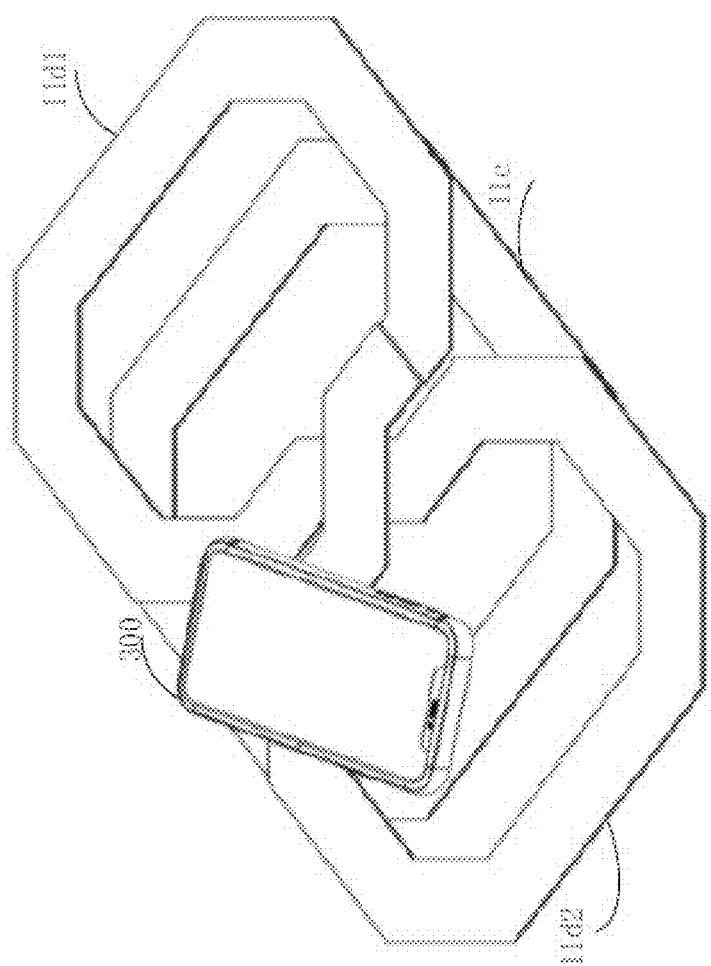
FIG. 7a is a structural diagram of a third planar coil and a fourth planar coil according to various embodiments of the present disclosure.

In some embodiments, referring to FIG. 7a. FIG. 7a illustrates a transmit coil structure according to an embodiment of the present disclosure. Each transmit coil may include a single-turn or a multi-turn coil structure. In FIG. 7a and the structural diagrams in the embodiments hereinafter, the multi-turn coil structure is represented by an outer profile of the multi-turn coil. As illustrated in FIG. 7a, the fourth planar coil 11d is an 8-shaped symmetric structure. That is, the first planar sub-coil 11d1 is clockwise wound, whereas the second planar sub-coil 11d2 is counterclockwise wound. It should be noted that the first planar sub-coil 11d1 may also be counterclockwise wound, whereas the second planar sub-coil 11d2 may also be clockwise wound, as long as winding sense of the two planar sub-coils are opposite to each other. The line of symmetry between the first planar sub-coil 11d1 and the second planar sub-coil 11d2 is aligned with the central line of the third planar sub-coil 11c. With such arrangement, magnetic fluxes generated by the first planar sub-coil 11d1 and the second planar sub-coil 11d2, that enters the third planar coil 11c are substantially equal to the fluxes generated by them that exits the third planar coil 11c, such that a total magnetic flux of the magnetic fields generated by the first planar sub-coil 11d1 and the second planar sub-coil 11d2 on the third planar coil 11c is substantially zero, thereby achieving zero coupling.

Figure 7B:
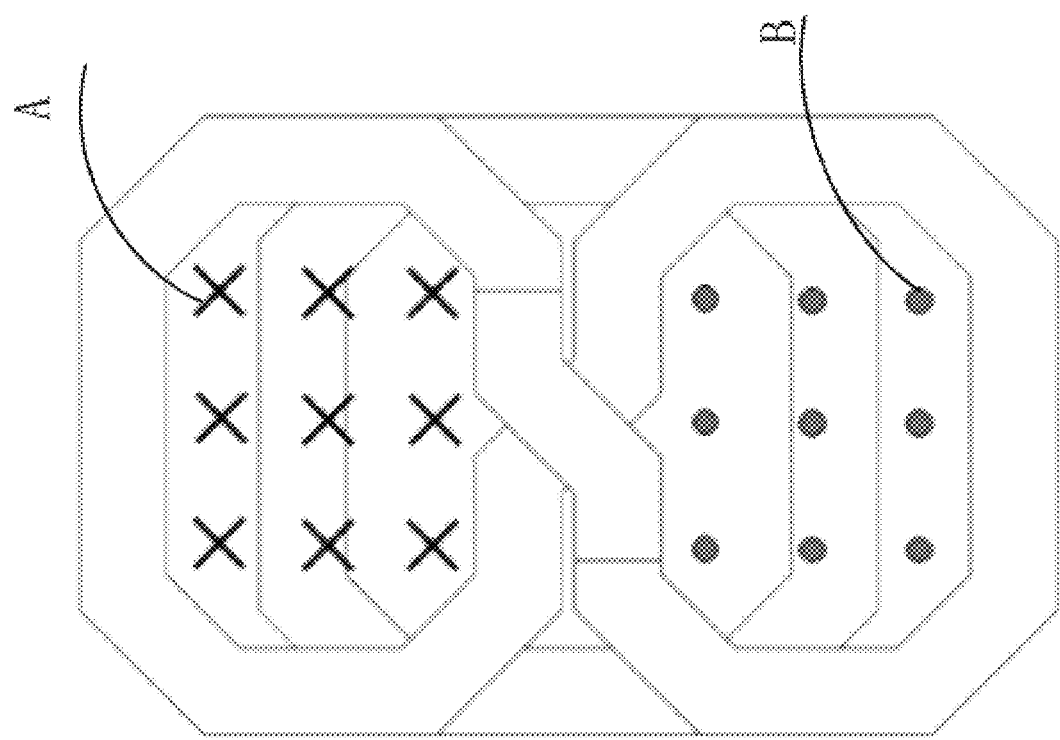
Figure 7C:
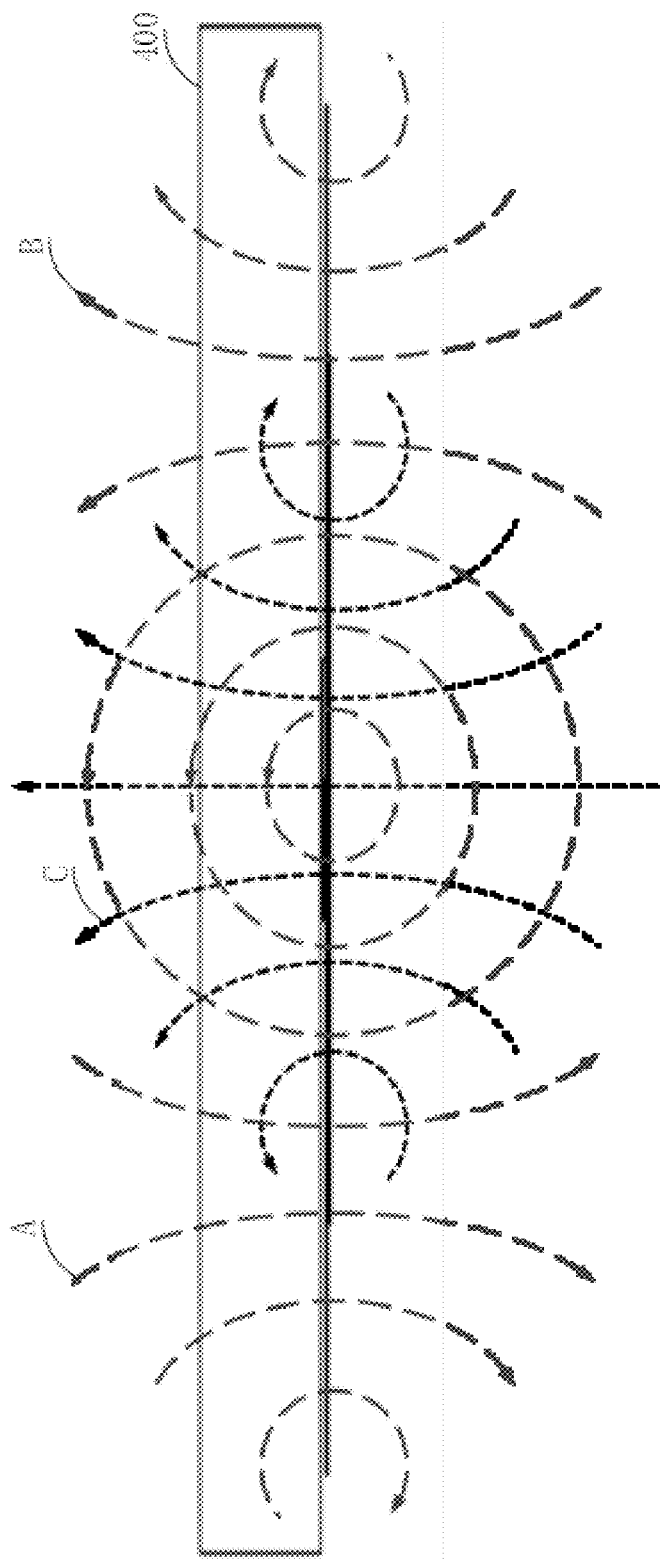

As illustrated in FIG. 7b, when a current flow through the fourth planar coil 11d, two opposite magnetic fields may be generated on the plane of the fourth planar coil 11d. These two magnetic fields are respectively a magnetic field A and a magnetic field B, and these two magnetic fields are perpendicular to the fourth planar coil 11d. As illustrated in FIG. 7c, if the transmit coil 11 of the wireless charging transmitter is arranged on the table 400, the magnetic field A and the magnetic field B are superimposed above the coils to generate a horizontal magnetic field parallel to the planes of the two planar coils. The magnetic field generated by the third planar coil 11c is a magnetic field C, which is approximately orthogonal, in a greater spatial range, to the magnetic field generated by the fourth planar coil 11d. The wireless charging transmitter is capable of controlling the currents supplied to the third planar coil 11c and the fourth planar coil 11d, to adjust the orientation of the superimposed magnetic field generated by the two planar coils. In this way, a plurality of transmit coils can be configured to operate collaboratively in a more effective manner.

The dual-transmit coil structure as illustrated in FIG. 7a to FIG. 7c is suitable to a scenario where a user orientation is relatively fixed during interaction between the user and the smart terminal 300, for example, a desk or the like. The user is generally seated along a fixed orientation, and a rotation range of the smart terminal 300 (for example, a mobile phone) around the axis perpendicular to the plane of the coil is limited. In a scenario where the user orientation is not fixed during interaction between the user and the smart terminal 300, for example, a coffee table or the like, the user may be seated around the coffee table. In this case, a multi-transmit coil structure capable of supporting 360-degree wireless charging is needed.

Figure 8A:
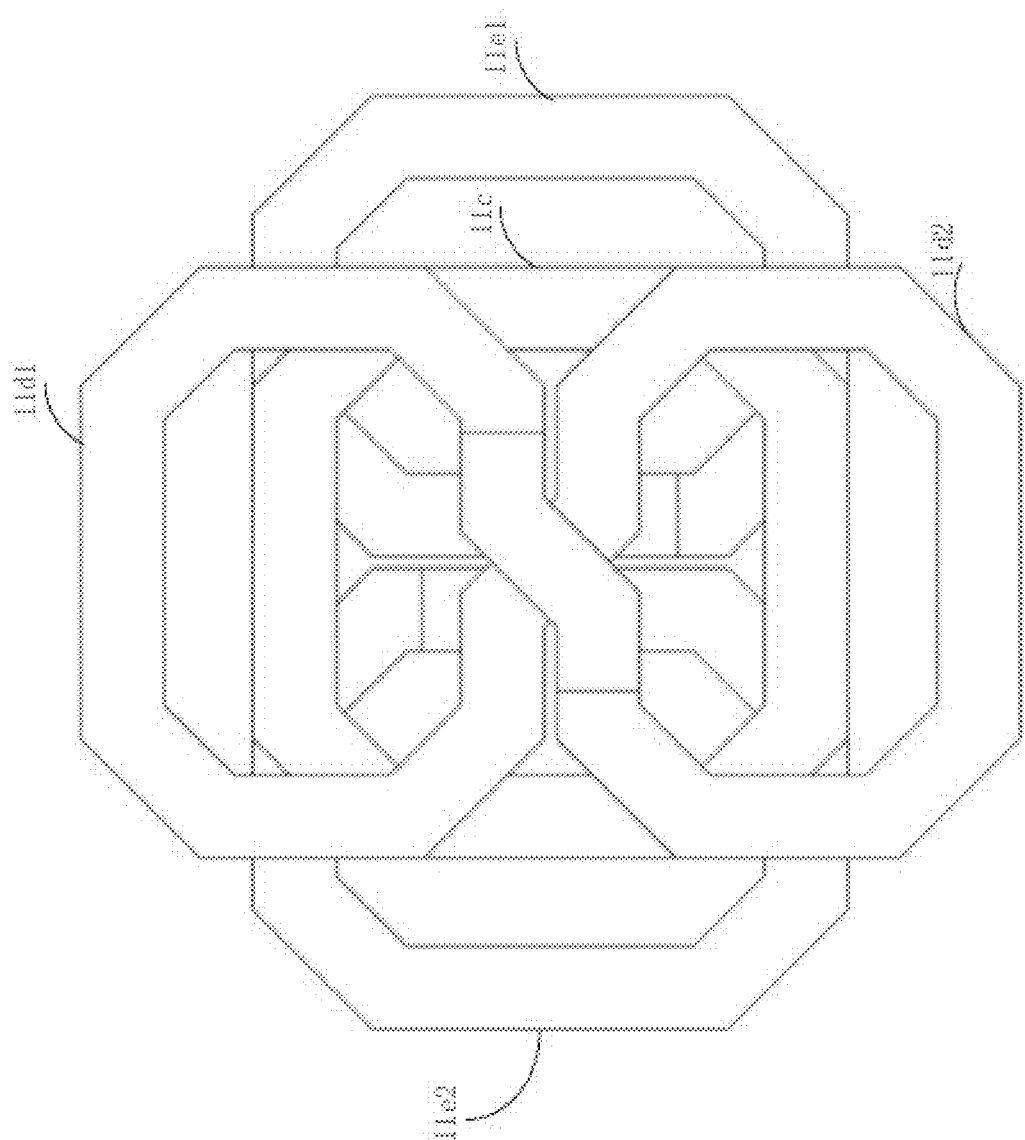
FIG. 8a is a structural diagram of a third planar coil, a fourth planar coil, and a fifth planar coil according to an embodiment of the present disclosure.

In some embodiments, in order to achieve a multi-transmit coil structure that is capable of supporting 360-degree wireless charging and ensuring that the coupling coefficient between the transmit coils is less than a predetermined threshold, referring to FIG. 8a, based on FIG. 7a, the at least two transmit coils further include a fifth planar coil 11e. The plane where the fifth planar coil 11e is arranged is a fifth plane. The fifth planar coil 11e further includes a third planar sub-coil 11e1 and a fourth planar sub-coil 11e2. The coil winding sense of the third planar sub-coil 11e1 is opposite to the coil winding sense of the fourth planar sub-coil 11e2. The fifth planar coil 11e is also an 8-shaped symmetrical structure. The fifth plane is parallel to both the third plane and the fourth plane. The fifth planar coil 11e is further orthogonal to the fourth planar coil 11d. The center point of the third planar coil 11c is on a line of symmetry of the fifth planar coil 11e. Coil winding senses of the two symmetrical structures of the fifth planar coil 11e are opposite to each other. If the fourth planar coil 11d is vertically arranged, the fifth planar coil 11e is horizontally arranged relative to the fourth planar coil 11d. The fourth planar coil 11d and the fifth planar coil 11e in the coil group generate a horizontal magnetic field and a vertical magnetic field respectively at the center position of the coil group, which is near orthogonal to the magnetic field, generated by the third planar coil 11c, which is perpendicular to the third plane. Therefore, the total magnetic flux generated by the fifth planar coil 11e that passes through the third planar coil 11c is substantially zero, thereby achieving zero coupling. Likewise, since the fifth planar coil 11e is structurally symmetrical, and the center lines of the fifth planar coil 11e and the center line of the fourth planar coil 11d are orthogonal to each other, total magnetic fluxes generated by the fifth planar coil 11e that enters the fourth planar coil 11d and the total magnetic fluxes generated by the fifth planar coil 11e that exits the fourth planar coil 11d are substantially equal. Therefore, zero coupling is also present between the two 8-shaped planar coils in the transmit coil group. The added horizontal 8-shaped fifth planar coil 11e is capable of providing a horizontal magnetic field component on top of the dual-transmit coil system in FIG. 7a, so as to achieve 360-degree wireless charging. In addition, the coupling coefficients between the transmit coils are less than the predetermined threshold, or even zero coupling is achieved between the transmit coils. In this way, substantially low circulating currents are generated or interferences are caused between the transmit circuit units, such that the transmit circuit units substantially operate independently, and thus the efficiency of wireless transmission of electric energy is improved.

Figure 8B:
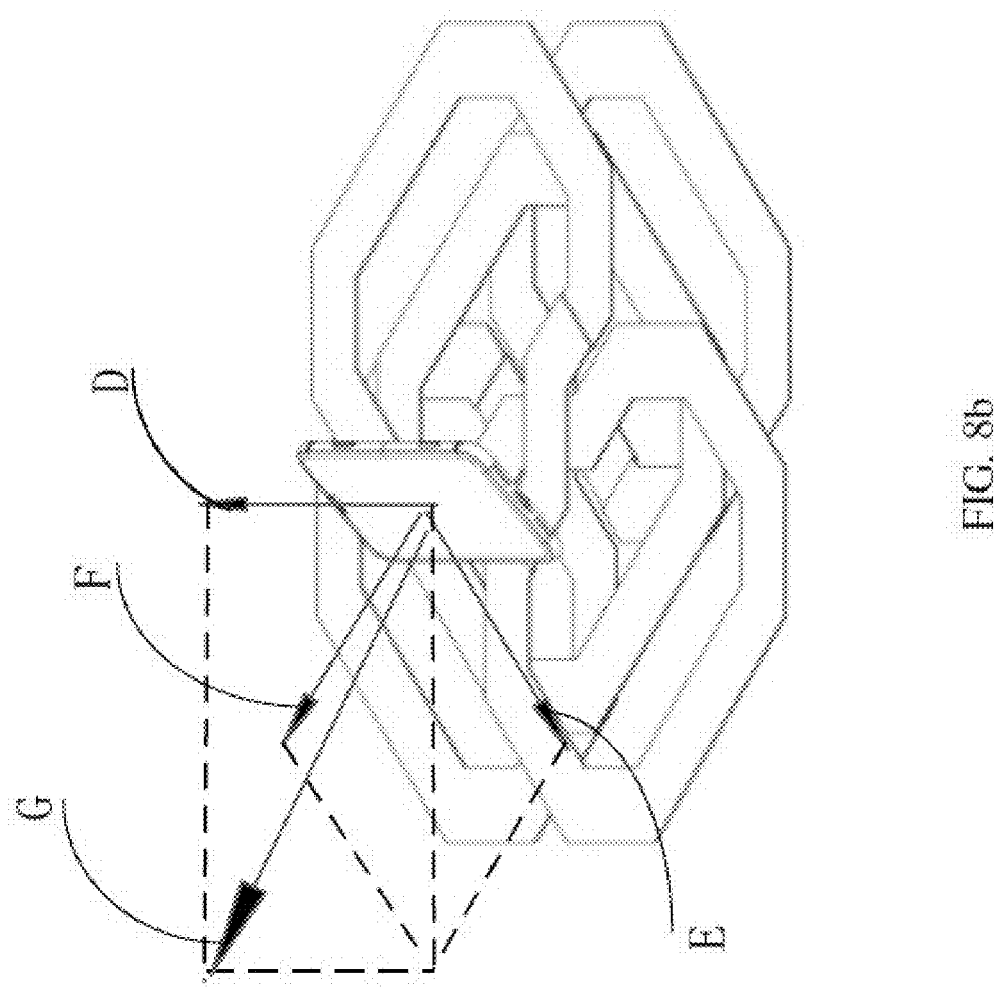

The three planar coils in the transmit coil group as illustrated in FIG. 8a generate three magnetic fields that are near orthogonal to each other above the plane of the coils, and the coils are decoupled from each other (zero coupling between the coils). In such a coil group structure, the coils may be simultaneously driven by three transmit circuit units to operate collaboratively, which achieves a higher position flexibility of wireless charging. As illustrated in FIG. 8b, the wireless charging transmitter is mounted under the circular table 400 (not shown). When the user holds the smart terminal 300 (for example, the mobile phone) and operates the mobile phone in the vicinity of the table 400 with a posture illustrated in FIG. 8b, a receive coil (not illustrated) of a wireless charging receiver is coupled, to some extents, to the three transmit coils. The magnetic field D generated by the third planar coil 11c at the spatial position of the mobile phone is near perpendicular to the table 400, and the magnetic field E generated by the fourth planar coil 11d at the spatial position of the mobile phone is near parallel to the table 400, and a magnetic field F generated by the fifth planar coil 11e at the spatial position of the mobile phone is near parallel to the table 400 and is near perpendicular to the magnetic field E generated by the fourth planar coil 11d. When the three transmit coils simultaneously operate and generate the same magnetic field, the magnetic fields at a spatial position of the receiver device are superimposed to generate a stronger magnetic field G that is near perpendicular to the receive coil. The magnetic field G has a greater amplitude over the magnetic fields (D, E, and F) generated by these individual coils, and may better match with the receive coil in terms of orientation. In this way, stronger couplings are achieved. Under a collaborative effect of the stronger magnetic field and stronger couplings, the system achieves a higher transmission efficiency of electric energy. As described above, the spatial magnetic fields generated by the three transmit coils are near orthogonal to each other within a large range in the vicinity of the coils. When the receiver device appears, in any spatial posture, at any spatial position in the vicinity of the table 400 under which the third planar coil 11c, the fourth planar coil 11d, and the fifth planar coil 11e are arranged, the wireless charging transmitter may adjust the superimposed magnetic field by adjusting each of the magnetic fields, such that relative to operation of a single coil, a larger wireless charging range is achieved, and more spatial postures of the receiver device are supported. Furthermore, zero coupling between the transmit coils substantially reduce the circulating currents on coils and interferences between the transmit circuit units, such that the transmit circuit units are able to operate independently.

Figure 8C:
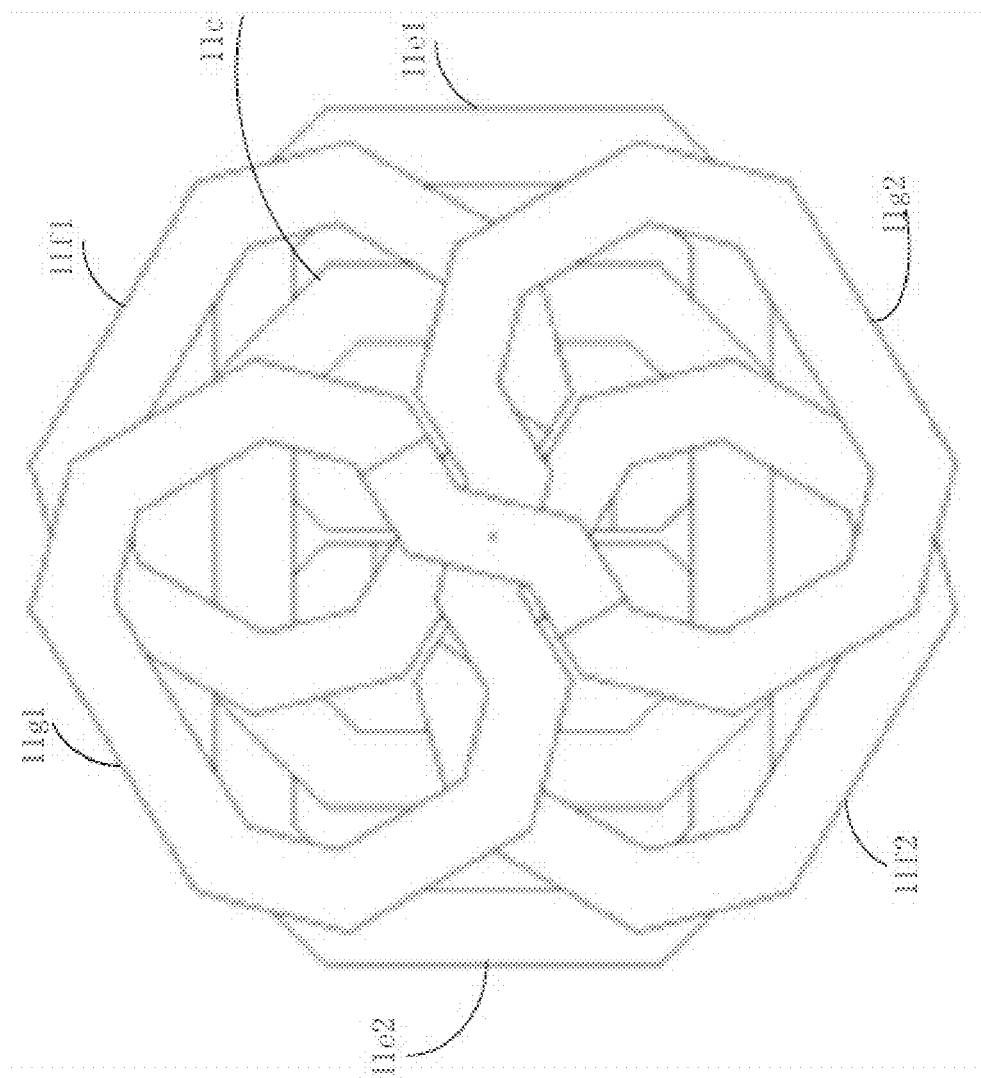
FIG. 8c is a structural diagram of a third planar coil, a fourth planar coil, a sixth planar coil, and a seventh planar coil according to an embodiment of the present disclosure.

In some embodiments, referring to FIG. 8c, the at least two transmit coils further include a sixth planar coil 11f and a seventh planar coil 11g. A plane where the sixth planar coil 11f is arranged is a sixth plane, and a plane where the seventh planar coil 11g is arranged is a seventh plane. The sixth planar coil 11f includes a fifth planar sub-coil 11f1 and a sixth planar sub-coil 11f2. The seventh planar coil 11g includes a seventh planar sub-coil 11g1 and an eighth planar sub-coil 11g2. The winding sense of the fifth planar sub-coil 11f1 is opposite to the winding sense of the sixth planar sub-coil 11f2, and the winding sense of the seventh planar sub-coil 11g1 is opposite to the winding sense of the eighth planar sub-coil 11g2. The fifth planar sub-coil 11f1 and the sixth planar sub-coil 11f2 are both 8-shaped symmetrical structure. The seventh planar sub-coil 11g1 and the eighth planar sub-coil 11g2 are both 8-shaped symmetrical structure. The sixth plane is parallel to both the third plane and the fourth plane. The seventh plane is parallel to the third plane, the fourth plane, and the sixth plane. The sixth planar coil 11f, the seventh planar coil 11g, and the fourth planar coil 11d are arranged in an array, and any two adjacent coils of the fourth planar coil 11d, the sixth planar coil 11f, and the seventh planar coil 11g are partially overlapped. The center point of the third planar coil 11c is on the line of symmetry between the sixth planar coils 11f and seventh planar coils 11g. By controlling the sizes of the sub-coils of the fourth planar coil 11e, the sixth planar coil 11f, and the seventh planar coil 11g, overlapping between the adjacent sub-coils is controlled. Under a particular size, zero coupling is achieved between two adjacent and overlapped sub-coils. For example, in FIG. 8c, the fifth planar sub-coil 11f1 of the sixth planar coil 11f is adjacent to and overlapped with the seventh planar sub-coil 11g1 of the seventh planar coil 11g. Under a particular size, the total magnetic flux of the magnetic field generated by the fifth planar sub-coil 11f1 of the sixth planar coil 11f passes through the seventh planar sub-coil 11g1 of the seventh planar coil 11g is substantially zero, thereby achieving zero coupling. Likewise, since the sixth planar coil 11f and the seventh planar coil 11g are structurally symmetrical, zero coupling is also achieved between the sixth planar sub-coil 11f2 of the sixth planar coil 11f and the eighth planar sub-coil 11g2 of the seventh planar coil 11g. Therefore, zero coupling is also achieved between the sixth planar coil 11f and the seventh planar coil 11g in the transmit coil group. The three 8-shaped coils generate arrayed magnetic fields parallel to the plane of the coils, such that the 360-degree wireless charging is achieved. In addition, the coupling coefficients between the transmit coils are less than the predetermined threshold, or even zero coupling is achieved between the transmit coils. In this way, substantially low circulating currents are generated or interferences are caused between the transmit circuit units, such that the transmit circuit units operate substantially independently, and thus efficiency of wireless transmission of electric energy is improved.

Figure 9A:
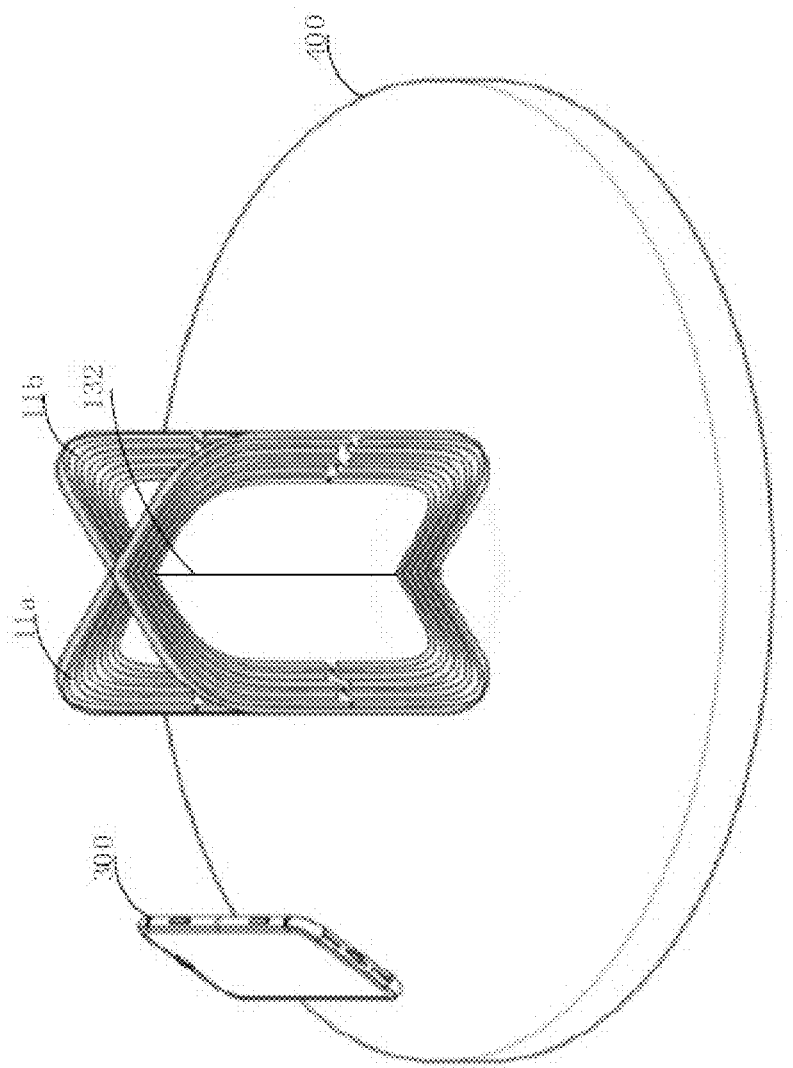
FIG. 9a is a structural diagram of a first planar coil and a second planar coil according to various embodiments of the present disclosure.

In some embodiments, when the first planar coil 11a is orthogonal to the second planar coil 11b, if the cross line 132 (that is, an orthogonal intersection line) between the first planar coil 11a and the second planar coil 11b is vertically arranged relative to the horizontal plane, as illustrated in FIG. 9a, the transmit coil system of the wireless charging transmitter is constituted by the first planar coil 11a and the second planar coil 11b that are vertically arranged and orthogonal to each other, and the cross line 132 is vertically arranged relative to the horizontal plane, then the two transmit coils are capable of respectively supplying magnetic fields perpendicular to their respective planes. That is, the first planar coil 11a is capable of supplying a magnetic field perpendicular to the first plane, and the second planar coil 11b is capable of supplying a magnetic field perpendicular to the second plane. In addition, the center line of the first planar coil 11a is aligned with the center line of the second planar coil 11b. By the above structural design, zero coupling may be achieved between the transmit coils. The first planar coil 11a and the second planar coil 11b may be arranged inside the cylindrical housing 14, which is placed on the table 400. Regardless of by which angle the user takes the smart terminal 300 (for example, the mobile phone) into the wireless charging range of the wireless charging transmitter from the periphery of the table 400, the smart terminal 300 may be wirelessly charged with a high efficiency.

Figure 9B:
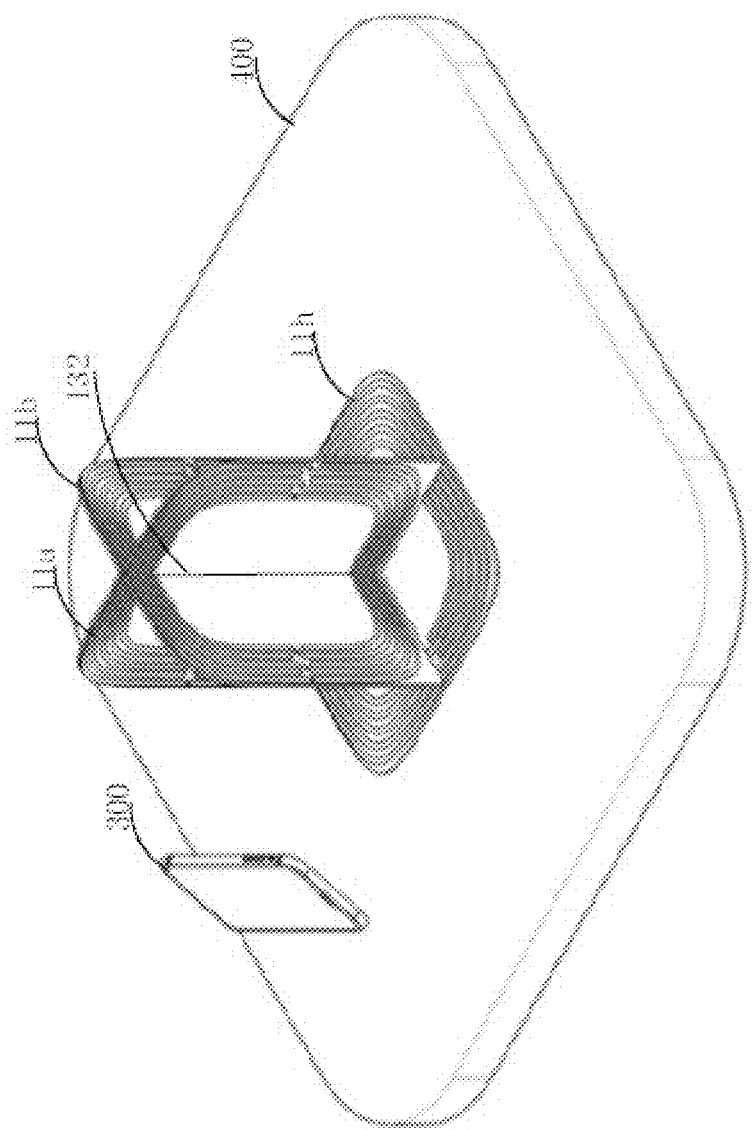
FIG. 9b is a structural diagram of a first planar coil, a second planar coil, and an eighth planar coil according to various embodiments of the present disclosure.
Figure 9C:
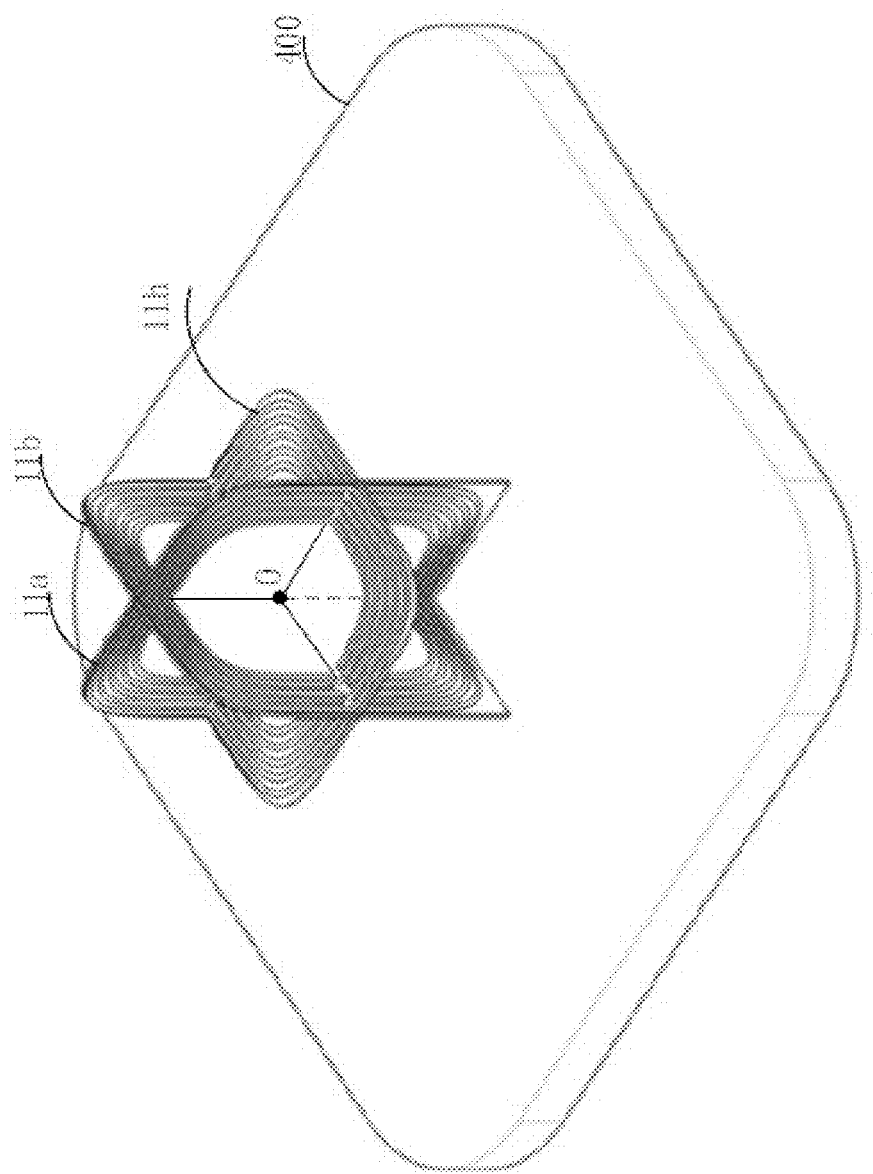
FIG. 9c is a structural diagram of a first planar coil, a second planar coil, and an eighth planar coil according to various embodiments of the present disclosure.

In some embodiments, the at least two transmit coils further include an eighth planar coil 11h, wherein a plane where the eighth planar coil is arranged is an eighth plane. The eighth plane is orthogonal to both the first plane and the second plane. A center of the eighth planar coil 11h is on the cross line 132. The eighth planar coil 11h is capable of moving upward and downward along the cross line 132. However, the center of the eighth planar coil 11h is constantly maintained on the cross line 132, and the eighth planar coil 11h is constantly orthogonal to the first plane and the second plane. In an embodiment, as illustrated in FIG. 9b, the eighth planar coil 11h is arranged at bottoms of the first planar coil 11a and the second planar coil 11b, and the outer diameter of the eighth planar coil 11h may be equal to the outer diameter of the first planar coil 11a and the outer diameter of the second planar coil 11b In the system, the three transmit coils are capable of operating collaboratively, thereby achieving a table-top transmitter implementing a 360-degree wireless charging function. Based on the above structural design of the transmit coils, in addition to zero coupling between the first planar coil 11a and the second planar coil 11b, zero coupling may also be achieved between the first planar coil 11a and the eighth planar coil 11h, and zero coupling may also be achieved between the second planar coil 11b and the eighth planar coil 11h. The first planar coil 11a, the second planar coil 11b, and the eighth planar coil 11h respectively supply magnetic fields perpendicular to their respective coil planes, and three independently controllable magnetic fields that are near orthogonal to each other are generated in the vicinity of the wireless charging transmitter. As illustrated in FIG. 9c, the eighth planar coil 11h is arranged in the vicinity of a longitudinal center point O of the first planar coil 11a and the second planar coil 11b. In this case, the magnetic fields generated by the three transmit coils are orthogonal to each other in the vicinity of the wireless charging transmitter. Relative to the structure as illustrated in FIG. 9b, such an orthogonal relationship causes a larger magnetic field range. In this way, on the premise of achieving 360-degree wireless charging in the periphery of the table 400, better coupling is also achieved between the transmit coils and the smart terminal 300 (for example, the mobile phone) placed above the wireless charging transmitter.

Figure 9D:
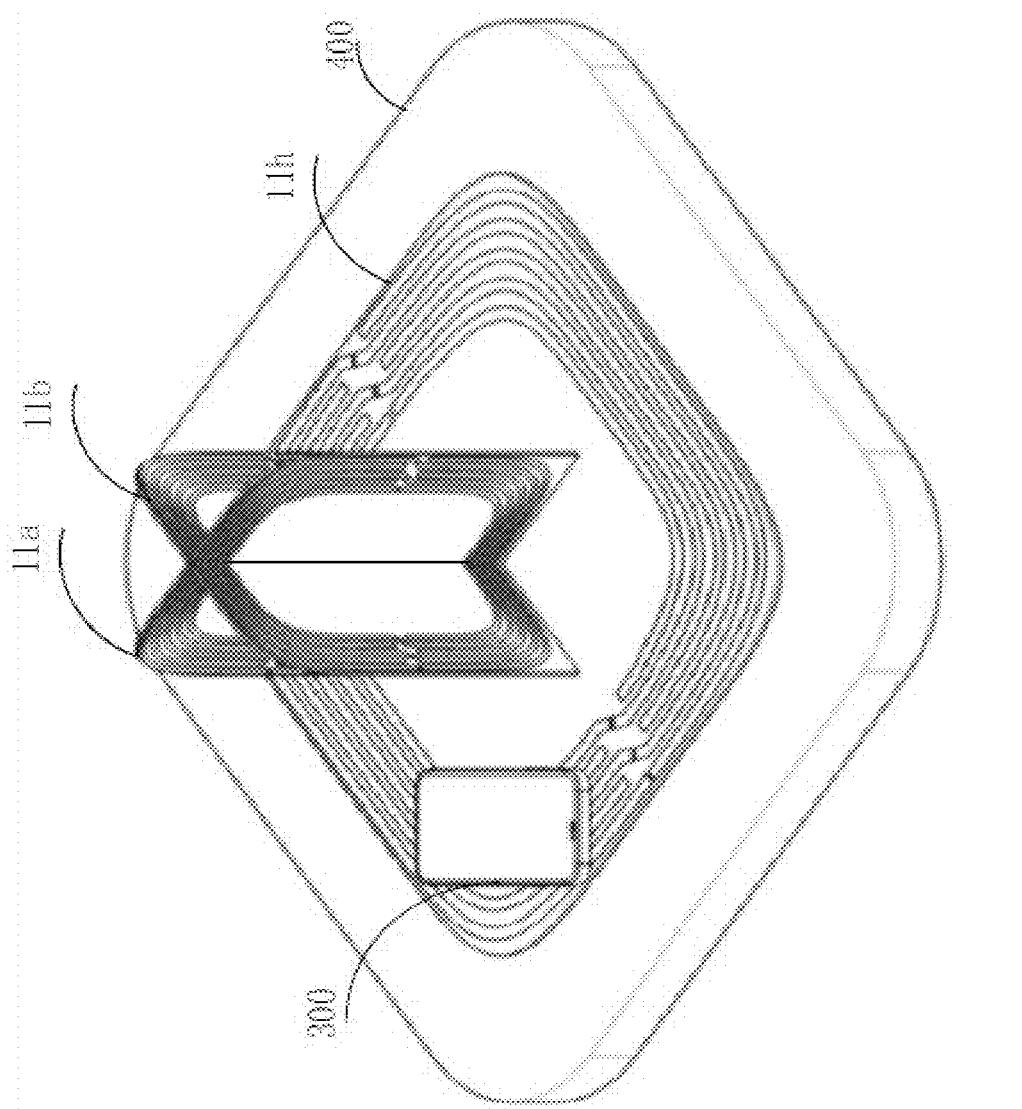
FIG. 9d is a structural diagram of a first planar coil, a second planar coil, and an eighth planar coil according to various embodiments of the present disclosure.

In some embodiments, the outer diameter of the eighth planar coil 11h is greater than the outer diameter of the first planar coil 11a and the outer diameter of the second planar coil 11b. As illustrated in FIG. 9d, the eighth planar coil 11h is maintained at the center position based on FIG. 9b, and may be scaled along the eighth plane. Since the center line of the eighth planar coil 11h is also coincident with the center line of the first planar coil 11a and the second planar coil 11b that are vertically arranged, that is, coincident with the orthogonal cross line, zero coupling is still achieved therebetween. Enlargement of the eighth planar coil 11h achieves the following merits. In one aspect, the coverage range of the longitudinal magnetic field perpendicular to the table 400 is expanded, and thus a wireless charging distance in the vicinity of the transmit coil group 11 is increased. In another aspect, the expanded planar coil better supports user preferences developed by the user over long period of time, that is placing the smart terminal 300 (for example, the mobile phone) horizontally on a wireless charger product for wireless charging.

Figure 10A:
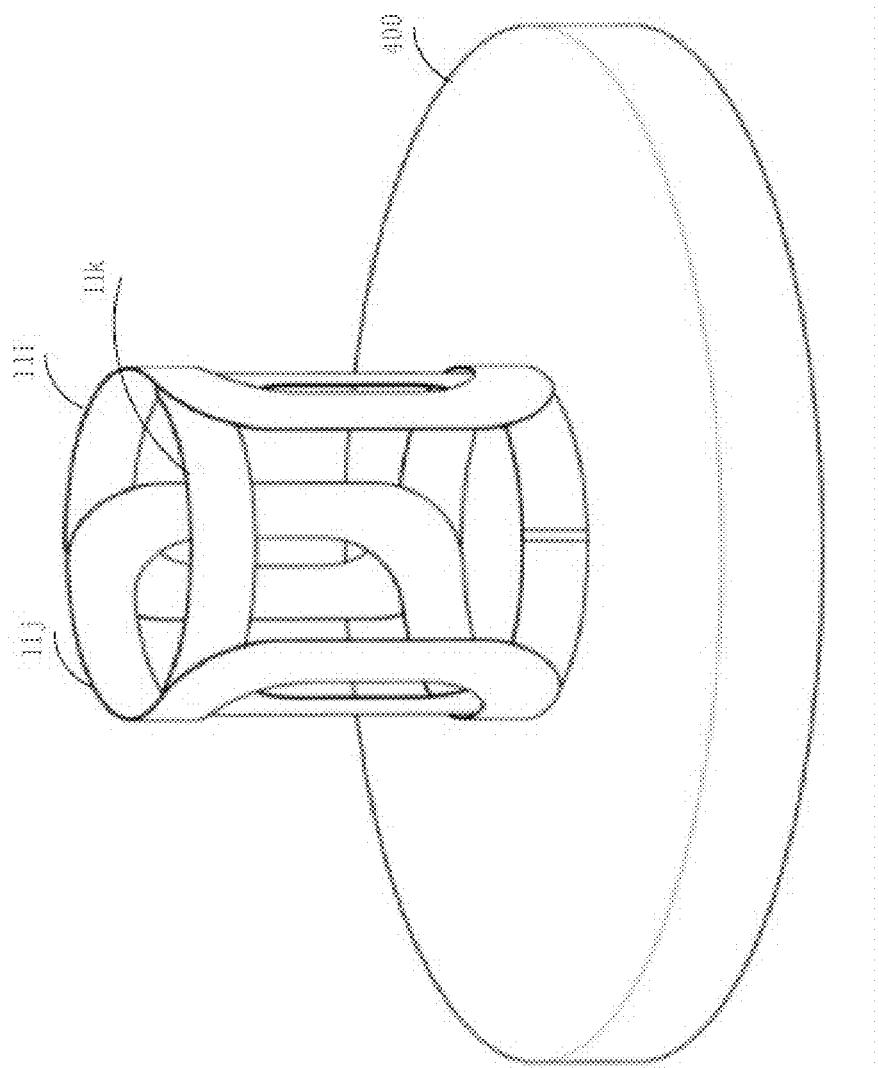
FIG. 10a is a structural diagram of a first curved coil, a second curved coil, and a third curved coil according to various embodiments of the present disclosure.
Figure 10B:
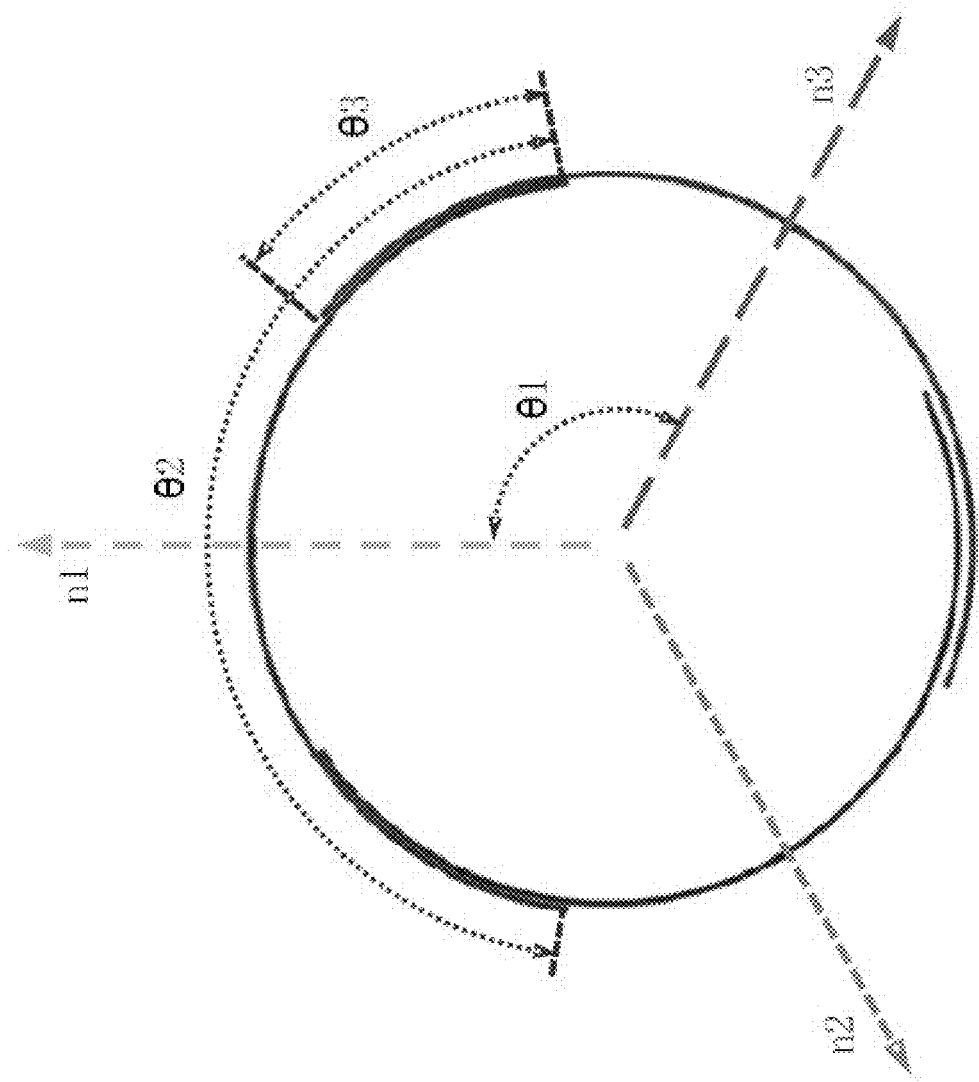

Although the table-top multi-coil wireless charging transmitter in FIG. 9a to FIG. 9d accommodates the basic needs of orthogonal magnetic fields and zero coupling for collaborative operation of the transmit coils, in practice, the wireless charging distance may be further optimized. The wireless charging distance of the multi-coil structure in FIG. 9a to FIG. 9d is affected by the distance from the center of the coil to the surface of the transmitter. If the housing 14 of the multi-coil transmitter is chosen as a cylindrical structure or a cuboid structure depending on the outer profile of the coil structure, in practice, a shortest distance from the power receiving device of the user to the center of the coils of the transmitter may be half of the width of the coils. Such a distance greatly reduces the coupling strength between the transmit coils and the coil in the receiver device. Therefore, for optimization of the table-top multi-coil transmitter structure to achieve a higher position flexibility of wireless charging during the collaborative operation of the transmit coils, in some embodiments, the at least two transmit coils include three curved coils, wherein the three curved coils collaboratively define a revolving structure, and any two adjacent curved coils in the three curved coils are overlapped along a circumferential orientation of the revolving structure. In some embodiments, as illustrated in FIG. 10a, the revolving structure is a cylindrical structure, and the three curved coils are arranged in an array around an axial line of the cylindrical structure. The three curved coils may include a first curved coil 11i, a second curved coil 11j, and a third curved coil 11k. With such arrangement of coils, the transmit coils may be closer, as much as possible, to the housing 14 of the transmitter, such that the distance between the transmit coil group 11 and the smart terminal 300 is minimized. In this way, stronger coupling between the transmit coils and the receive coil 21 may be achieved. In FIG. 10a, the structure and size of each of the transmit coils are similar, and the transmit coils are exploded as planar coils which are similar to rectangular structures. Each of the transmit coils may include a single-turn or multi-turn coil structure having the same winding sense. In FIG. 10a and the structural diagrams in the embodiments hereinafter, the multi-turn coil structure is represented by an outer profile of the multi-turn coil. As illustrated in FIG. 10b, the three curved transmit coils are equally spaced apart along a periphery of the cylinder, and normal vectors corresponding to centers of the curved coils are as illustrated by n1, n2, and n3 in FIG. 10b. It may be noted that any two normal vectors define an angle θ1, wherein the angle θ1 is 120 degrees. However, the angle θ2 of a sector of the surface of the cylinder covered by the length of each coil exceeds 120 degrees, and may be 168 degrees. This signifies that any two curved coils of the three curved transmit coils are approximately equally overlapped, and an overlapped portion in FIG. 10b is represented by an angle θ3. As illustrated in the top view diagram, the included angle θ3 of the overlapped portion is 48 degrees. Specifically, the angle θ2 and the angle θ3 may be defined according to the actual design of the coils. However, the angles θ2 and θ3 shall be defined in such a way that zero coupling is achieved between any two coils of the three transmit coils.

Figure 10C:
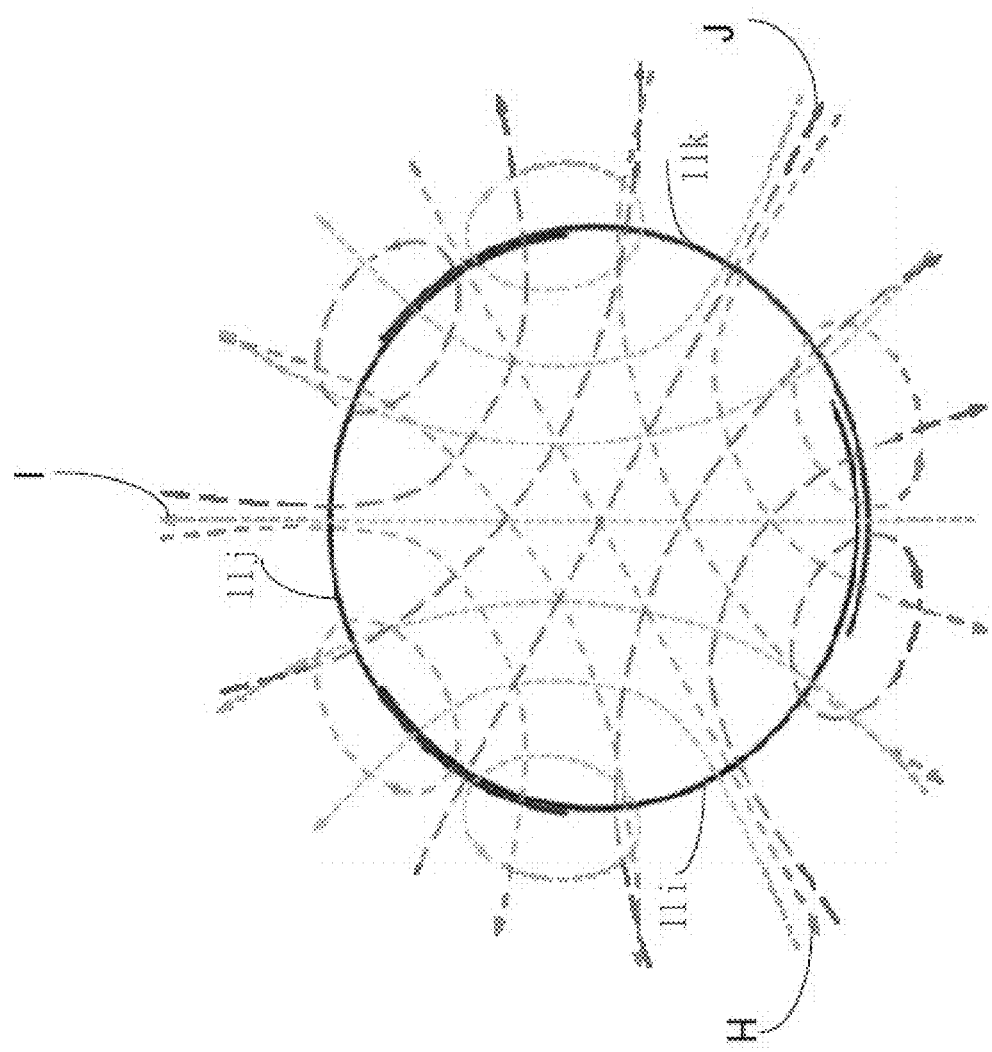

As illustrated in FIG. 10c, the three curved coils, under in-phase current excitation, generate magnetic fields, and the distribution of these magnetic fields is illustrated in FIG. 10c. The magnetic field generated by the first curved coil 11i is a magnetic field H, the magnetic field generated by the second curved coil 11j is a magnetic field I, and the magnetic field generated by the third curved coil 11k is a magnetic field J. Using the second curved coil 11j as an example, as seen from FIG. 10c, in majority of the regions, the magnetic field I passes through the curved plane where the third curved coil 11k is arranged from exterior to interior. However, since the second curved coil 11j and the third curved coil 11k have a partially overlapped region (the region defined by the angle θ3 in FIG. 10b). In this partially overlapped region, the magnetic field I generated by the second curved coil 11j passes through the curved plane where the third curved coil 11k is arranged in an opposite direction, that is from interior to exterior. The portion (in area) of the third curved coil 11k where the magnetic field I penetrates from exterior to interior is large. However, since that portion of the third curved coil 11k is far away from the second curved coil 11j, strength of the magnetic field I in the proximity of that portion of the third curved coil 11k is weak. As a result, the total magnetic flux of the magnetic field I that penetrates the third curved coil 11k from exterior to interior is not high. On the contrary, the portion (in area) of the third curved coil 11k, where the magnetic field I penetrates from interior to exterior is small. However, since the strength of the magnetic field I in the vicinity of the windings around the second curved coil 11j is the strongest, a total magnetic flux of the interior-to-exterior magnetic field I in the third curved coil 11k is not low. Where the overlapped portion of curved coils is the angle θ3, exterior-to-interior and interior-to-exterior magnetic fluxes generated by the second curved coil 11j on the third curved coil 11k are equal and offset each other. In this case, zero coupling is achieved between the second curved coil 11j and the third curved coil 11k. Likewise, in the transmitter system of these three curved coils, an overlapped portion by the angle θ3 between a group of coils may be found, such that zero coupling is achieved between any two coils. Since the magnetic fields generated by the three transmit coils are not parallel to each other (when the orientations of the magnetic fields generated by the three curved transmit coils define an angle of approximately 120 degrees, an independently controllable orthogonal magnetic field component may be generated), and zero coupling is achieved between any two transmit coils. As described above, two or three transmit coils may be simultaneously driven such that these coils collaboratively operate to supply power to the smart terminal 300.

By the above structural design of the three curved coils, the coupling coefficient between the transmit coils is less than the predetermined threshold, or even zero coupling is achieved between the transmit coils. In this way, the efficiency of wireless transmission electric energy is improved. In addition, since the three curved coils are uniformly arranged along the surface of the cylinder, suitable combinations are available for the generated spatial magnetic fields around the cylinder. In this way, 360-degree wireless charging along the surface of the curved coils is achieved for the receiver device. In combination with a plurality of transmit circuit units, the system is capable of adjusting the orientations of the total magnetic fields in the vicinity of the receiver device, such that a greater wireless charging distance over operation of a single coil is achieved, and more spatial postures of the receiver device are supported.

Figure 11A:
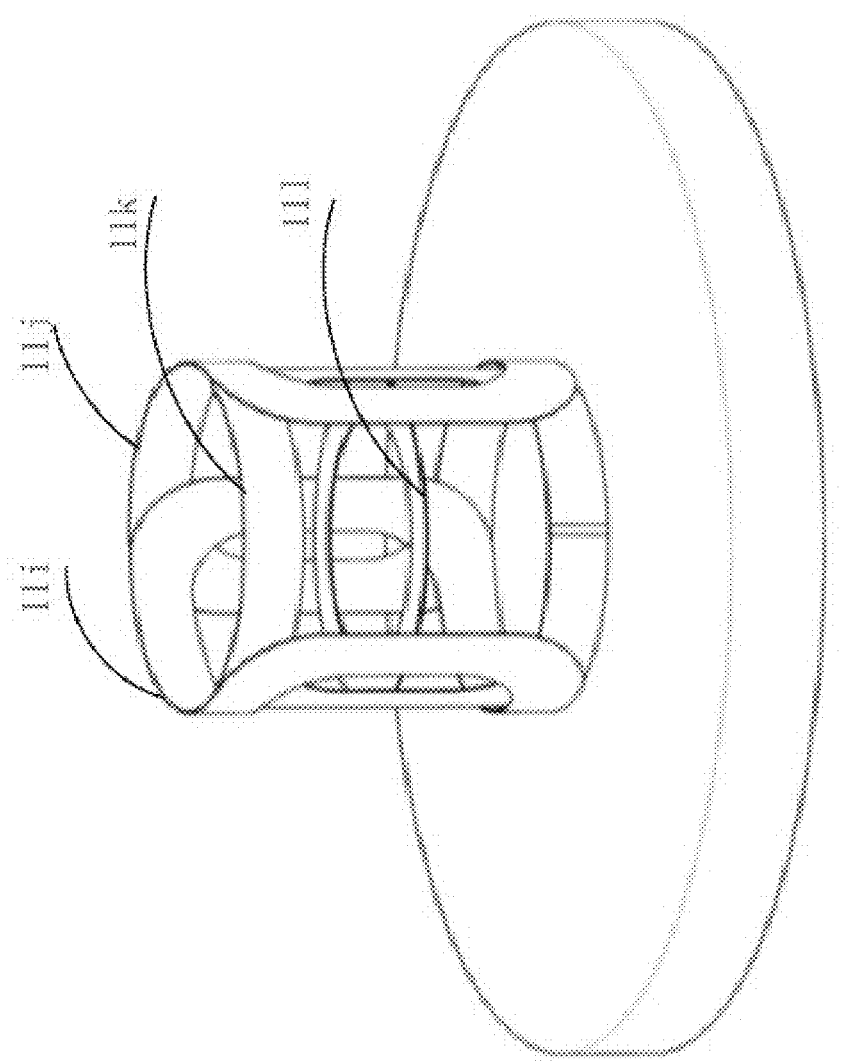
FIG. 11a is a structural diagram of a first curved coil, a second curved coil, a third curved coil, and a ninth planar coil according to various embodiments of the present disclosure.

In some embodiments, based on the transmit coil structure as illustrated in FIG. 10a, likewise, more spatial postures of the smart terminal 300 may also be supported by adding orthogonal coils. The at least two transmit coils further include a ninth planar coil 11l, wherein a plane where the ninth planar coil 11l is arranged is a ninth plane. The ninth plane is orthogonal to an axial line of the revolving structure, and the center of the ninth planar coil 11l is on the axial line of the revolving structure. The ninth planar coil 11l is capable of moving upward and downward along the axial line of the revolving structure. However, the ninth planar coil 11l is constantly orthogonal to the revolving structure. In some embodiments, horizontal central lines of the first curved coil 11i, the second curved coil 11j, and the third curved coil 11k are all on the ninth plane, and each coil structure of the wireless charging transmitter is as illustrated in FIG. 11a.

Figure 11B:
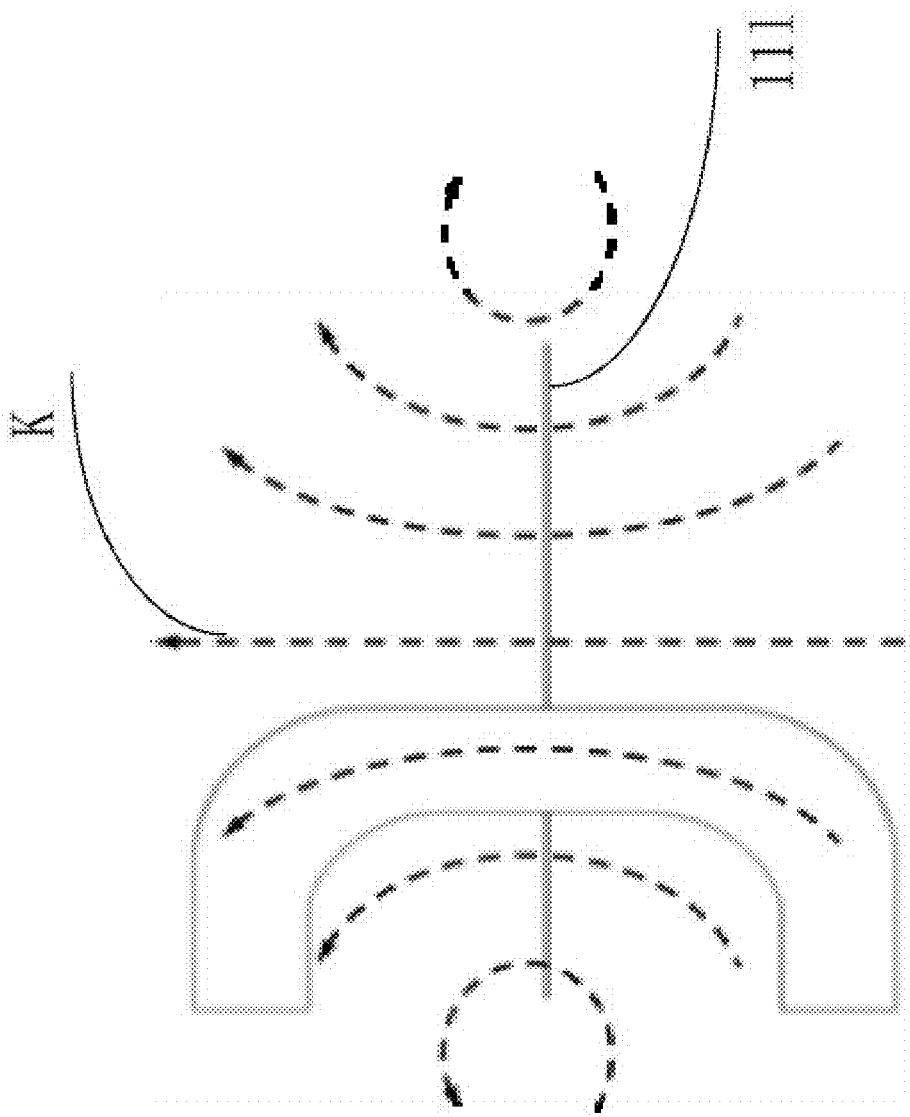

A magnetic field K generated by the ninth planar coil 11l is as illustrated in FIG. 11b. Since the ninth planar coil 11l is arranged along the horizontal central lines of the curved coils, a total magnetic flux when the magnetic field K generated by the current of the ninth planar coil 11l passes through any of the vertical curved coils is zero, and only one curved coil is illustrated in FIG. 11b. As described above, by combination, these three curved coils are capable of collaboratively operating to supply any magnetic field component along the table 400 (that is, parallel to the ninth plane). In combination with a longitudinal magnetic field component perpendicular to the table 400 (that is, perpendicular to the ninth plane) that is generated by the ninth planar coil 11l, four independently controllable magnetic fields covering three orthogonal orientations of a Cartesian coordinate system may be generated in the vicinity of the transmit coil group. In an embodiment of the present disclosure, the system with four transmit coils may be arranged in the housing which is approximately a cylinder, and placed on the table 400. Regardless of by which angle the user takes the mobile phone from the periphery of the table 400 into the wireless charging range of the wireless charging transmitter (including placing the mobile phone on a top face of the housing 14), the coupling coefficients between the four transmit coils of the wireless charging transmitter may be less than the predetermined threshold, or even zero coupling may be achieved. In this way, the mobile phone may be wirelessly charged with a high efficiency.

Figure 11C:
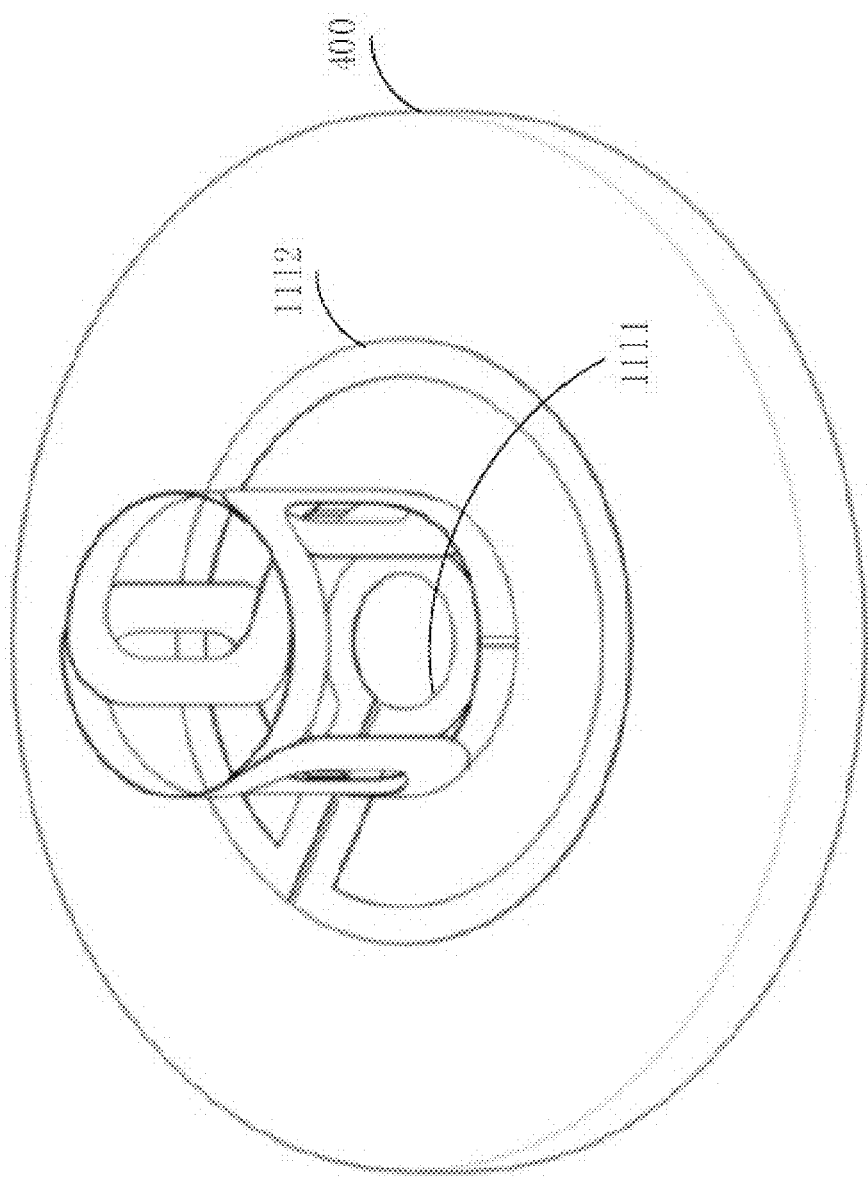
FIG. 11c is a schematic diagram of a first curved coil, a second curved coil, a third curved coil, and a ninth planar coil according to various embodiments of the present disclosure.
Figure 11D:
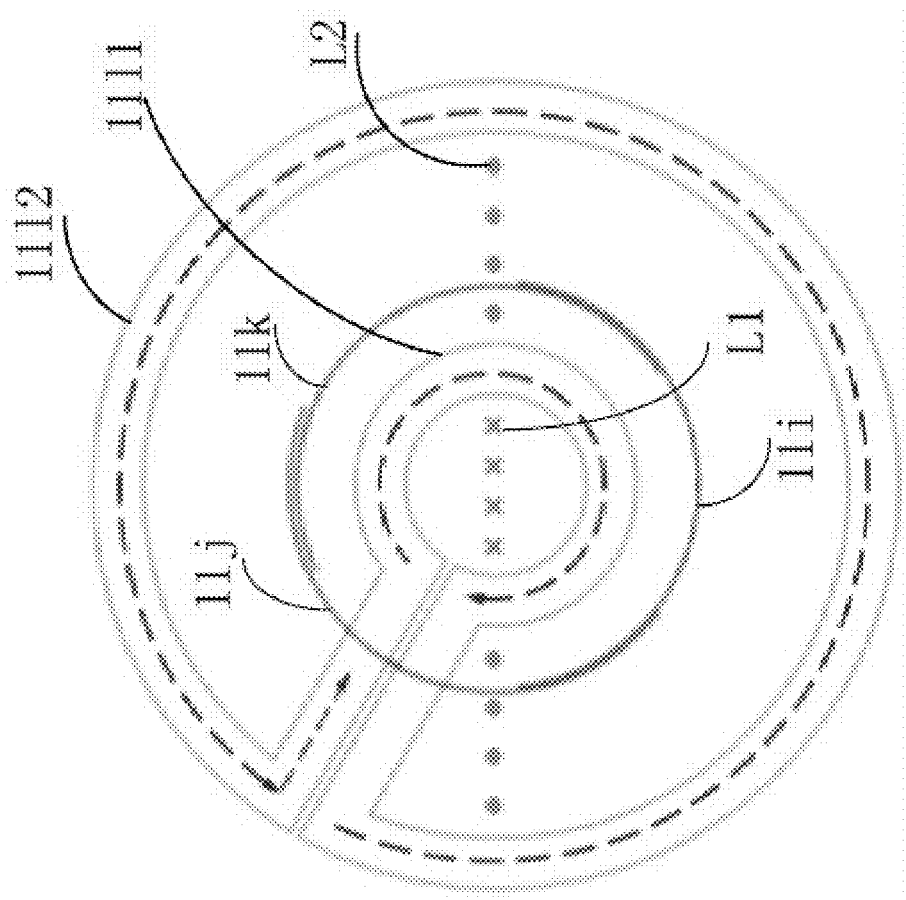
FIG. 11d is a diagram of current flows of inner and outer sub-coils of the ninth planar coil and illustration of magnetic fields generated by currents of the inner and outer sub-coils of the ninth planar coil in FIG. 11c.
Figure 11E:
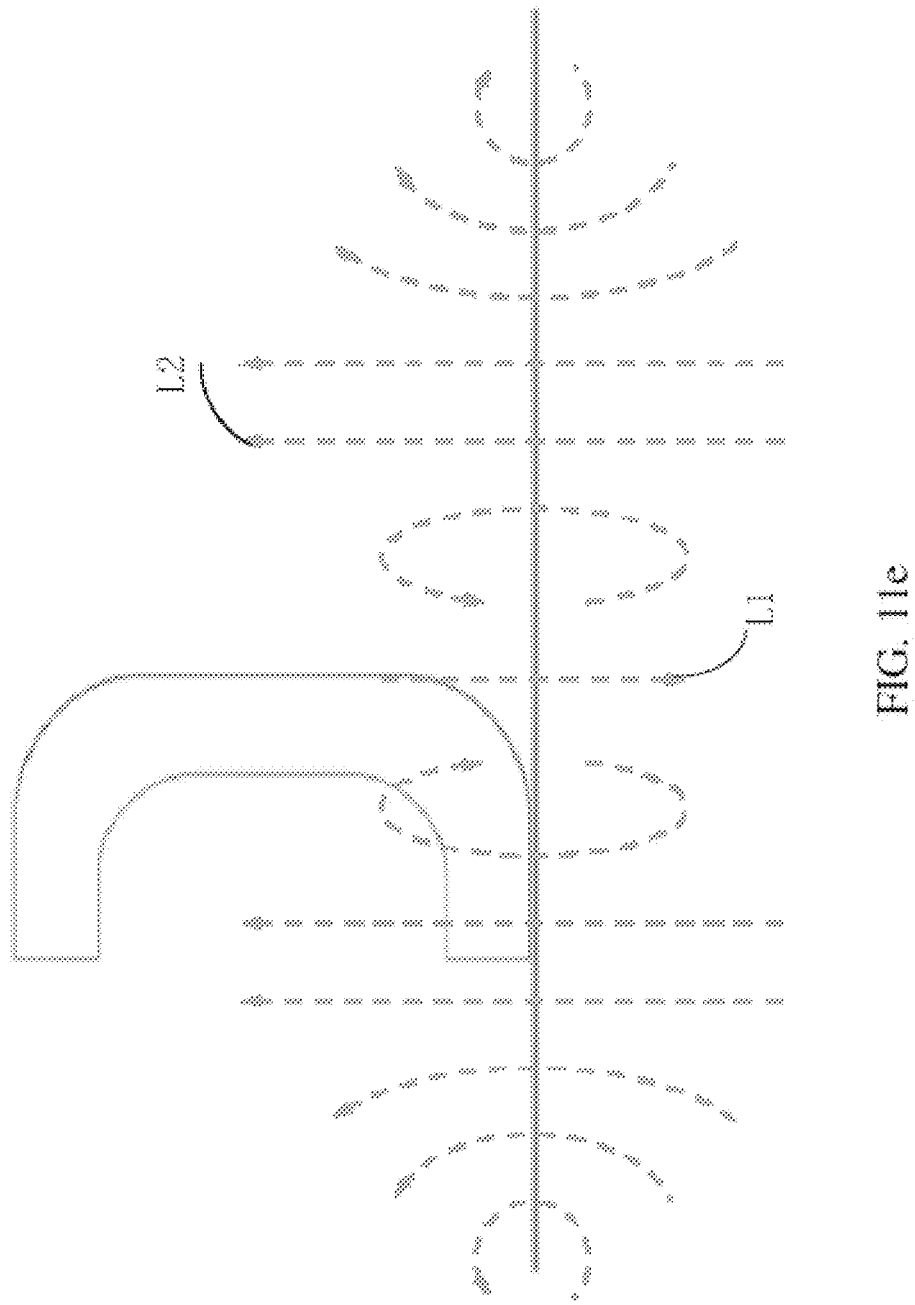
FIG. 11e is an illustration of the magnetic fields generated by the currents of the inner and outer sub-coils of the ninth planar coil in FIG. 11c.

In some embodiments, the ninth planar coil 11l may be, in various forms, orthogonal to the magnetic fields generated by the vertically arranged curved coils and zero-coupled to the vertically arranged curved coils, such that a plurality of transmitter structures with four transmit coils are derived. As illustrated in FIG. 11c, the ninth planar coil 11l includes an inner sub-coil 11/1 and an outer sub-coil 11/2 that are connected in series. The center of the inner sub-coil 11/1 and the center of the outer sub-coil 11/2 are both on the axial line of the revolving structure (the cylindrical structure in FIG. 11c). The diameter of the inner sub-coil 11/1 is less than the diameter of the revolving structure. The diameter of the outer sub-coil 11/2 is greater than the diameter of the revolving structure. The winding sense of the inner sub-coil 11/1 is opposite to the winding sense of the outer sub-coil 11/2. The inner sub-coil is arranged inside the revolving structure, whereas the outer sub-coil 11/2 is arranged outside the revolving structure. In addition, the inner sub-coil 11/1 and the outer sub-coil 11/2 are both a circular structure, and the center of circle of the inner sub-coil 11/1 and the center of circle of the outer sub-coil 11/2 are both on the axial line of the revolving structure. As illustrated in FIG. 11d, when the ninth planar coil 11l operates, the current thereof may first flow counterclockwise through the outer sub-coil 11/2, then flow towards the inner sub-coil 11/1 and then flow clockwise through the inner sub-coil 11/1, and finally return to the outer sub-coil 11/2 to form a loop. The direction of the current is as illustrated by the arrows in FIG. 11d. The magnetic field generated by such a current is as illustrated in FIG. 11d and FIG. 11e. The generated magnetic field L is partitioned into two portions. One is a magnetic field L1, which, in the inner sub-coil 11/1, vertically passes through the ninth plane; and the other is a magnetic field L2, which, between the inner sub-coil 11/1 and the outer sub-coil 11/2, vertically exits the ninth plane. The relationship between coil radii of the inner sub-coil 11/1 and the outer sub-coil 11/2, and the surface radius of the cylinder may be controlled, such that the magnetic field L is constantly maintained vertical on the surface of the cylinder, that is, tangent to the surface of the cylinder. In this way, as illustrated in FIG. 11e, the total magnetic flux of the magnetic field L generated by the ninth planar coil 11l passes through each vertically arranged planar coil is zero, such that zero coupling is achieved between the ninth planar coil 11l and the three vertically arranged curved coils. Relative to the four-transmit coil structure in FIG. 11a, enlargement of the ninth planar coil 11l achieves the following merits. In one aspect, the coverage range of the longitudinal magnetic field perpendicular to the table 400 is expanded, and thus a wireless charging distance in the vicinity of the transmit coil group is increased. In another aspect, the expanded planar coil better supports user preferences developed by the user over long-period of time, that is placing the smart terminal 300 (for example, the mobile phone) horizontally on a wireless charger product for wireless charging.

Figure 12A:
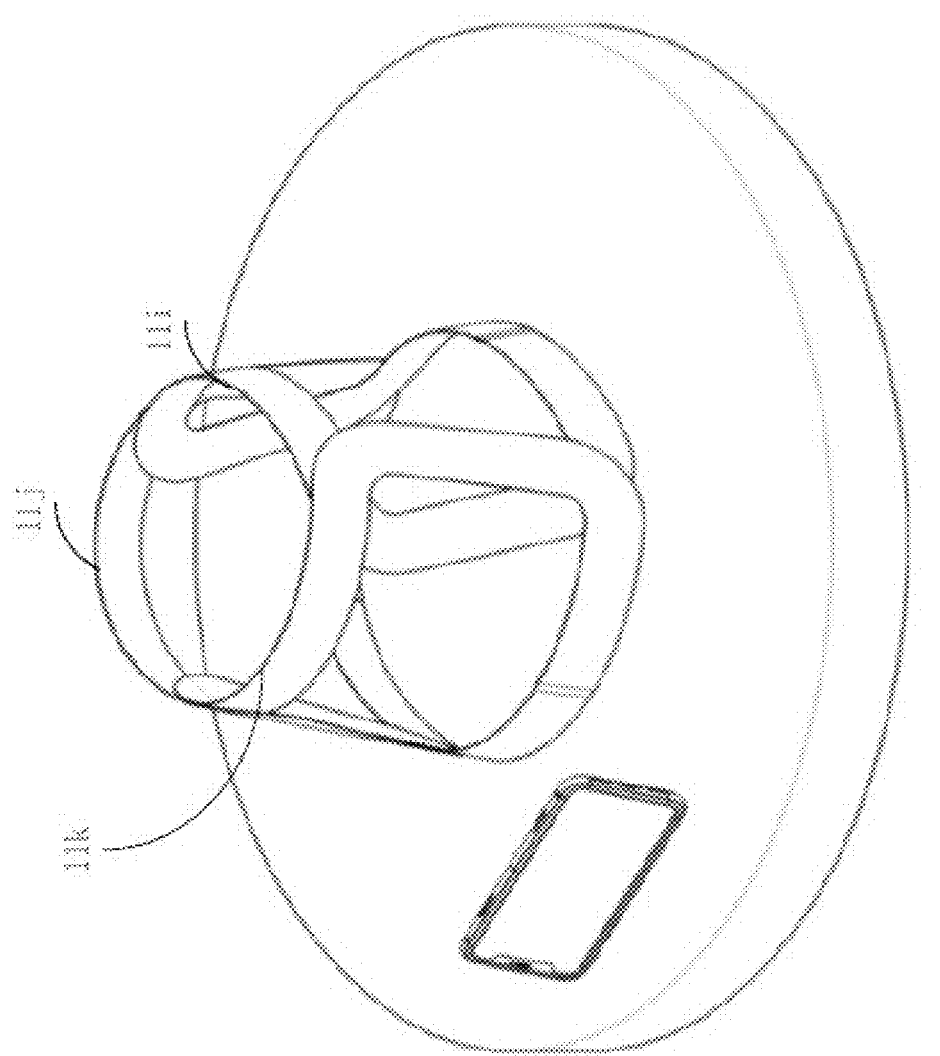
FIG. 12a is a structural diagram of a first curved coil, a second curved coil, and a third curved coil which are all inclined and curved according to various embodiments of the present disclosure.

In some embodiments, the revolving structure is a truncated cone structure, and the three curved coils are arranged in an array around an axial line of the truncated cone structure. By obliquely arranging the curved coil, a magnetic field component perpendicular to the table 400 is added to the transmitter system, such that more postures of the receiver device are better supported. As illustrated in FIG. 12a, the first curved coil 11i, the second curved coil 11j, and the third curved coil 11k are all inclined curved coils. These coils spatially constitute a truncated cone structure and may be arranged against a truncated cone-shaped housing 14. With such arrangement of coils, the transmit coil group 11 may be placed as close to the housing 14 (not illustrated) of the transmitter as possible, such that the distance between the transmit coils and the smart terminal 300 (for example, the mobile phone) is minimized. In this way, stronger coupling between the transmit coils and the receive coil 21 may be achieved. In FIG. 12a, the structure and size of each of the inclined curved coils are similar, and the curved coils are exploded as planar coils which are similar to rectangular structures in terms of profile.

Figure 12B:
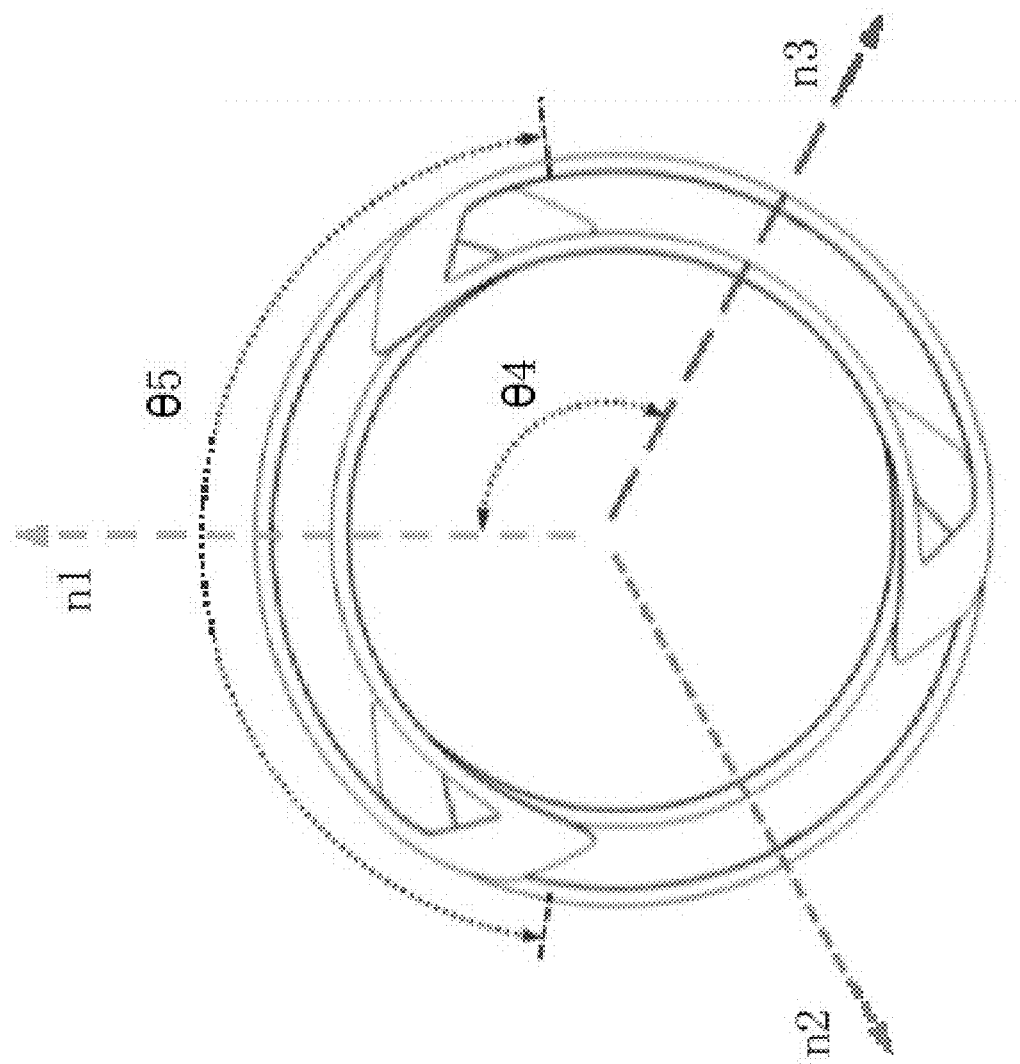

As illustrated in FIG. 12b, as seen from the top view diagram, the three transmit coils are equally spaced apart along a surface of the truncated cone, and normal vectors corresponding to centers of the curved coils are as illustrated by n1, n2, and n3 in FIG. 12b. It may be noted that normal orientations of the centers of any two coils of the three inclined curved coils define an angle θ4 which is approximate to 120 degrees. An angle of the surface of the truncated cone covered by the length of each of the coils is θ5 in FIG. 12b. The angles θ5 all exceed 120 degrees. That is, an approximately equally overlapped portion is present between any two inclined curved coils of the three transmit coils. As described above, by controlling the angle θ5 and the size of the overlapped portion in the three-coil structure in accordance with the specific design of the transmit coils, zero coupling is achieved between any two coils of the three transmit coils. Since any two of the magnetic fields generated by the three transmit coils define an approximate 120-degree angle and zero coupling is achieved between any two of the transmit coils, as described above, in combination with a plurality of transmit circuit units, the system is capable of achieving a higher position flexibility of wireless charging space for the smart terminal 300 (for example, the mobile phone) in the vicinity of the transmitter.

Figure 12C:
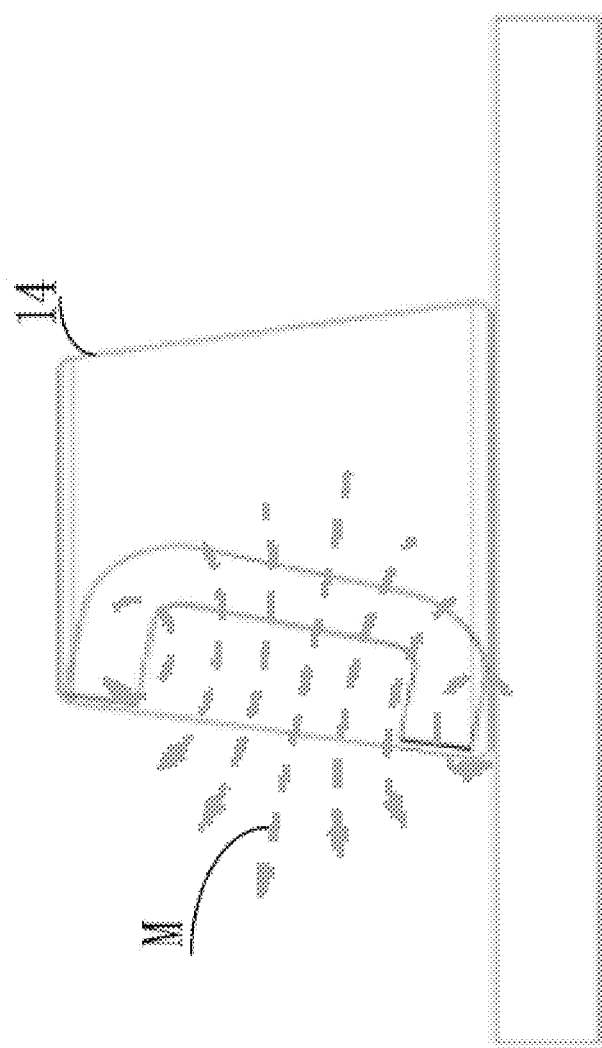

A magnetic field M generated by one of the three inclined curved coils is as illustrated in FIG. 12c. Since each of the inclined curved coils is arranged along the housing 14, and the housing 14 is a truncated cone structure which defines an acute angle with the table 400, the magnetic field M generated by the operating inclined curved coil is perpendicular to the inclined curved coil and defines a specific angle with the table 400. In this way, a magnetic field component perpendicular to the table 400 is supplied to the wireless charging transmitter. With such a magnetic field component, the transmitter is able to support more spatial postures of the receiver device for wireless charging. With the inclined curved coil group and the housing 14 in the truncated cone structure, the usage model of charging the mobile phone by placing the mobile phone against the base of the wireless charging transmitter is better supported. In some embodiments, after each of the inclined curved coils is exploded to a planar structure, the coil may be shaped like a circular ring sector. In the coil group with such a circular ring sector structure, decoupling between the three transmit coils may likewise be achieved by controlling an overlapped portion between the coils. In this way, the efficiency of wireless transmission of electric energy is improved.

Figure 13A:
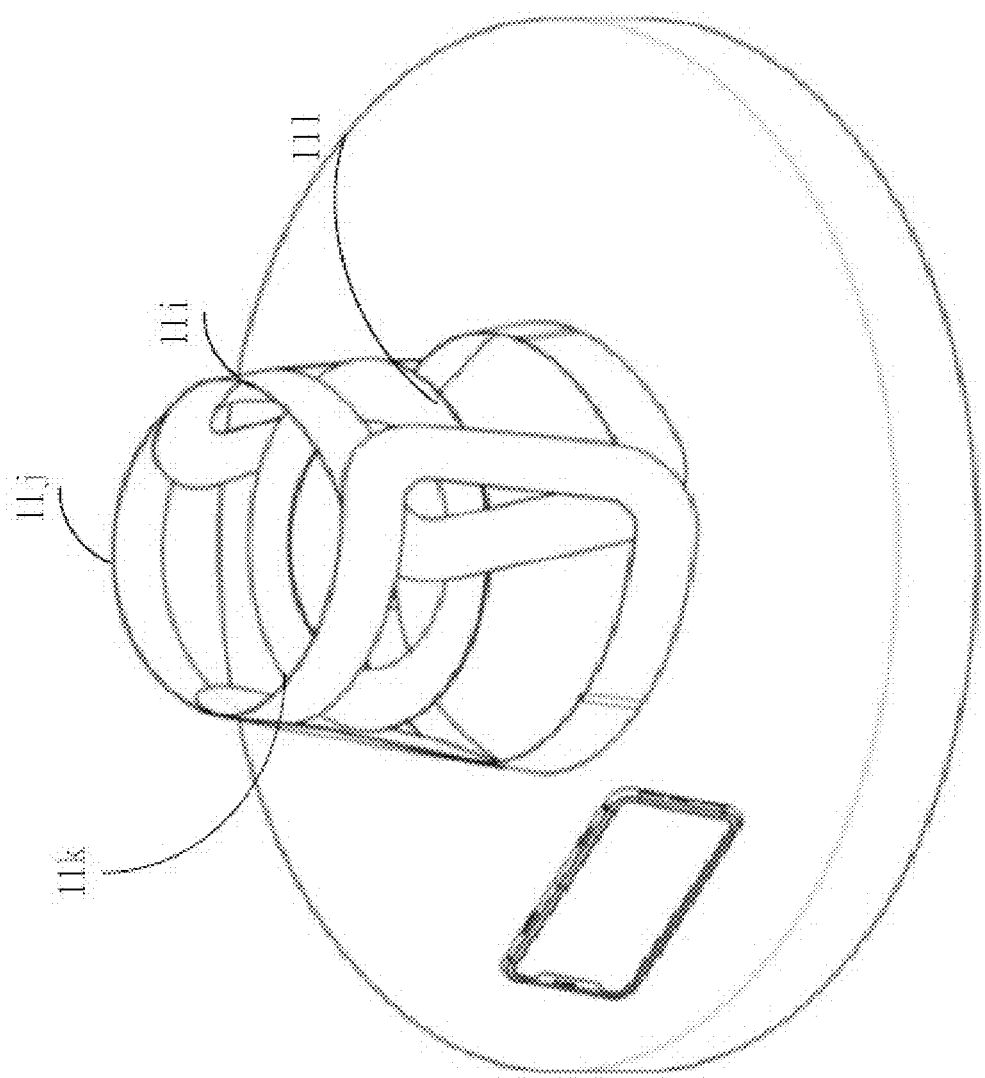
FIG. 13a is a structural diagram of a first curved coil, a second curved coil, and a third curved coil which are all inclined and curved, and a ninth planar coil according to various embodiments of the present disclosure.
Figure 13B:
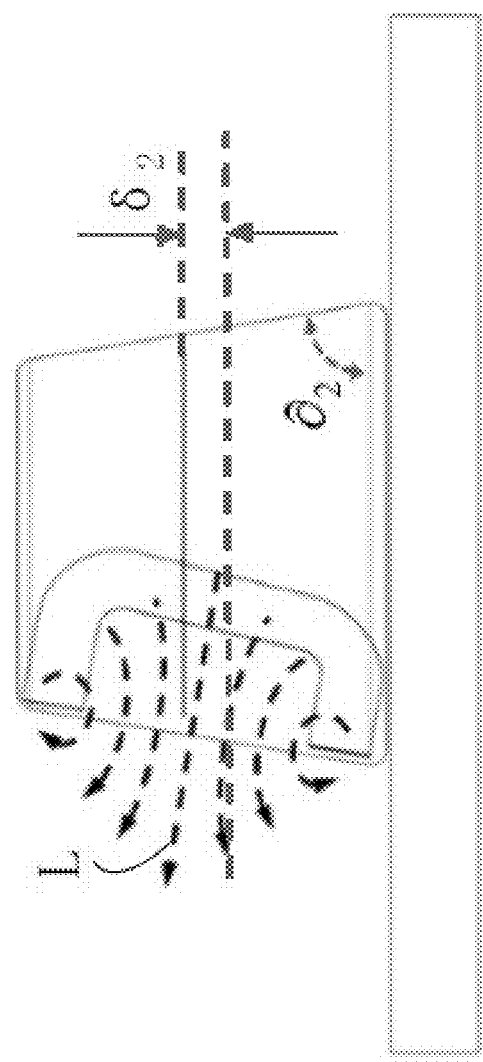

In some embodiments, based on the three inclined curved coils, likewise, more spatial postures of the smart terminal 300 may also be supported by adding orthogonal coils, and zero coupling is achieved between the transmit coils. Specifically, structures of the three inclined curved coils and the ninth planar coil 11*l* may be as illustrated in FIG. 13*a*. The magnetic field generated by any of the inclined curved coils and the structure of the ninth planar coil 11*l* are as illustrated in FIG. 13*b*. The truncated cone structure includes a generatrix and a lower bottom face. An included angle defined between any radius on the lower bottom face and the generatrix is $\partial_2$. A distance between the ninth plane and a central face of the truncated cone structure is $\delta_2$. The included angle $\partial_2$ and the distance $\delta_2$ satisfy a second predetermined relationship. If the curved coil illustrated in FIG. 13*b* is a fourth curved coil 11*i*, an included angle defined between a curved plane where the fourth curved coil 11*i* and the table 400 is also $\partial_2$, wherein the angle $\partial_2$ is an acute angle. As long as the included angle $\partial_2$ and the distance $\delta_2$ satisfy the second predetermined relationship, a total magnetic flux generated by the fourth curved coil 11*i* that passes through the ninth planar coil 11*l* is zero. In addition, with such arrangement of coils, on the premise of achieving zero coupling between the inclined curved coils, zero coupling is also achieved between any one of the inclined curved coils and the ninth planar coil 11*l*. In some embodiments, with decrease of the included angle $\partial_2$, the distance $\delta_2$ progressively increases. For example, the included angle $\partial_2$ is a value within an interval [15°, 90°), and a ratio of the distance $\delta_2$ to a height of the truncated cone is a value within an interval [50%, 0).

As described above, with a combination of the three inclined curved coils, the three inclined curved coils are capable of collaboratively operating to supply any magnetic field component along the table 400. In combination with a longitudinal magnetic field component perpendicular to the table 400 (that is, perpendicular to the ninth plane) that is generated by the ninth planar coil 11*l*, four independently controllable magnetic fields covering three orthogonal orientations of a Cartesian coordinate system may be generated in the vicinity of the transmit coil group. In an embodiment of the present disclosure, the system with four transmit coils may be arranged in the housing 14 (not illustrated) which is approximately a truncated cone and placed on the table 400. Regardless of by which angle the user takes the mobile phone from the periphery of the table 400 into the wireless charging range of the wireless charging transmitter (including placing the mobile phone on the top face of the housing 14), the transmitter system is capable of wirelessly charging the mobile phone with a high efficiency.

Figure 13C:
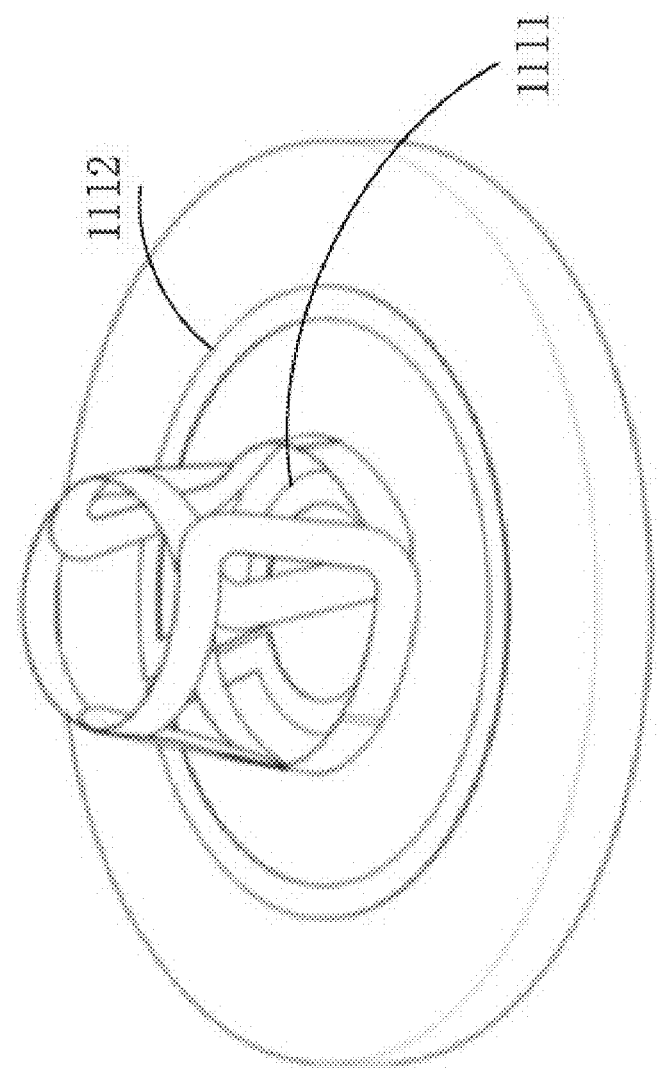
FIG. 13c is a structural diagram of a first curved coil, a second curved coil, and a third curved coil which are all inclined and curved, and a ninth planar coil according to various embodiments of the present disclosure.

In some embodiments, the planar coils (that is, the ninth planar coil 11*l*) in the four-transmit coil group in FIG. 13*a* may be, in various forms, orthogonal to the magnetic fields generated by the three inclined curved coils and zero-coupled to the vertically arranged curved coils, such that a plurality of transmitter structures with four transmit coils are derived. Referring to FIG. 13*c*, the structure is similar to the structure as illustrated in FIG. 11*c*, but is different from the structure as illustrated in FIG. 11*c* only in that the revolving structure is a truncated cone structure, and the three curved coils are inclined curved coils. The other structure designs and the operating principles of achieving zero coupling are similar to those in FIG. 11*c*, which are not described herein any further.

In some embodiments, the revolving structure may also be a prism or a frustum. Other structural designs and the operating principles of achieving zero coupling are similar to the cylinder and the truncated cone, which are not described herein any further.

Figure 14A:
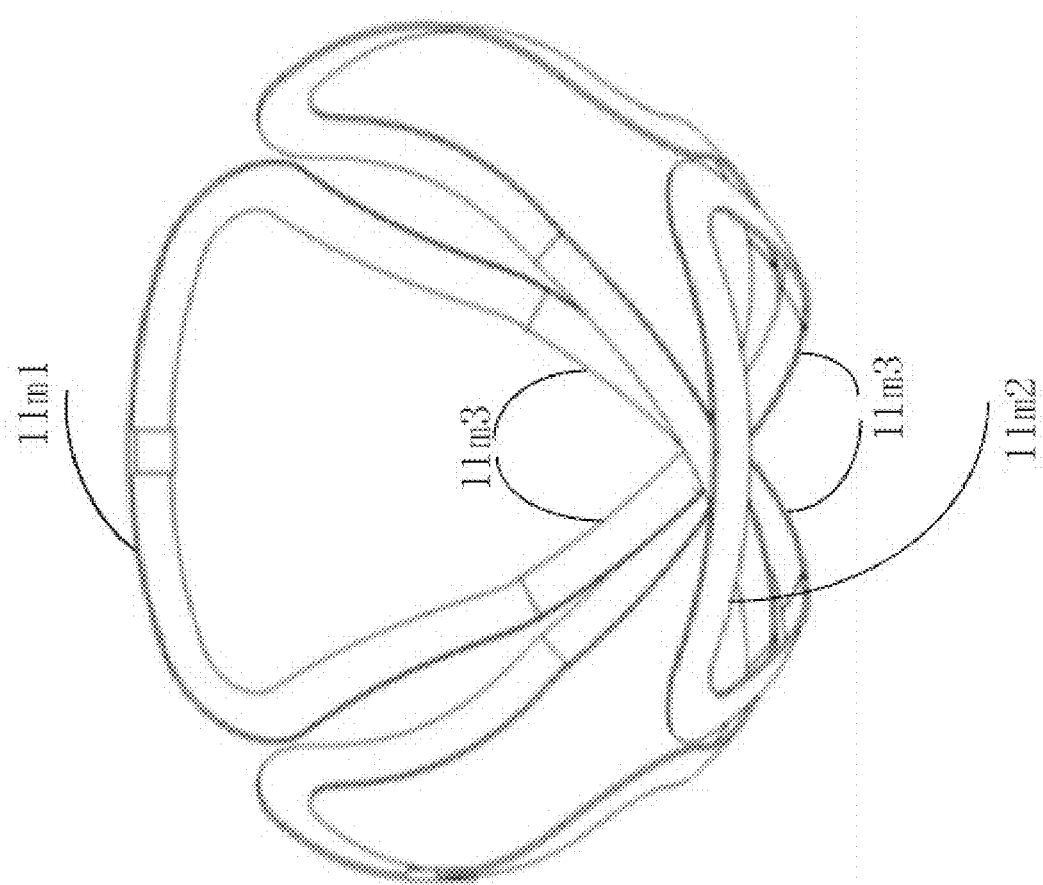
FIG. 14a is a structural diagram of two tenth coils according to various embodiments of the present disclosure.
Figure 14B:
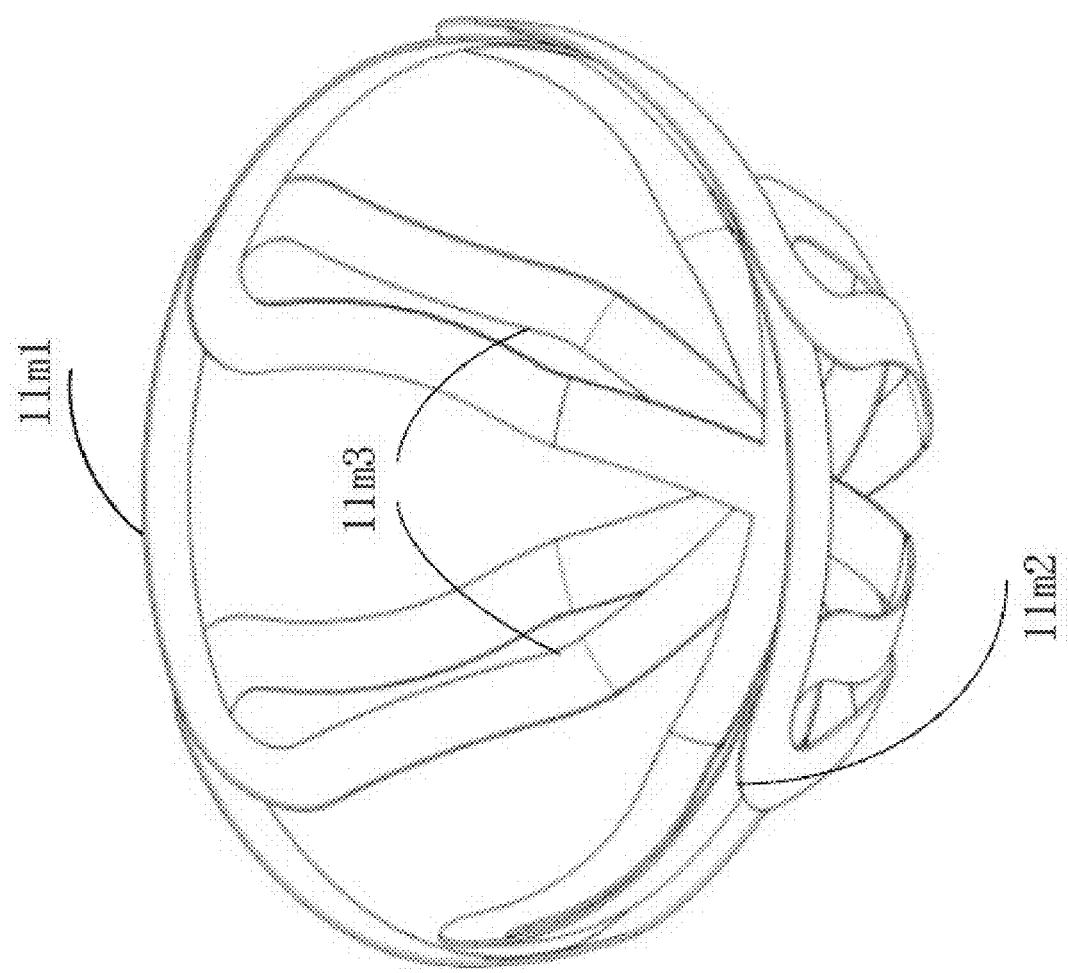
FIG. 14b is a structural diagram of three tenth coils according to various embodiments of the present disclosure.

The planar 8-shaped coil combination in FIG. 7*a* to FIG. 8*c* may also be applicable to the curved coil to achieve zero coupling between the transmit coils. In some embodiments, the at least two transmit coils include at least two tenth coils 11*m*. Each of the tenth coils 11*m* includes a first portion 11*m*1 and a second portion 11*m*2. The first portion 11*m*1 and the second portion 11*m*2 have a first connecting portion 11*m*3. The first portion 11*m*1 and the second portion 11*m*2 are symmetrical about the first connecting portion 11*m*3. The coil winding sense of the first portion 11*m*1 is opposite to the coil winding sense of the second portion 11*m*2. The first portion 11*m*1 and the second portion 11*m*2 of each of the tenth coils 11*m* are arranged on a first curved surface, and the first portion 11*m*1 and the second portion 11*m*2 of each of the tenth coils 11*m* are arranged in an array on the first curved surface. The first portion 11*m*1, the second portion 11*m*2, and the first connecting portion 11*m*3 are similar to the 8-shaped structure. The number of tenth coils 11*m* may be two or three. The first curved surface may be a sphere, or may be an annular curved surface. When two tenth coils 11*m* are arranged, as illustrated in FIG. 14*a*, the two tenth coils 11*m* are wound into a sphere structure. The first portion 11*m*1, the second portion 11*m*2, and the first connecting portion 11*m*3 of each of the tenth coils 11*m* are all arranged on the sphere. The respective first portions 11*m*1 and second portions 11*m*2 of the two tenth coil 11*m* are arrayed on the sphere. That is, central symmetrical planes of the two tenth coils 11*m* are orthogonal to each other. When three tenth coils 11*m* are arranged, as illustrated in FIG. 14*b*, the three tenth coils 11*m* are wound into a sphere structure. The first portion 11*m*1 and the second portion 11*m*2 of each of the three tenth coils 11*m* are both arrayed on the sphere. Two adjacent coils of the three tenth coils 11*m* are partially overlapped.

In some embodiments, the first portion 11*m*1 and the second portion 11*m*2 of each of the tenth coils 11*m* are both arranged on the annular curved surface. The first connecting portion 11*m*3 of each of the tenth coils 11*m* is arranged at a planar bottom of the annular curved surface.

Figure 14C:
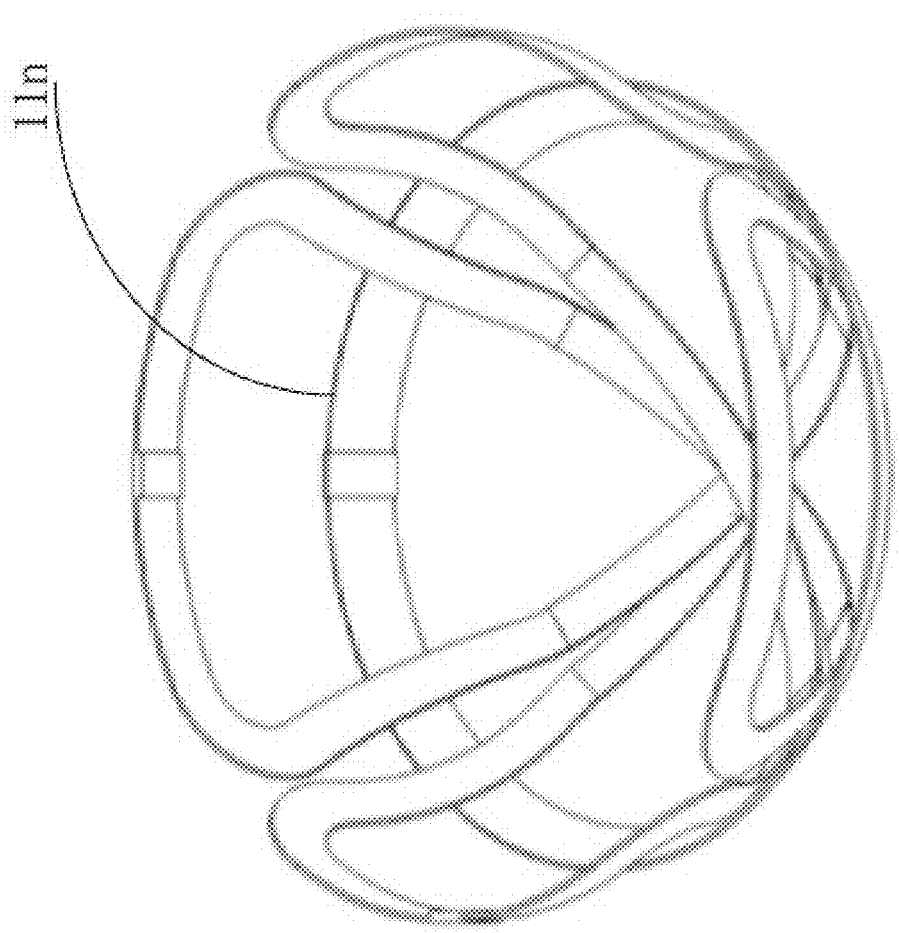
FIG. 14c is a structural diagram of two tenth coils and an eleventh coils according to various embodiments of the present disclosure.

In some embodiments, as illustrated in FIG. 14*c*, the first curved surface is a sphere, and the at least two transmit coils further include an eleventh coil 11*n*. The eleventh coil 11*n* is an annular coil. The eleventh coil 11*n* is arranged on an outer surface of the sphere, and a center of the eleventh coil 11*n* is on an axial line of the sphere. The eleventh coil 11*n* may also be wound on an inner surface of the sphere.

Figure 14D:
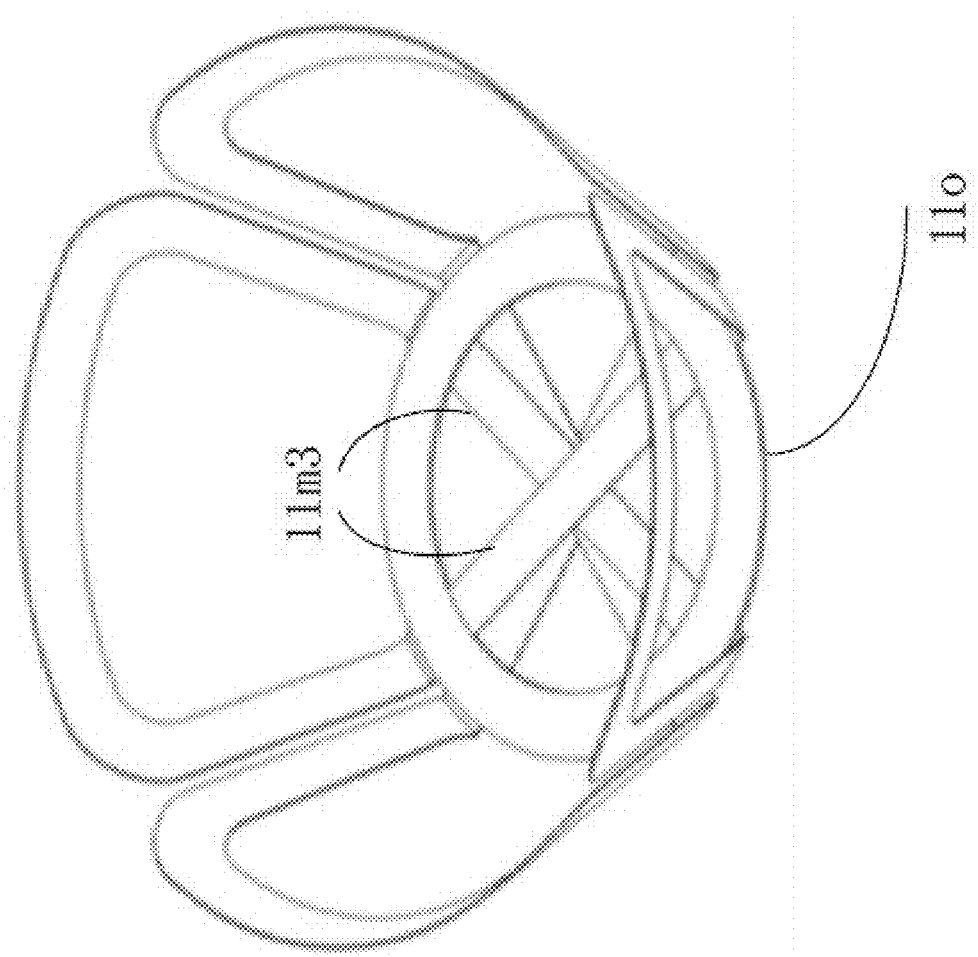
FIG. 14d is a structural diagram of two tenth coils and an eleventh coil according to various embodiments of the present disclosure.

In some embodiments, as illustrated in FIG. 14*d*, the first curved surface is an annular curved surface, and the at least two transmit coils further include a twelfth planar coil 11*o*. A plane where the twelfth planar coil 11*o* is arranged is a twelfth plane. The twelfth plane is a bottom face of the annular curved surface, a center of the twelfth planar coil 11*o* is on an axial line of the annular curved surface, and the first connecting portion 11*m*3 of each of the tenth coils 11*m* is arranged on the twelfth plane.

Figure 14E:
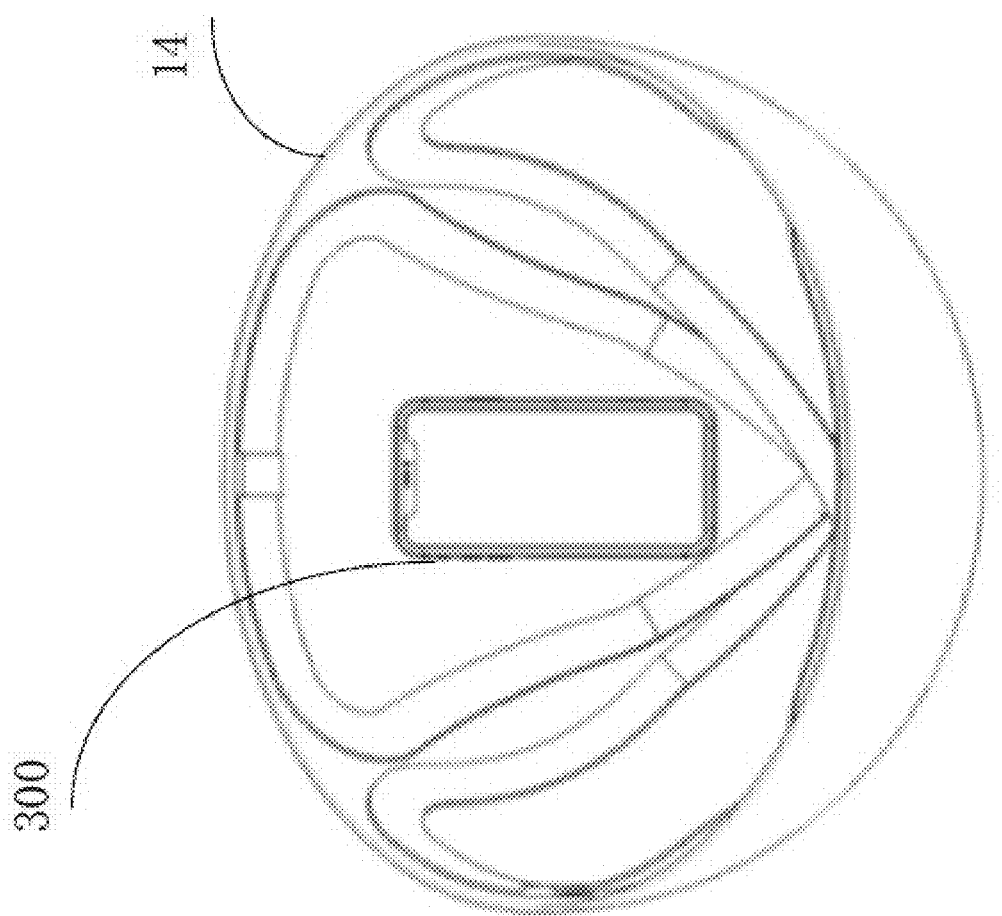
FIG. 14e is a structural diagram of two tenth coils according to various embodiments of the present disclosure.

In some embodiments, the structures in FIG. 14*a* and FIG. 14*b* may be both practiced by a "bowl"-shaped structure, such that the smart terminal 300 in a "bowl" is charged. For example, as illustrated in FIG. 14*e*, the smart terminal 300 (for example, the mobile phone) may be placed, as desired, in the "bowl"-shaped wireless charging transmitter constituted by two transmit coils. The housing 14 is "bowl"-shaped. The wireless charging transmitter is capable of supplying a suitable superimposed magnetic field by controlling the currents between the plurality of transmit coils, such that the higher efficiency and position flexibility of the wireless charging is achieved.

In some embodiments, the sphere and the annular curved surface may also be a side surface of a prism or a frustum. Other structural designs and the operating principles of achieving zero coupling are similar to the sphere and the annular curved surface, which are not described herein any further. In summary, the wireless charging transmitter is capable of supplying currents to the corresponding transmit coils by the plurality of transmit circuit units, the current on each of the transmit coils generates a corresponding magnetic field, and the plurality of transmit coils simultaneously operate. In this case, the magnetic fields generated by the transmit coils form a superimposed magnetic field, and electric energy is transmitted to the receive coil by the superimposed magnetic field. In this way, the efficiency of wireless transmission of electric energy is improved, such that a better wireless charging performance is achieved. Alternatively, by various structural designs of the transmit coil group, the coupling coefficient between the transmit coils is less than the predetermined threshold and coupling between the transmit coils is reduced. As such, during wireless charging, the circulating current on transmit coils is reduced, and interference between the transmit circuit units is mitigated, and the efficiency of wireless transmission of electric energy is further improved.

Figure 15A:
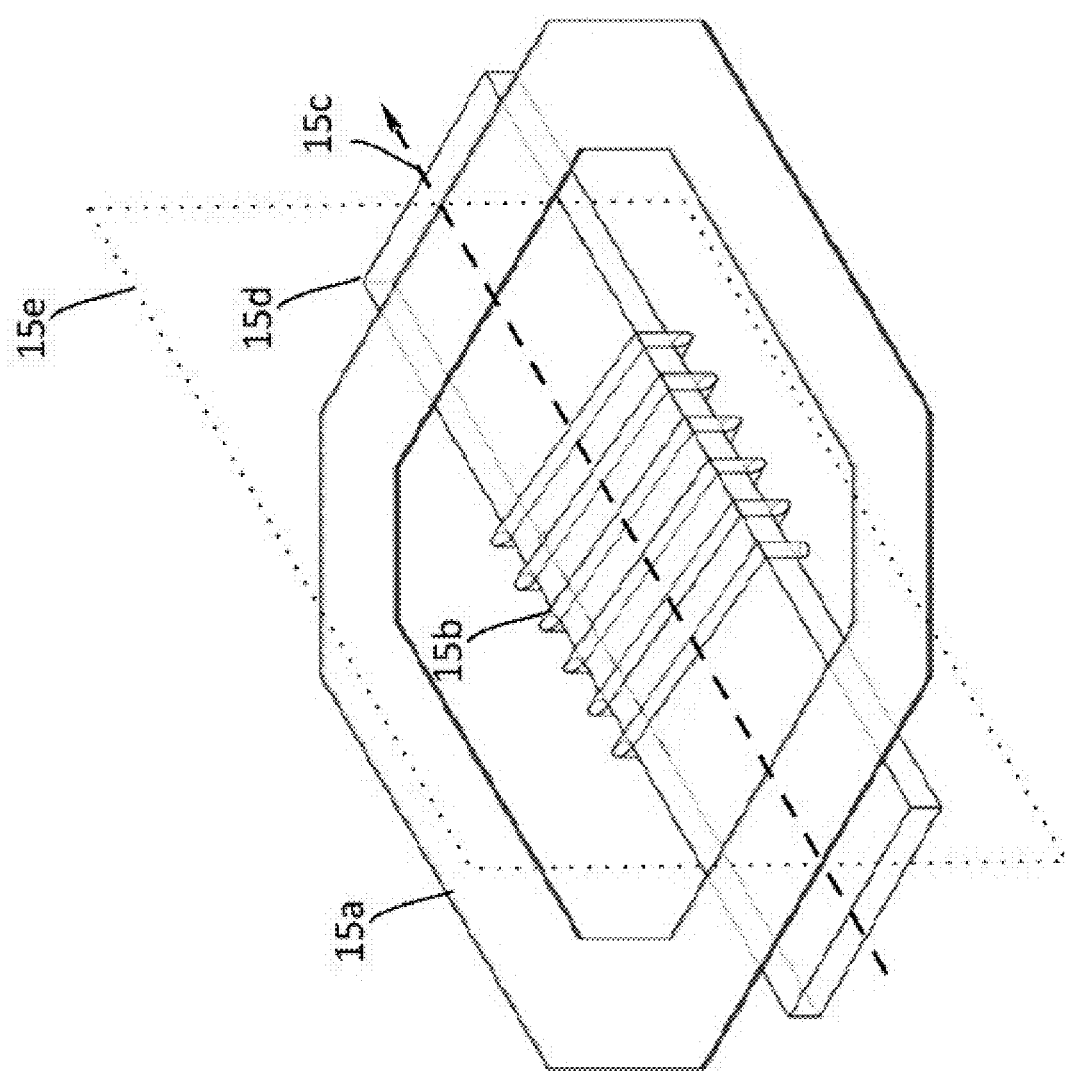
FIG. 15a is a structural diagram of a thirteenth planar coils and a fourteenth solenoid coil according to various embodiments of the present disclosure.

In some other application environments, the user imposes higher requirements on smaller footprint and concealability (for example, under-table mounting) of the wireless charging transmitters. A novel low-profile compact transmit coil group structure is needed such that a plurality of transmit coils can collaboratively operate to achieve a higher position flexibility and the goal of having coupling coefficient between the transmit coils less than a predetermined threshold can be achieved at the same time. Therefore, in some embodiments, as shown in FIG. 15*a*, the at least two transmit coils include a thirteenth planar coil 15*a* and a fourteenth solenoid coil 15*b*, the plane where the thirteenth planar coil is arranged is a thirteenth plane, the axis 15*c* where the fourteenth solenoid coil is arranged around is a fourteenth axis. A central plane 15*e* of the thirteenth planar coil is shown in FIG. 15*a*. The fourteenth axis 15*c* resides on the central plane 15*e* and is parallel to the thirteenth plane. The primary direction of the magnetic field generated by current on the thirteenth planar coil 15*a* is perpendicular to the thirteenth plane, while the primary direction of the magnetic field generated by current on the fourteenth solenoid coil 15*b* is along the direction of the axis 15*c* of the fourteenth solenoid coil 15*b*. By the structural design of the thirteenth planar coil 15*a* and the fourteenth solenoid coil 15*b*, the orientations of magnetic fields generated by currents on them are not parallel (e.g., orthogonal). As a beneficial result of this coil arrangement, the wireless charging transmitter is capable of controlling the currents supplied to the thirteenth planar coil 15*a* and the fourteenth solenoid coil 15*b*, to adjust the orientation of the superimposed magnetic field generated by the two transmit coils. In this way, a plurality of transmit coils can be configured to operate collaboratively in a more effective manner.

Figure 15B:
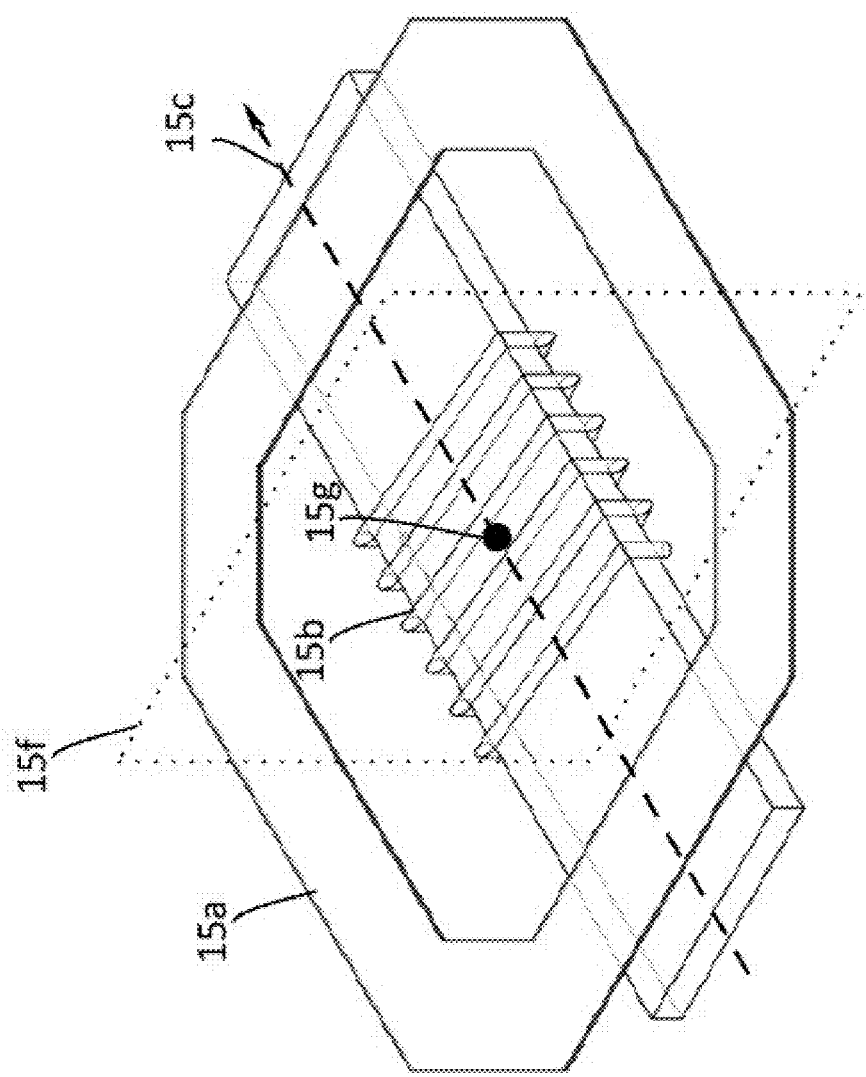
FIG. 15b is a structural diagram of a thirteenth planar coils and a fourteenth solenoid coil according to various embodiments of the present disclosure.
Figure 15C:
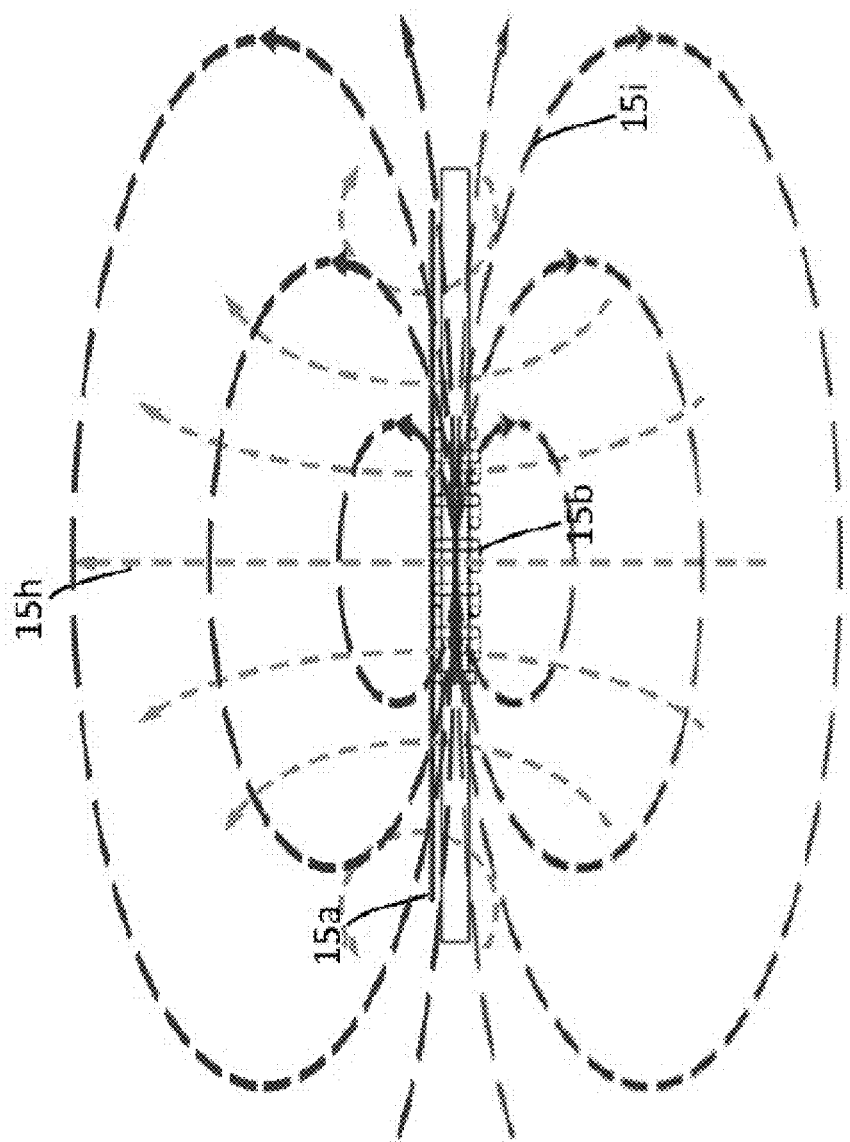

In some embodiments, as shown in FIG. 15*b*, another central plane of the thirteenth planar coil 15*a* that is perpendicular to the axis 15*c* of the fourteenth solenoid coil 15*b* is depicted as 15*f*. As can be seen, the geometrical center of the fourteenth solenoid coil 15*g* resides on the central plane 15*f* of the thirteenth planar coil. In addition, all the windings of the fourteenth solenoid coil 11*b* have the same sense of rotation around the fourteenth axis 15*c*. The side view of magnetic field generated by both coils are shown in FIG. 15*c*, where magnetic field 15*i* is generated by current on the fourteenth solenoid coil 15*b*, and magnetic field 15*h* is generated by current on the thirteenth planar coil 15*a*. As a result of the center of the thirteenth planar coil being aligned the center of the fourteenth solenoid coil 15*g*, the same amount of magnetic field enters and exits the thirteenth planar coil 15*a*, resulting in a net zero total magnetic flux linkage between the two transmit coils. Therefore, the coupling coefficient between the two transmit coils is almost zero, which is less than the predetermined threshold.

In some embodiments, referring to FIG. 15*a*. FIG. 15*a* and FIG. 15*b* illustrates a transmit coil structure according to an embodiment of the present disclosure, where each transmit coil may include a single-turn or a multi-turn coil structure. In FIG. 15*a* and the structural diagrams in the embodiments hereinafter, the multi-turn thirteenth planar coil structure is represented by an outer profile of the multi-turn coil, while the solenoid coil has its multiple-coil turns explicitly depicted.

Continue referring to FIG. 15*a* and FIG. 15*b*, where the fourteenth solenoid coil could further wound around an air core 15*d*. In some other embodiments, a ferrite core 15*d* can also be used to expand the range of the magnetic field generated by the fourteenth solenoid coil 15*b*. When a ferrite core is employed in the fourteenth solenoid coil, the thirteenth planar coil 15*a* is usually placed above the ferrite core 15*d*, that is between the wireless charging receiver (not shown) and the fourteenth solenoid coil 15*b*. This arrangement can enhance the magnetic field 15*h* generated by the thirteenth planar coil 15*a* by facilitating the completion of magnetic circuit of the thirteenth planar coil 15*a*. In some other embodiments, metallic shield layers (not shown) can also be arranged below the fourteenth solenoid coil 15*b* (i.e., on the opposite side of the wireless charging receiver) to help focusing the magnetic field 15*i* generated by the fourteenth solenoid coil toward the receiver device, to achieve a higher coupling.

The dual-transmit coil structure as illustrated in FIG. 15*a* to FIG. 15*c* is suitable to a scenario where a user orientation is relatively fixed during interaction between the user and the smart terminal, for example, a desk or the like. The user is generally seated along a fixed orientation, and a rotation range of the smart terminal (for example, a mobile phone) around the axis perpendicular to the thirteenth plane is limited. In a scenario where the user orientation is not fixed during interaction between the user and the smart terminal, for example, a coffee table or the like, the user may be seated around the coffee table. In this case, a multi-transmit coil structure capable of supporting 360-degree wireless charging is needed.

Figure 15D:
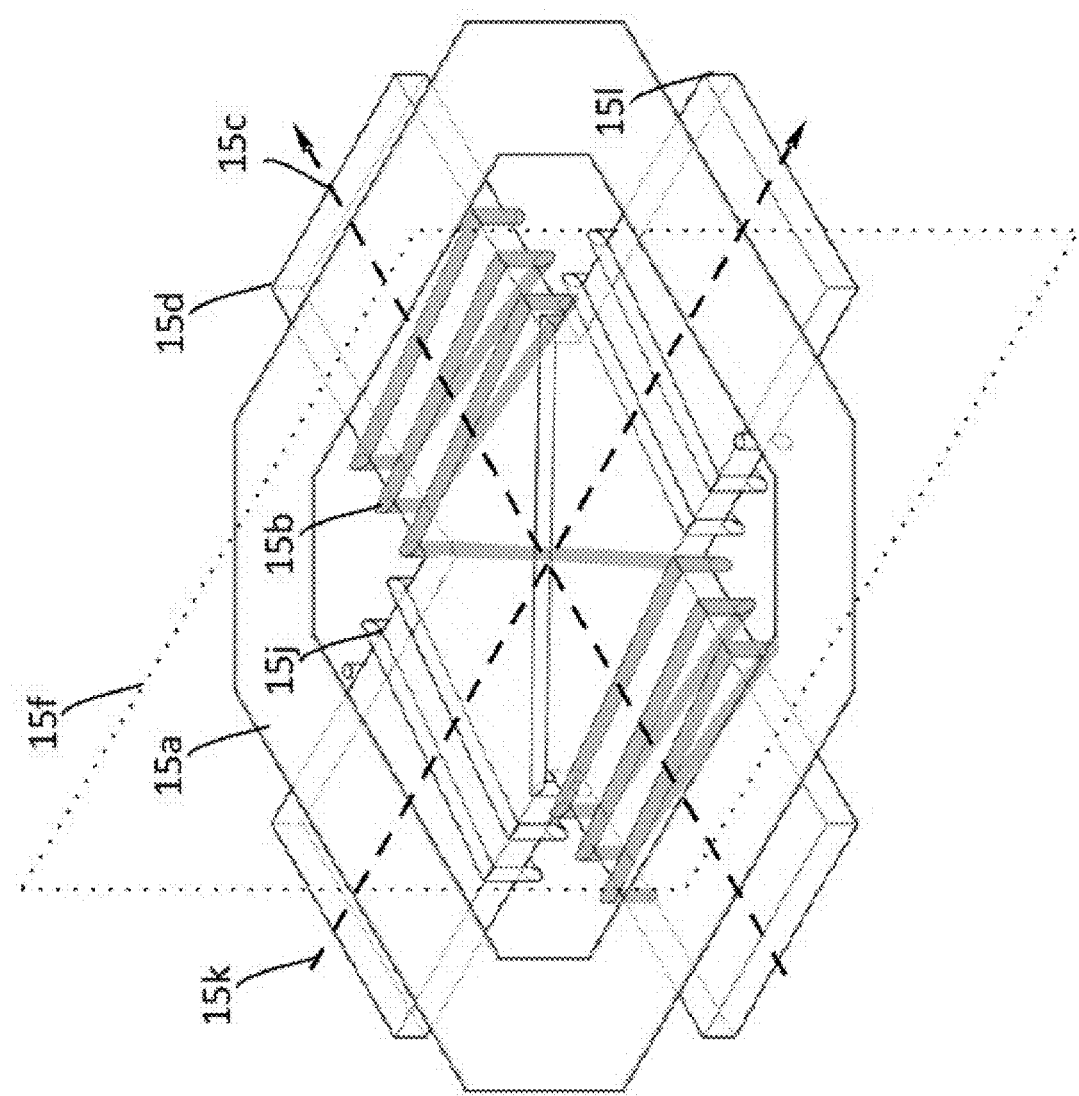
FIG. 15d is a structural diagram of a thirteenth planar coils a fourteenth solenoid coil and a fifteenth solenoid coil according to various embodiments of the present disclosure.

In some embodiments, in order to achieve a multi-transmit coil structure that is capable of supporting 360-degree wireless charging and ensuring that the coupling coefficient between the transmit coils is less than a predetermined threshold, referring to FIG. 15d, based on the transmit coils structure shown in FIG. 15a, the at least two transmit coils further include a fifteenth solenoid coil 15j. The axis where the fifteenth solenoid coil 15j is arranged around is a fifteenth axis 15k. The fifteenth axis 15k is parallel to the thirteenth plane, and orthogonal to the fourteenth axis 15c. The fifteenth axis 15k also resides on the central plane 15f of the thirteenth planar coil. The primary direction of the magnetic field generated by current on the fifteenth solenoid coil 15j is along the direction of the axis 15k of the solenoid coil 15j. By the structural design of the thirteenth planar coil 15a the fourteenth solenoid coil 15b and the fifteenth solenoid coil 15j, the orientations of magnetic fields generated by currents on them are not parallel (e.g., mutually orthogonal). As a beneficial result of this coil arrangement, the wireless charging transmitter is capable of controlling the currents supplied to the thirteenth planar coil 15a and the fourteenth solenoid coil 15b, and the fifteenth solenoid coil 15j to adjust the orientation of the superimposed magnetic field generated by the transmit coils. In this way, a plurality of transmit coils can be configured to operate collaboratively in a more effective manner.

In some embodiments, the geometrical center of the fifteenth solenoid coil 15j also resides on a central plane of the thirteenth planar coil that is perpendicular to the fifteenth axis 15k (i.e., central plane 15f) and all the windings of the fifteenth solenoid coil 15j has the same sense of rotation around the fifteenth axis 15k.

Due to the same reason explained previously, the coupling between the fifteenth solenoid coil 15j and the thirteenth planar coil 15a is almost zero, when the geometry centers of the two coils are substantially aligned. Similarly, since the fourteenth solenoid coil 15b is structurally orthogonal to the fifteenth solenoid coil 15j, therefore, the total magnetic flux generated by the fifteenth solenoid coil 15j that passes through the fourteenth solenoid coil 15b is substantially zero, thereby achieving zero coupling. Therefore, zero coupling is also present between the two solenoid coils in the transmit coil group. The added fifteenth solenoid coil 15j is capable of providing a horizontal magnetic field component on top of the dual-transmit coil system shown in FIG. 15a, so as to achieve 360-degree wireless charging. In addition, the coupling coefficients between the transmit coils are less than the predetermined threshold, or even zero coupling is achieved between the transmit coils. In this way, substantially low circulating current or interference is caused between the transmit circuit units, such that the transmit circuit units substantially operate independently, and thus the efficiency of wireless transmission of electric energy is improved.

Further referring to FIG. 15d, in some embodiments, the fifteenth solenoid coil also include a ferrite core 15l. In other embodiments, the fourteenth solenoid coil and the fifteenth solenoid coil can be wound around one ferrite core as shown in FIG. 15d, where a X shaped ferrite core is used to host the windings of the fourteenth and fifteenth solenoid coil. In this case, the coil windings of both solenoid coils are symmetrically arranged across the X shaped ferrite core to achieve orthogonal fields and zero coupling.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A wireless charging transmitter, comprising:
   a transmit coil group, the transmit coil group comprising at least two transmit coils configured to simultaneously transmit electric energy to an external receive coil, the at least two transmit coils being associated such that orientations of magnetic fields generated by currents on the at least two transmit coils are not parallel and form a first angle, and a coupling coefficient between the at least two transmit coils is less than a predetermined threshold; and
   at least two transmit circuit units, each of the transmit circuit units being electrically connected to a corresponding transmit coil of the transmit coils and being configured to supply a current to the corresponding transmit coil.

2. The wireless charging transmitter according to claim 1, wherein:
   the at least two transmit coils comprise a first planar coil and a second planar coil, a plane where the first planar coil is arranged being a first plane, a plane where the second planar coil is arranged being a second plane, the first planar coil being horizontally arranged, the first plane and the second plane being intersected to form an intersection line, an included angle between the first plane and the second plane being $\delta_1$, a distance from the intersection line to a central line of the first planar coil being $\delta_1$, and the included angle $\partial_1$ and the distance $\delta_1$ satisfying a first predetermined relationship.

3. The wireless charging transmitter according to claim 2, wherein:
the first predetermined relationship is:

$$\delta_1/l = -2E\text{-}05\partial_1{}^3 - 0.0001\partial_1{}^2 - 0.0097\partial_1 + 17.28$$

wherein the included angle $\partial_1$ is a value within an interval (0, 90°], and l is a side length of the first planar coil.

4. The wireless charging transmitter according to claim 2, wherein:
the first plane is crossed with the second plane;
the first plane is orthogonal to the second plane; and
a cross line is formed at an intersection between the first plane and the second plane, the cross line being coincident with the central line of the first planar coil and/or a central line of the second planar coil.

5. The wireless charging transmitter according to claim 4, wherein:
the cross line is horizontally arranged relative to a horizontal plane.

6. The wireless charging transmitter according to claim 1, wherein:
the at least two transmit coils comprise a third planar coil and a fourth planar coil, a plane where the third planar coil is arranged being a third plane, a plane where the fourth planar coil is arranged being a fourth plane, the third plane being parallel to the fourth plane, the fourth planar coil comprising a first planar sub-coil and a second planar sub-coil, and a coil winding sense of the first planar sub-coil being opposite to a coil winding sense of the second planar sub-coil.

7. The wireless charging transmitter according to claim 6, wherein:
a centerline of the third planar coil is aligned with a center line of the fourth planar coil; and
the first planar sub-coil and the second planar sub-coil are symmetrical with respect to the center line of the third planar coil.

8. The wireless charging transmitter according to claim 7, wherein:
the fourth planar coil is an 8-shaped symmetrical structure.

9. The wireless charging transmitter according to claim 7, wherein:
the at least two transmit coils further comprise a fifth planar coil, a plane where the fifth planar coil is arranged being a fifth plane, the fifth planar coil comprising a third planar sub-coil and a fourth planar sub-coil, a coil winding sense of the third planar sub-coil being opposite to a coil winding orientation of the fourth planar sub-coil, the third planar sub-coil and the fourth planar sub-coil being both in an 8-shaped symmetrical structure, the fifth plane being parallel to both the third plane and the fourth plane, the fifth planar coil being further orthogonal to the fourth planar coil.

10. The wireless charging transmitter according to claim 7, wherein:
the at least two transmit coils further comprise a sixth planar coil and a seventh planar coil, a plane where the sixth planar coil is arranged being a sixth plane, a plane where the seventh planar coil is arranged being a seventh plane, the sixth planar coil comprising a fifth planar sub-coil and a sixth planar sub-coil, the seventh planar coil comprising a seventh planar sub-coil and an eighth planar sub-coil, a winding sense of the fifth planar sub-coil being opposite to a winding sense of the sixth planar sub-coil, a winding sense of the seventh planar sub-coil being opposite to a winding sense of the eighth planar sub-coil, the fifth planar sub-coil and the sixth planar sub-coil being both an 8-shaped symmetrical structure, the seventh planar sub-coil and the eighth planar sub-coil being both in an 8-shaped symmetrical structure, the sixth plane being parallel to both the third plane and the fourth plane, the seventh plane being parallel to the third plane, the fourth plane, and the sixth plane, the sixth planar coil, the seventh planar coil, and the fourth planar coil being arranged in an array, and any two adjacent coils of the fourth planar coil, the sixth planar coil, and the seventh planar coil being partially overlapped.

11. The wireless charging transmitter according to claim 1, wherein:
the at least two transmit coils comprise a first planar coil and a second planar coil, a plane where the first planar coil is arranged being a first plane, a plane where the second planar coil is arranged being a second plane, the first planar coil being horizontally arranged, the first plane and the second plane being intersected to form an intersection line, an included angle between the first plane and the second plane being $\delta_1$, a distance from the intersection line to a central line of the first planar coil being $\delta_1$, and the included angle $\partial_1$ and the distance $\delta_1$ satisfying a first predetermined relationship, and wherein:
the first plane is crossed with the second plane;
the first plane is orthogonal to the second plane; and
a cross line is formed at an intersection between the first plane and the second plane, the cross line being coincident with the central line of the first planar coil and/or a central line of the second planar coil, and wherein the cross line is vertically arranged relative to a horizontal plane.

12. The wireless charging transmitter according to claim 11, wherein:
the at least two transmit coils further comprise an eighth planar coil, a plane where the eighth planar coil is arranged being an eighth plane, the eighth plane being orthogonal to both the first plane and the second plane, and a center of the eighth planar coil being on the cross line.

13. The wireless charging transmitter according to claim 12, wherein:
an outer diameter of the eighth planar coil is greater than an outer diameter of the first planar coil and an outer diameter of the second planar coil.

14. The wireless charging transmitter according to claim 13, wherein:
the at least two transmit coils comprise three curved coils, the three curved coils collaboratively defining a revolving structure, and any two adjacent curved coils in the three curved coils being partially overlapped along a circumferential orientation of the revolving structure; and
the at least two transmit coils further comprise a ninth planar coil, a plane where the ninth planar coil is arranged being a ninth plane, the ninth plane being orthogonal to an axial line of the revolving structure, and a center of the ninth planar coil being on the axial line of the revolving structure.

15. The wireless charging transmitter according to claim 14, wherein the ninth planar coil comprises an inner sub-coil and an outer sub-coil that are connected in series, a center of the inner sub-coil and a center of the outer sub-coil being both on the axial line of the revolving structure, a diameter of the inner sub-coil being less than a diameter of the revolving structure, a diameter of the outer sub-coil being greater than a diameter of the revolving structure, and a winding sense of the inner sub-coil being opposite to a winding sense of the outer sub-coil.

16. The wireless charging transmitter according to claim 14, wherein:
the revolving structure is a truncated cone structure, and the three curved coils are arranged in an array around an axial line of the truncated cone structure.

17. The wireless charging transmitter according to claim 16, wherein:
the truncated cone structure comprises a generatrix and a lower bottom face, an included angle defined between any radius on the lower bottom face and the generatrix being $\partial_2$, a distance between the ninth plane and a central face of the truncated cone structure being $\delta_2$, and the included angle $\partial_2$ and the distance $\delta_2$ satisfying a second predetermined relationship.

18. The wireless charging transmitter according to claim 17, wherein:
the distance $\delta_2$ progressively increases with decrease of the included angle $\partial_2$.

19. The wireless charging transmitter according to claim 18, wherein:
the included angle $\partial_2$ is a value within an interval [15°, 90°), and a ratio of the distance $\delta_2$ to a height of the truncated cone structure is a value within an interval [50%, 0).

20. The wireless charging transmitter according to claim 1, wherein:
the at least two transmit coils comprise three curved coils, the three curved coils collaboratively defining a revolving structure, and any two adjacent curved coils in the three curved coils being partially overlapped along a circumferential orientation of the revolving structure.

21. The wireless charging transmitter according to claim 20, wherein:
the revolving structure is a cylindrical structure, and the three curved coils are arranged in an array around an axial line of the cylindrical structure.

22. The wireless charging transmitter according to claim 21, wherein:
the at least two transmit coils further comprise a ninth planar coil, a plane where the ninth planar coil is arranged being a ninth plane, the ninth plane being orthogonal to an axial line of the revolving structure, and a center of the ninth planar coil being on the axial line of the revolving structure; and
horizontal central lines of the three curved coils are on the ninth plane.

23. The wireless charging transmitter according to claim 1, wherein:
the at least two transmit coils comprise at least two tenth coils, each of the tenth coils comprising a first portion and a second portion, the first portion and the second portion having a first connecting portion, the first portion and the second portion being symmetrical about the first connecting portion, a coil winding sense of the first portion being opposite to a coil winding sense of the second portion, the first portion and the second portion of each of the tenth coils being arranged on a first curved surface, and the first portion and the second portion of each of the tenth coils being arranged in an array on the first curved surface.

24. The wireless charging transmitter according to claim 23, wherein:
the first curved surface is a sphere, and the at least two transmit coils further comprise an eleventh coil, the eleventh coil being an annular coil, the eleventh coil being arranged on a surface of the sphere, and a center of the eleventh coil is on an axial line of the sphere.

25. The wireless charging transmitter according to claim 23, wherein:
the first curved surface is an annular curved surface, and the at least two transmit coils further comprise a twelfth planar coil, a plane where the twelfth planar coil is arranged being a twelfth plane, the twelfth plane being a bottom face of the annular curved surface, and a center of the twelfth planar coil being on an axial line of the annular curved surface.

26. The wireless charging transmitter according to claim 1, wherein:
the at least two transmit coils comprise a thirteenth planar coil and a fourteenth solenoid coil, a plane where the thirteenth planar coil is arranged being a thirteenth plane, an axis where the fourteenth solenoid coil is arranged around being a fourteenth axis, the fourteenth axis being parallel to the thirteenth plane and residing on a center plain of the thirteens planar coil.

27. The wireless charging transmitter according to claim 26, wherein:
a geometrical center of the fourteenth solenoid coil resides on a center plane of the thirteenth planar coil and windings of the fourteenth solenoid coil have the same sense of rotation around the fourteenth axis.

28. The wireless charging transmitter according to claim 26, wherein:
the at least two transmit coils further comprise a fifteenth solenoid coil, an axis where the fifteenth solenoid coil is arranged around being a fifteenth axis, the fifteenth axis being parallel to the thirteenth plane and residing on the center plain of the thirteens planar coil, the fifteenth axis being orthogonal to the fourteenth axis; and
a geometrical center of the fifteenth solenoid coil residing on a central plane of the thirteenth planar coil and windings of the fifteenth solenoid coil having the same sense of rotation around the fifteenth axis.

29. The wireless charging transmitter according to claim 26, wherein:
the fourteenth solenoid coil is wound around an air core or ferrite core.

30. A wireless charger, comprising:
a wireless charging transmitter; and
a housing, configured to house the wireless charging transmitter, wherein the wireless charging transmitter comprises:
a transmit coil group, the transmit coil group comprising at least two transmit coils configured to simultaneously transmit electric energy to an external receive coil, the at least two transmit coils are being associated such that orientations of magnetic fields generated by currents on the at least two transmit coils are not parallel and form a first angle and a coupling coefficient between the at least two transmit coils is less than a predetermined threshold; and
at least two transmit circuit units, each of the transmit circuit units being electrically connected to a corresponding transmit coil of the transmit coils and being configured to supply a current to the corresponding transmit coil.

\* \* \* \* \*